US009910280B2

(12) United States Patent
Yomogita

(10) Patent No.: US 9,910,280 B2
(45) Date of Patent: Mar. 6, 2018

(54) DISPLAY DEVICE

(71) Applicant: MINEBEA CO., LTD., Kitasaku-gun, Nagano (JP)

(72) Inventor: Yasukazu Yomogita, Sagamihara (JP)

(73) Assignee: Minebea Co., Ltd., Nagano (JP)

( * ) Notice: Subject to any disclaimer, the term of this patent is extended or adjusted under 35 U.S.C. 154(b) by 1035 days.

(21) Appl. No.: 14/200,173

(22) Filed: Mar. 7, 2014

(65) Prior Publication Data
US 2014/0368097 A1   Dec. 18, 2014

(30) Foreign Application Priority Data
Jun. 18, 2013  (JP) ................................. 2013-127737

(51) Int. Cl.
*G02B 27/01*  (2006.01)

(52) U.S. Cl.
CPC .. *G02B 27/0149* (2013.01); *G02B 2027/0154* (2013.01)

(58) Field of Classification Search
CPC ........ G02B 27/0149; G02B 2027/0169; G02B 2027/0154; B60R 2300/205; B60R 11/0235; H05K 5/0017; H05K 5/0217; H05K 7/1409; B60K 35/00; G06F 1/1624
USPC .......... 359/632; 40/593; 361/755; 296/37.8, 296/24.34; 297/188.19; 248/558
See application file for complete search history.

(56) References Cited

U.S. PATENT DOCUMENTS

| | | | | |
|---|---|---|---|---|
| 5,222,780 A * | 6/1993 | Reh | ......................... | B60N 2/468 108/93 |
| 5,237,455 A * | 8/1993 | Bordo | ................ | G02B 27/0101 359/602 |
| 5,847,685 A * | 12/1998 | Otsuki | ................... | B60K 35/00 248/920 |
| 6,049,288 A * | 4/2000 | Kawasaki | .............. | B60K 37/00 248/27.1 |
| 7,125,063 B2 * | 10/2006 | Kawamoto | ............... | B60R 7/04 296/24.34 |
| 7,234,746 B2 * | 6/2007 | Sakakibara | ............... | B60R 7/04 296/24.34 |

(Continued)

FOREIGN PATENT DOCUMENTS

JP  59142287 U1  9/1984
JP  62200040 U1  12/1987

(Continued)

*Primary Examiner* — Ingrid M Weinhold
(74) *Attorney, Agent, or Firm* — Carrier Blackman & Associates, P.C.; Joseph P. Carrier; Jeffrey T. Gedeon

(57) ABSTRACT

A display device includes: a display portion; and a storage member configured to house the display portion and including an opening through which the display portion passes, wherein the display device further includes: a plurality of cover members configured to cover the opening and to travel from the opening to a region of the storage member adjacent to the opening so as to be overlapped with each other at the region; travel control means configured to cause the plurality of cover members to transfer to a covering position in which the opening is closed by the plurality of cover members, and also to a overlapping position in which the plurality of cover members are overlapped with each other, and configured to cause the display portion to transfer to rise-up and storage positions; and only one drive source configured to drive the travel control means.

19 Claims, 50 Drawing Sheets

(56) References Cited

U.S. PATENT DOCUMENTS

| | | | | |
|---|---|---|---|---|
| 7,554,062 | B2* | 6/2009 | Lee | B41J 3/46 |
| | | | | 219/414 |
| 8,454,073 | B2* | 6/2013 | Grandel | B60R 11/0235 |
| | | | | 296/37.12 |
| 8,649,161 | B2* | 2/2014 | Kato | B60R 11/0235 |
| | | | | 224/483 |
| 8,684,440 | B2* | 4/2014 | Hishon | B60N 3/101 |
| | | | | 296/24.34 |
| 9,470,892 | B2* | 10/2016 | Killguss | G02B 7/1827 |
| 2002/0166273 | A1 | 11/2002 | Nakamura et al. | |
| 2010/0226086 | A1* | 9/2010 | Kissel | B60R 11/0235 |
| | | | | 361/679.21 |
| 2012/0243154 | A1* | 9/2012 | Moriyasu | B60R 11/0229 |
| | | | | 361/679.01 |
| 2012/0318836 | A1* | 12/2012 | Maeda | B60R 11/0235 |
| | | | | 224/311 |

FOREIGN PATENT DOCUMENTS

| | | |
|---|---|---|
| JP | 02148178 U1 | 12/1990 |
| JP | 04314643 A | 11/1992 |
| JP | 11091403 A | 4/1999 |
| JP | 2002-331855 A | 11/2002 |
| JP | 2010143703 A | 7/2010 |
| JP | 2012061987 A | 3/2012 |

* cited by examiner

FIG.20F
FIG.20G
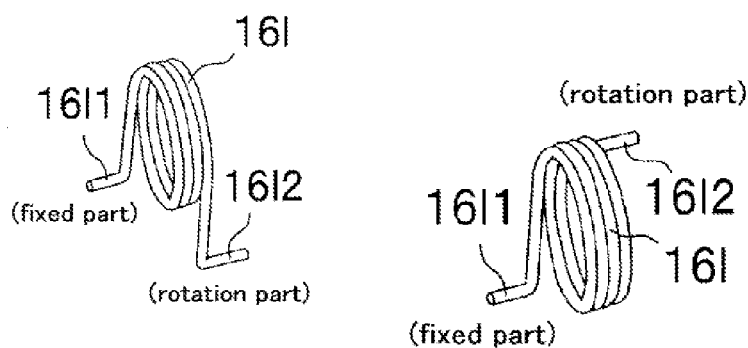
FIG.21
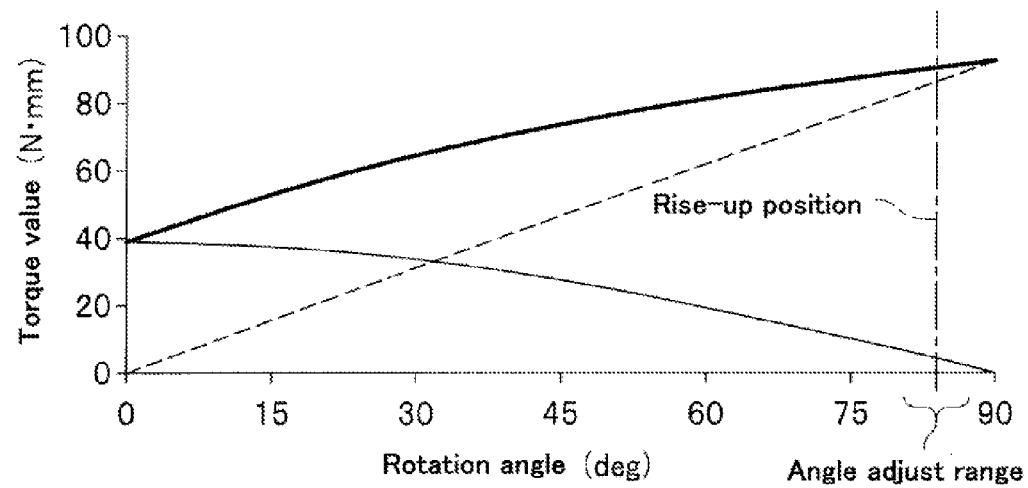

(back) (front)

DISPLAY DEVICE

BACKGROUND OF THE INVENTION

1. Field of the Invention

The present invention relates to a display device in which a cover for a head-up display/a pop-up display is opened and closed.

2. Description of the Related Art

There has conventionally been available a display device which is put in an automobile dashboard and which operates such that the image of information and so on necessary for driving is projected on a combiner raised up through an opening.

In the display device described above, a cover to cover up an opening which is provided for allowing the combiner to rise up is required in order to prevent foreign substances or dust from getting inside the display device when the combiner is retracted for storage.

In the display device described above, however, since the cover to cover up the opening is composed of one piece, a large space must be provided for lodging the cover when allowing the combiner to rise up, thus increasing the depth dimension of the device.

Specifically, when the cover to cover up the opening is composed of one piece, a sliding distance for retracting the cover is large, thus increasing the dimension of a drive structure (the length of a rack). At the same time, the length of the storage for the cover is also increased, and therefore the depth dimension of the whole device is increased, which results in that the device fails to appropriately fit in the automobile dashboard. Specifically, for example, it can happen that the display device invades into a space allocated for other instruments.

In order to overcome the problem of the display device described above, Japanese Patent Application Laid-Open No. 2002-331855 discloses a display device in which a cover to cover up an opening is divided into two sections (lids).

The display device described therein is structured such that while one end of the lid is raised above a dashboard, the other end of the lid travels along guide grooves over the opening toward the back of a vehicle, whereby the two lids of the cover covering up the opening are folded up for retraction at a side of the opening thus clearing the opening, and the opening covered up by the lids of the cover is opened completely.

In the display device described above in Japanese Patent Application Laid-Open No. 2002-331855, since the lid protrudes above the device when the opening is opened, a space for accommodating the lids must be provided above the device. Also, it can happen that when the opening is opened, the lids of the cover interrupt the vision of the driver depending on the driver's posture.

SUMMARY OF THE INVENTION

The present invention has been made in view of the problems described above, and it is an object of the present invention to provide a display device which can be reduced in dimension, in which the action of opening and closing a cover and the action of raising up and retracting a display portion can be performed by one same drive source, and which has a high merchantability.

In order to achieve the object described above, according to one aspect of the present invention, there is provided a display device which includes: a display portion; and a storage member configured to house the display portion and including an opening through which the display portion passes, wherein the display device further includes: a plurality of cover members configured to cover the opening and to travel from the opening to a region of the storage member adjacent to the opening so as to be overlapped with each other at the region; travel control means configured to cause the plurality of cover members to transfer to a covering position in which the opening is closed by the plurality of cover members and also to a overlapping position in which the plurality of cover members are overlapped with each other, and configured to cause the display portion to transfer to a rise-up position and a storage position; and only one drive source configured to drive the travel control means.

According to the configuration described above, since the plurality of cover members are overlapped with each other at the region adjacent to the opening, the depth dimension can be reduced thus downsizing the device. Also, since the cover is divided into a plurality of sections, the load is spread thus enabling a smooth action.

Also, the drive source for the travel control means to transfer the display portion to a rise-up position and to a storage position and also to move the plurality of cover members to the covering position and to the overlapping position is formed into a single member thus simplifying the structure. Therefore, the number of component members is reduced, and so the assembly becomes easier and the manufacturing cost is reduced.

In the one aspect of the present invention, the travel control means may move the plurality of cover members at respective different speeds.

According to the configuration described above, since the plurality of divided cover members are moved at respective different speeds, the plurality of cover members located at respective different positions can be moved to a storage place at the same timing when the opening is being opened. Also, the plurality of cover members located at respective different positions in the storage place can be moved to a place for closing at the same timing. Therefore, the appearance of the action can be enhanced, thus increasing the commodity value.

In the one aspect of the present invention, each of the plurality of cover members may have a surface area smaller than an area of the opening, and a total surface area of the plurality of cover members may be larger than the area of the opening.

According to the configuration described above, since each of the plurality of cover members has a surface area smaller than a surface area of the opening, and since a total surface area of the plurality of cover members is larger than the area of the opening, the opening can be completely covered by the plurality of divided cover members. Also, since the opening is covered by the plurality of cover members, the depth dimension for storing the plurality of cover members is reduced. As a result, the device can be downsized.

In the one aspect of the present invention, when the plurality of cover members are disposed in the overlapping position, the cover member with a longer travel distance of the plurality of cover members may be located below the cover member with a shorter travel distance.

According to the configuration described above, the travel distances of component members of the plurality of cover members can be reduced, thereby downsizing the device.

Also, since the travel tracks of the plurality of cover members do not intersect with one another, the structure can be simplified.

In the one aspect of the present invention, the travel control means may include: a rotary body rotated by drive force of the drive source; a first travel body configured to travel by rotation of the rotary body in a travel direction of the plurality of cover members; and a second travel body configured to cause the display portion to transfer to the rise-up position and the storage position in accordance with the rotation of the rotary body.

According to the configuration described above, since the travel control means include: a rotary body rotated by drive force of the drive source; a first travel body; and a second travel body, the plurality of cover members can be moved by the first travel body, and the display portion can be moved to the rise-up position and the storage position by the second travel body when the rotary body rotates.

Also, since the travel control means are activated based on the rotation of the rotary body, a smooth and reliable travel action can be performed.

In the one aspect of the present invention, the plurality of cover members may be a first cover member including first bosses disposed at a side so as to protrude, and a second cover member including second bosses disposed at a side so as to protrude, the drive source may be a motor, and the display device may include a lever engaged with the rotary body and configured to move the first travel body by the rotation of the rotary body, a first cover travel body including first guide holes having the first bosses set therein and configured to be moved by the first travel body thereby moving the first cover member, a second cover travel body including second guide holes having the second bosses set therein and configured to be moved by the first travel body thereby moving the second cover member, and a cover guide body including a third guide hole having the first bosses set therein and a fourth guide hole having the second bosses having the second bosses set therein and configured to move and guide the first cover travel body and the second cover travel body.

According to the configuration described above, based on rotation movement by the rotary body by rotation drive force of the motor, the first travel body is caused to travel by means of the lever, whereby the first cover member and the second cover member can be opened and closed.

In the one aspect of the present invention, the first guide holes and the second guide holes may include first inclined portions and second inclined portions, respectively, which are inclined with respect to the travel direction.

According to the configuration described above, since the first guide holes and the second guide holes may include first inclined portions and second inclined portions, respectively, which are inclined with respect to the travel direction, the plurality of cover members can travel in a direction intersecting with the travel direction and can be stored inside the storage member. Also, the plurality of cover members stored in the storage member can move upward thereby closing the opening.

In the one aspect of the present invention, the first guide holes and the second guide holes may include parallel straight line portions and parallel straight line portions, respectively, which are continuous respectively with at least one end of the first inclined portions and the second inclined portions and which are parallel to an upper surface of the storage member.

According to the configuration described above, since the first guide holes and the second guide holes include parallel straight line portions and parallel straight line portions, respectively, which are continuous respectively with at least one end of the first inclined portions and the second inclined portions and which are parallel to an upper surface of the storage member, the plurality of cover members can travel along an extending direction of the storage member.

In the one aspect of the present invention, the first travel body may include a drive shaft to move the second cover travel body, the first cover travel body may include a rack, and the drive shaft may include a pinion to engage with the rack of the first cover travel body thereby moving the first cover travel body.

According to the configuration described above, since the second cover travel body is moved by the drive shaft, and since the first cover travel body is moved by the pinion fixed to the drive shaft, the first cover travel body can travel at a speed equal to twice a speed of the second cover travel body. Therefore, when the first cover member and the second cover member are opened and closed wherein the first cover member is to travel for a distance equal to twice the travel distance of the second cover member, the travel speed of the first cover member can be made twice as fast as the travel speed of the second cover member thereby enabling synchronization of the action of opening and closing the first cover member and the second cover member.

In the one aspect of the present invention, the lever may include a first lever to move the first travel body by rotation of the rotary body acting in a first direction, and a second lever to move the first travel body by rotation of the rotary body acting in a second direction.

According to the configuration described above, based on rotation movement of the rotary body acting in the first direction, the first travel body can travel by means of the first lever, and also based on rotation movement of the rotary body acting in the second direction, the first travel body can travel by means of the second lever.

In the one aspect of the present invention, when storage of the plurality of cover members is completed, a boss disposed at the second lever may be set in a lock guide groove of a base so as to be maintained thereby stopping travel of the second lever and the first lever, whereby the plurality of cover members are kept in storage position.

According to the configuration described above, since when storage of the plurality of cover members is completed, a boss disposed at the second lever is set in a lock guide groove of a base so as to be maintained thereby stopping travel of the second lever and the first lever, the plurality of cover members are kept in storage position.

In the one aspect of the present invention, the second travel body may include a display portion driving gear portion to drive the display portion and an angle detection gear portion which has a shorter gear pitch than the display portion driving gear portion and which is configured to engage with a gear portion of an angle detector to detect the rise-up position of the display portion.

According to the configuration described above, since the second travel body includes the angle detection gear portion which has a shorter gear pitch than the display portion driving gear portion and which is configured to engage with a gear portion of an angle detector to detect a rise-up position of the display portion, the angle of the display portion positioned in the rise-up position can be detected with a high resolution.

In the one aspect of the present invention, the display device may include a rotary cover member configured to be rotated to thereby open and close a part of the opening.

According to the configuration described above, since the display device includes a rotary cover member in addition to the first cover member and the second cover member, the dimension of each of the cover members can be reduced thus enabling a further downsizing of the device. Also, the rotary cover member is rotated, therefore providing a high action reliability.

In the one aspect of the present invention, the display device may include rotation opening and closing means to rotate the rotary cover member by one of the first cover travel body and the second cover travel body.

According to the configuration described above, since the display device includes rotation opening and closing means to rotate the rotary cover member by one of the first cover travel body and the second cover travel body, the number of component members required is reduced thus enabling cost reduction.

In the one aspect of the present invention, the display device may include a covering position detection means to detect the covering position by using a position of the travel control means.

According to the configuration described above, due to the covering position detection means, the covering position can be detected by using the position of the travel control means.

In the one aspect of the present invention, the display device may include biasing means to bias the display portion in a retraction direction of the display portion when the display portion is raised up.

According to the configuration described above, since the display portion, when raised up, is biased in the retraction direction, the display portion is stabilized and therefore suppressed from vibration attributable to disturbance.

In the one aspect of the present invention, the travel control means may move the plurality of cover members from the overlapping position to the covering position at a same timing and also from the covering position to the overlapping position at a same timing.

According to the configuration described above, since the travel control means move the plurality of cover members from the overlapping position to the covering position at a same timing and also from the covering position to the overlapping position at a same timing, the appearance of the action can be enhanced, thus increasing the commodity value.

Thus, according to the present invention, a display device can be provided which can be reduced in dimension, in which the action of opening and closing a cover and the action of raising up and retracting a display portion can be performed by one same drive source, and which has a high merchantability.

BRIEF DESCRIPTION OF THE DRAWINGS

FIG. 20F is a perspective view of a left torsion coil spring, seen when the combiner is retracted;

FIG. 20G is a perspective view of the left torsion coil spring, seen when the combiner is raised up;

FIG. 21 is a graph of a torque value acting in a retraction direction of the combiner in relation to a rotation angle of the combiner;

FIGS. 28A and 28B are views of position at start of action of locking the first lid and the second lid, seen when the fist lid and the second lid are fully opened, wherein FIG. 28A is a transparent top plan view of a portion close to the main cam, and FIG. 28B is an enlarged view of an area enclosed by a rectangle indicated by O shown in FIG. 28A close to a second guide rib for the clutch lever of the base, seen from the upper side;

FIGS. 29A and 29B are views of position during action of locking the first lid and the second lid, seen when the first lid and the second lid are fully opened, wherein FIG. 29A is a transparent top plan view of the portion close to the main cam, seen from the upper side, and FIG. 29B is an enlarged view of an area enclosed by a rectangle indicated by P shown in FIG. 29A close to the second guide rib for the clutch lever of the base, seen from the upper side;

FIGS. 30A and 30B are views of position at finish of action of locking the first lid and the second lid, seen when the first lid and the second lid are fully opened, wherein FIG. 30A is a transparent top plan view of the portion close to the main cam, seen from the upper side, and FIG. 30B is an enlarged view of an area enclosed by a rectangle indicated by Q shown in FIG. 30A close to the second guide rib for the clutch lever of the base, seen from the upper side;

FIGS. 31A and 31B are views of position before action of rising up of the combiner, wherein FIG. 31A is a transparent top plan view of the portion close to the main cam, seen from the upper side, and FIG. 31B is an enlarged view of an area enclosed by a rectangle indicated by R shown in FIG. 31A close to the second guide rib for the clutch lever of the base, seen from the upper side;

FIGS. 32A and 32B are views of the main cam at position when the combiner starts action of rising up, wherein FIG. 32A is a transparent top plan view of the portion close to the main cam, seen from the upper side, and FIG. 32B is an enlarged view of an area enclosed by a rectangle indicated by S shown in FIG. 32A close to the second guide rib for the clutch lever of the base, seen from the upper side;

FIGS. 33A and 33B are views of the main cam at position when the combiner starts action of rising up, wherein FIG. 33A is a transparent top plan view of the portion close to the main cam, seen from the upper side, and FIG. 33B is an enlarged view of an area enclosed by a rectangle indicated by T shown in FIG. 33A, seen when a combiner actuating rib (20k2) in which a radius located at the lower side decreases gradually is viewed from the upper side;

FIGS. 42A and 42B are schematic views of relation between travel speed of the first cam and travel speed of the second cam, wherein FIG. 42A is a view of when the opening is closed by the first lid and the second lid, and FIG. 42B is a view of when the opening is opened by the first lid and the second lid;

DETAILED DESCRIPTION OF THE INVENTION

Exemplary embodiments of the present invention will hereinafter be described with reference to the accompanying drawings.

Figure 1:
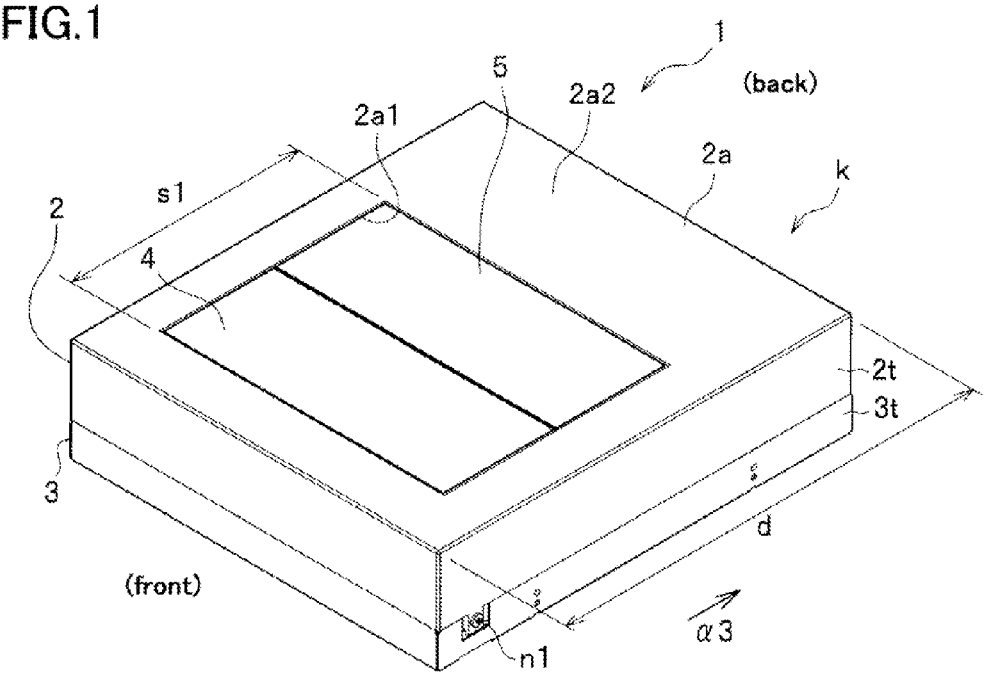
FIG. 1 is a perspective view of a display device according to a first embodiment of the present invention seen obliquely from a front upper side, when a cover is closed.
Figure 2:
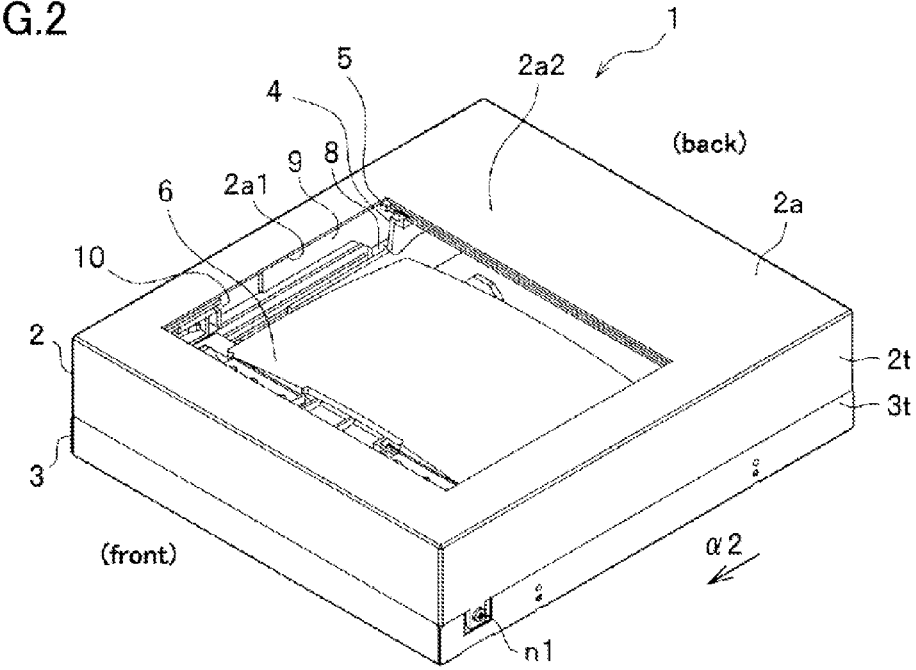
FIG. 2 is a perspective view of the display device shown in FIG. 1 seen obliquely from the front upper side, when the cover is opened.

FIG. 1 perspectively shows a display device 1 according to a first embodiment of the present invention, seen obliquely from a front upper side, wherein an opening 2a1 is closed by a first section of cover (to be referred to as first lid) 4 and a second section of cover (to be referred to as second lid) 5. FIG. 2 perspectively shows the display device 1, seen obliquely from the front upper side, wherein the opening 2a1 is opened and a combiner 6 is retracted. And, FIG. 3 perspectively shows the display device 1, seen from the upper side, when the display device 1 is in use.

Figure 3:
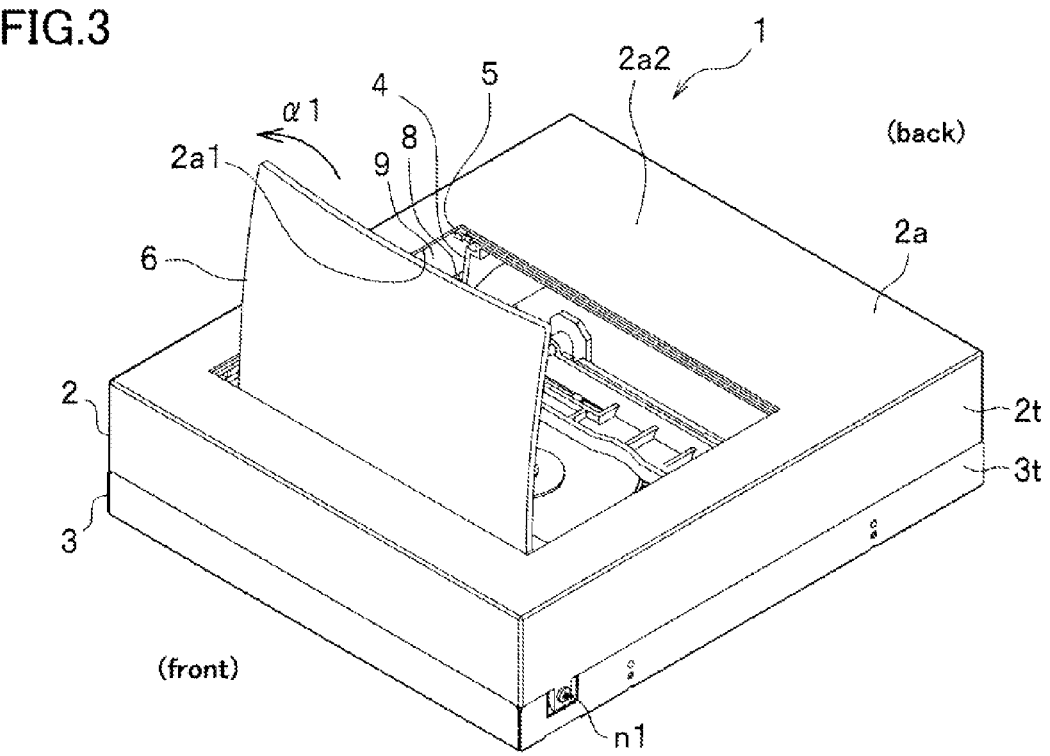
FIG. 3 is a perspective view of the display seen from an upper side, when the display device is in use.

The display device 1 according to the first embodiment is installed in, for example, an automobile dashboard and projects information and so on necessary for driving a vehicle on the combiner (display portion) 6 (refer to FIG. 3).

The combiner 6 is made of a resin material, for example polycarbonate, including several layers of reflective coating, and a user sees a virtual image which is displayed on the combiner 6 by a light source arranged below an upper surface plate 2a.

The display device 1 includes a chassis (storage member) k having a flat rectangular parallelepiped shape and including an upper case (storage member) 2 and a lower case (storage member) 3 and is configured to be enclosed in the flat rectangular cubic chassis k. The upper case 2 and the lower case 3 are fixedly attached to each other in such a manner that a pan head small screw n1 with a cross slot is put through a through-hole of the upper case 2 and is inserted into a female screw formed at the lower case 3. The lower case 3 is formed to have a shape of a flat rectangular cube having an open upper side facing the upper case 2.

The upper case 2 is formed to have an open lower side facing the lower case 3 and is structured such that the opening 2a1 which is opened for allowing the combiner 6 to rise up and to be retracted is formed at the aforementioned upper surface plate 2a. In order to allow the combiner 6 to rise up, the opening 2a1 of the upper surface plate 2a is formed to have a projected area equal or larger than an area of the combiner 6.

When the display device 1 is not in use such that information is not shown on the combiner 6, the opening 2a1 is closed by the first lid (cover member, first cover member, cover member with a longer travel distance) 4 which has a depth dimension s2 measuring shorter than a depth dimension s1 of the opening 2a1 (refer to FIG. 4) and by the second lid (cover member, second cover member, cover member with a shorter travel distance) 5 which has a depth dimension s3 measuring shorter than the depth dimension s1 of the opening 2a1 (refer to FIG. 5).

When display device 1 is brought into use, the first lid 4 and the second lid 5 move downward, then travel in parallel under the upper surface plate 2a and are retracted and stored as shown in FIG. 2, wherein the first lid 4 is moved below the second lid 5. Then, the second lid 5 and the first lid 4 located below the second lid 5 move rearward, and are retracted to be stored under a rear portion 2a2 of the upper surface plate 2a.

Thus, the combiner 6 retracted appears through the opening 2a1 of the upper surface plate 2a. And, the combiner 6 turns on a front axis so as to be raised up in a direction indicated by an arrow α1 shown in FIG. 3, whereby the display device 1 comes in use as shown in FIG. 3.

In the display device 1, only one motor (travel control means, drive source) 7 is provided which acts to open and close the first lid 4 and the second lid 5, and also to raise up and retract the combiner 6.

<First Lid 4>

Figure 4A:
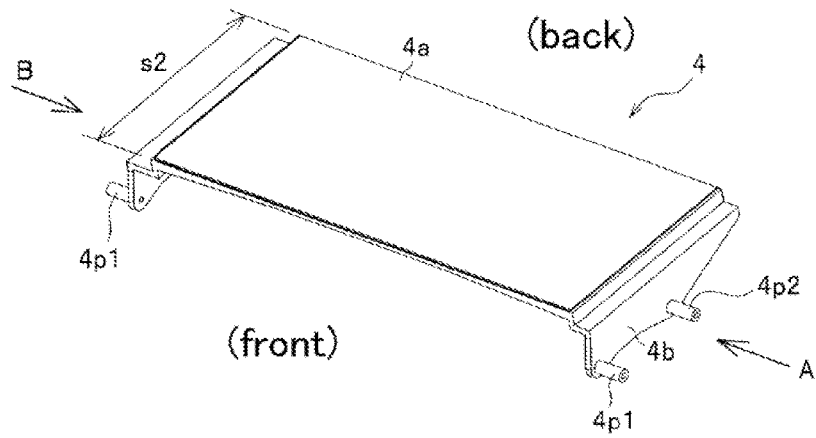
FIG. 4A is a perspective view of a first lid seen obliquely from the front upper side.
Figure 4B:
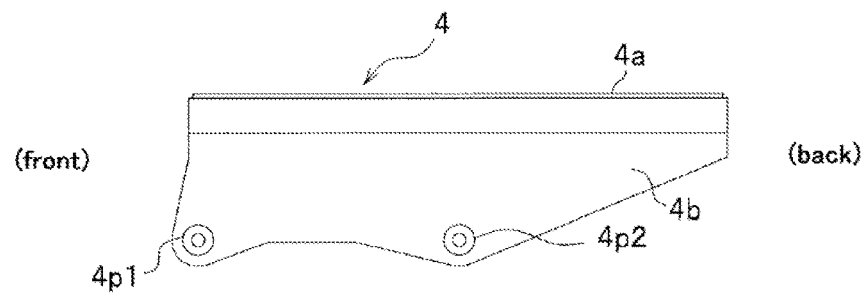
FIG. 4B is a side view of the first lid seen in a direction indicated by an arrow A shown in FIG. 4A.
Figure 4C:
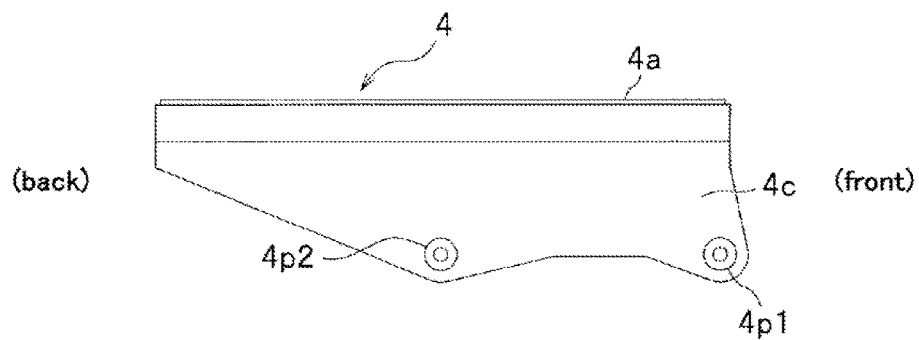
FIG. 4C is a side view of the first lid seen in a direction indicated by an arrow B shown in FIG. 4A.

FIG. 4A perspectively shows the first lid 4 viewed obliquely from the front upper side, FIG. 4B shows the first lid 4 viewed in a direction indicated by an arrow A shown in FIG. 4A, and FIG. 4C shows the first lid 4 viewed in a direction indicated by an arrow B shown in FIG. 4A.

The first lid 4 has a substantially flat square C shape oriented sideways when viewed from a front side and includes a horizontal top plate 4a and side plates 4b and 4c extending downward respectively from both side ends of the top plate 4a. The top plate 4a has a surface area smaller than the area of the opening 2a1, and the total area of the surface areas of the top plate 4a of the first lid 4 and a top plate 5a (to be described later, refer to FIG. 5A) of the second lid 5 is set larger than the area of the opening 2a1.

As shown in FIGS. 4A and 4B, a first front boss (first boss) 4p1 and a first rear boss (first boss) 4p2, which project outward, are formed at the side plate 4b.

As shown in FIGS. 4A and 4C, a first front boss (first boss) 4p1 and a first rear boss (first boss) 4p2, which project outward, are formed at the side plate 4c.

<Second Lid 5>

Figure 5A:
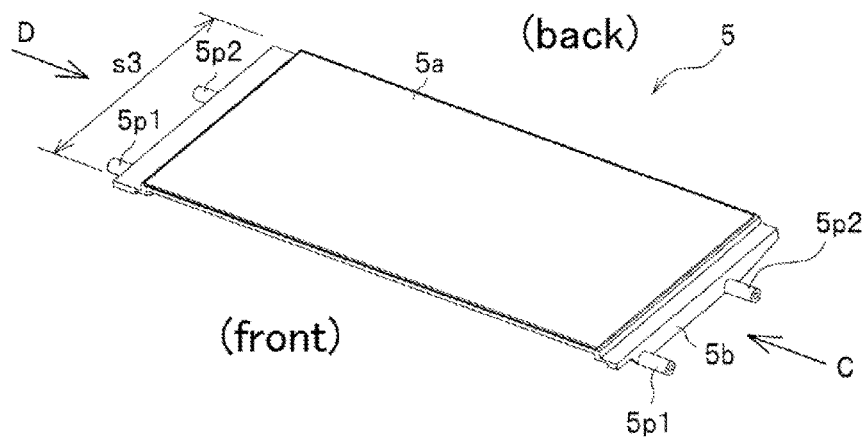
FIG. 5A is a perspective view of a second lid seen obliquely from the front upper side.
Figure 5B:
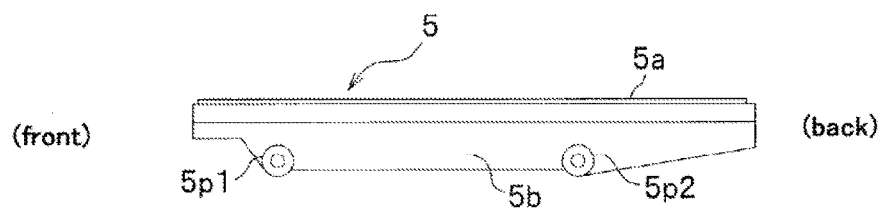
FIG. 5B is a side view of the second lid seen in a direction indicated by an arrow C shown in FIG. 5A.
Figure 5C:
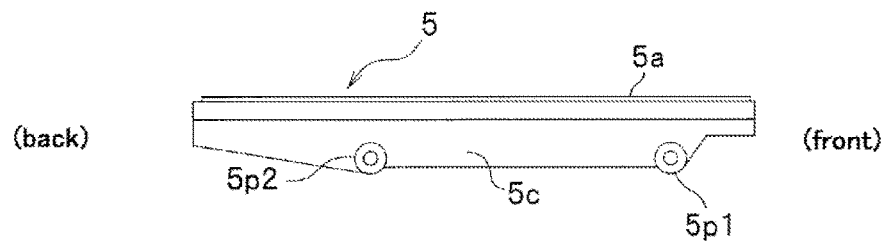
FIG. 5C is a side view of the second lid seen in a direction indicated by an arrow D shown in FIG. 5A.

FIG. 5A perspectively shows the second lid 5 viewed obliquely from the front upper side, FIG. 5B shows the second lid 5 viewed in a direction indicated by an arrow C shown in FIG. 5A, and FIG. 5C shows the second lid 5 viewed in a direction indicated by an arrow D shown in FIG. 5A.

The second lid 5 has a substantially flat square C shape oriented sideways when viewed from a front side and includes a horizontal top plate 5a and side plates 5b and 5c extending downward respectively from both side ends of the top plate 5a. The top plate 5a has a surface area smaller than the area of the opening 2a1, and, as described above, the total area of the surface areas of the top plate 4a of the first lid 4 and the top plate 5a of the second lid 5 is set larger than the area of the opening 2a1.

As shown in FIGS. 5A and 5C, a second front boss (second boss) 5p1 and a second rear boss (second boss) 5p2, which project outward, are formed at the side plate 5b.

As shown in FIGS. 5A and 5C, a second front boss (second boss) 5p1 and a second rear boss (second boss) 5p2, which project outward, are formed at the side plate 5c.

<Motor 7 and its Gear Train>

Figure 6A:
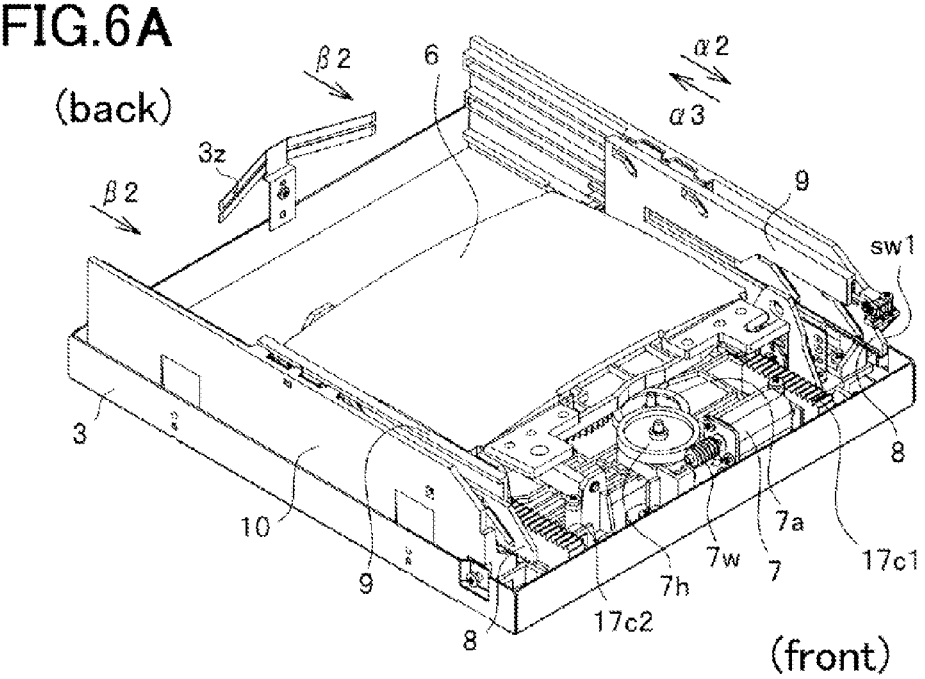
FIG. 6A is a perspective view of the display device seen obliquely from the front upper side, wherein un upper case, the first lid and the second lid are removed.
Figure 6B:
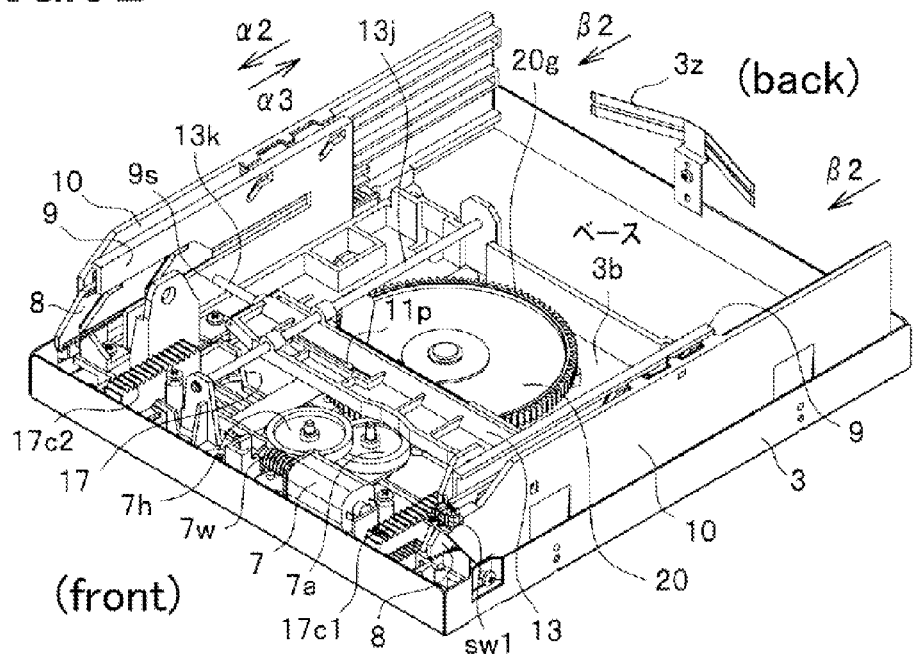
FIG. 6B is a perspective view of the display device seen obliquely from the front upper side, wherein the combiner is further removed.

FIG. 6A perspectively shows the display device 1 seen obliquely from the front upper side, wherein the upper case 2, the first lid 4 and the second lid 5 are removed, and FIG. 6B perspectively shows the display device 1 seen obliquely from the front upper side, wherein the combiner 6 is further removed from FIG. 6A.

In a front portion of the display device 1, the motor 7, which acts to open and close the opening 2a1 by the first lid 4 and the second lid 5 and also to raise up and retract the combiner 6, is fixed to a base (base plate) 3b of the lower case 3.

A worm gear (first gear train) 7w is fixed to a shaft of the motor 7, and a worm wheel 7h is engaged with the worm gear 7w.

A first spur gear (not shown) is integrally formed at a lower portion of the worm wheel 7h. The worm wheel 7h and the first spur gear are rotatably supported at the base 3b.

A second spur gear 7a is engaged with the first spur gear. The second spur gear 7a is rotatably supported at the base 3b.

An external gear 20g of a main cam (rotary body, travel control means) 20 is engaged with the second spur gear 7a. That is to say, the worm gear 7w, the worm wheel 7h, the first spur gear and the second spur gear 7a make up a gear train of the motor 7.

When the main cam 20 rotates, the opening 2a1 is opened and closed by the first lid 4 and the second lid 5, and also the combiner 6 is raised up and retracted. The main cam 20 is rotatably supported on the base 3b.

<Plate Spring 3z at a Rear Portion of the Base 3b>

In a rear portion of the base 3b, a plate spring 3z is provided. The plate spring 3z is formed to have a substantially wing shape and configured to bias the first lid 4 and the second lid 5 forward (refer to an arrow 32 shown in FIGS. 6A and 6B) when the first lid 4 and the second lid 5 are stored as shown in FIGS. 2 and 3, thereby suppressing vibration attributable to disturbance. When the first lid 4 and the second lid 5 are stored, the plate spring 3z is deformed rearward within the limit of elasticity thereby applying forward elastic force to the first lid 4 and the second lid 5.

<Main Cam 20>

Figure 7A:
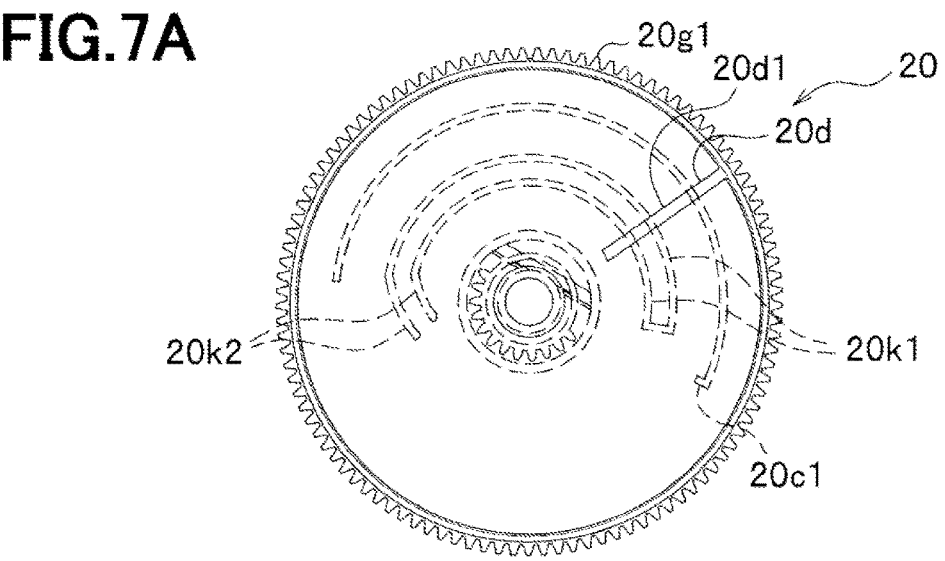
FIG. 7A is a top plan view of a main cam seen from the upper side.
Figure 7B:
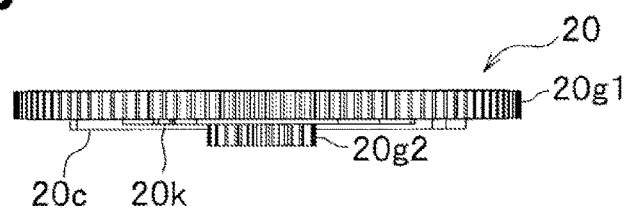
FIG. 7B is a side view of the main cam seen from a front side.
Figure 7C:
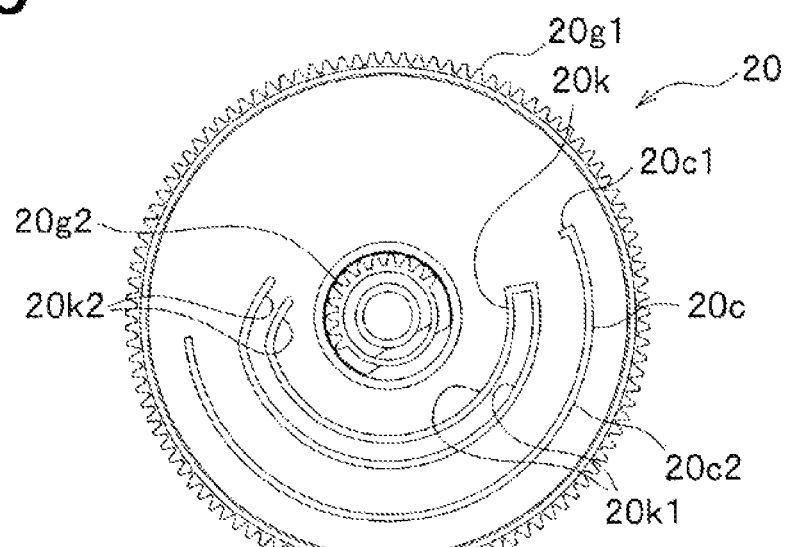
FIG. 7C is a bottom plan view of the main cam seen from a lower side.
Figure 7D:
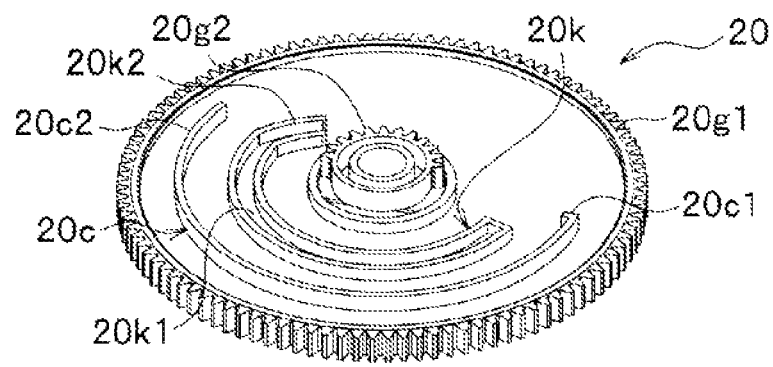
FIG. 7D is a bottom perspective view of the main cam turned upside down.

FIG. 7A shows, in top plan, the main cam 20 seen from the upper side, FIG. 7B shows a side of the main cam 20 seen from a front side, FIG. 7C shows, in bottom plan, the main cam 20 seen from a lower side, and FIG. 7D perspectively shows a bottom side of the main cam 20, wherein the main cam 20 is positioned upside down.

The external gear 20g1 is formed at an outer circumference of the main cam 20, and a drive lever pressing rib 20d to extend radially is formed at the upper surface of the main cam 20 so as to protrude linearly upward. The drive lever pressing rib 20d, when the first lid 4 and the second lid 5 are to be closed, is configured to press a drive lever 11 with a pressing face 20d1 in a counterclockwise direction thereby closing the first lid 4 and the second lid 5. A partial gear 20g2, which has a smaller diameter than the external gear 20g1 and which engages with a combiner drive rack 17r of a tilt rack 17 (to be described later), is formed partially at the lower surface of the main cam 20 so as to protrude downward.

As shown in FIGS. 7C and 7D, a clutch guide rib 20c having a circular arc shape is formed at the lower side of the main cam 20 so as to protrude downward.

The clutch guide rib 20c includes a clutch pressing rib 20c1 protruding toward a center of the main cam 20 and having a short dimension, and a clutch relief rib 20c2 having a circular arc shape and continuing from the clutch pressing rib 20c1.

The clutch pressing rib 20c1 acts to press a clutch lever (travel control means, second lever) 12 (to be described later) in a clockwise direction thereby opening the first lid 4 and the second lid 5.

The clutch relief rib 20c2 acts to keep the clutch lever 12 locked.

A combiner guide rib 20k including an inner arc portion with a smaller radius and an outer arc portion with a larger radius is formed radially inside the clutch guide rib 20c on the lower side of the main cam 20 so as to protrude downward. The combiner guide rib 20k includes a combiner relief rib 20k1 having a constant radius, and a combiner actuating rib 20k2 continuing from the combiner relief rib 20k1 so as to extend with a gradually decreasing radius.

<Drive Lever 11>

Figure 8A:
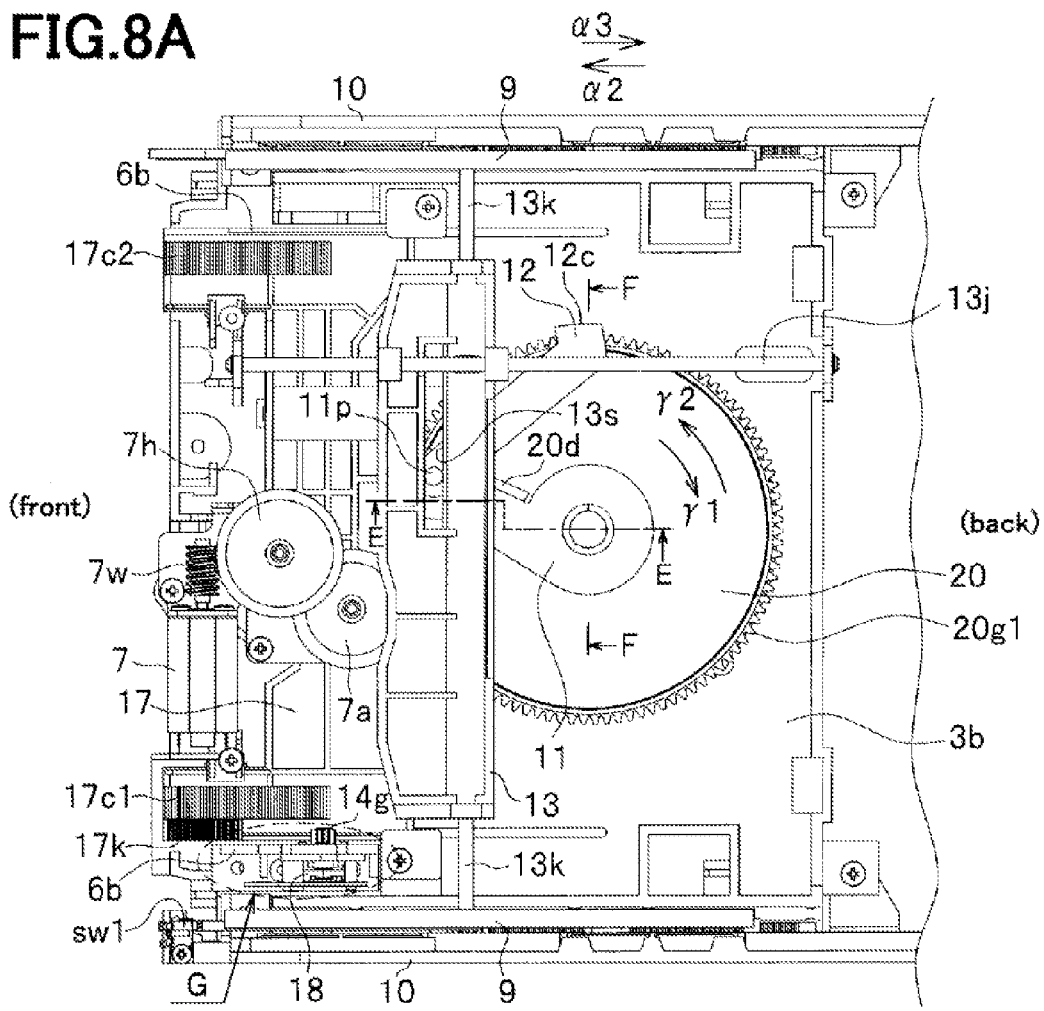
FIG. 8A is a top plan view of an inside of the display device seen from the upper side, when the first lid and the second lid are closed.
Figure 8B:
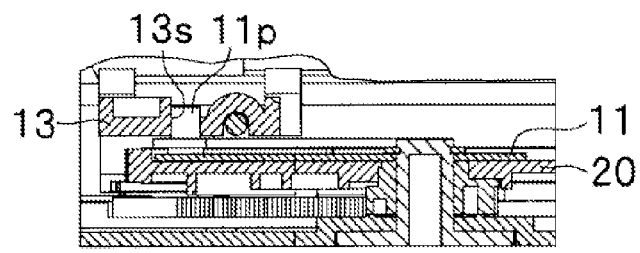
FIG. 8B is cross sectional view of a portion of FIG. 8A taken along a line E-E.
Figure 8C:
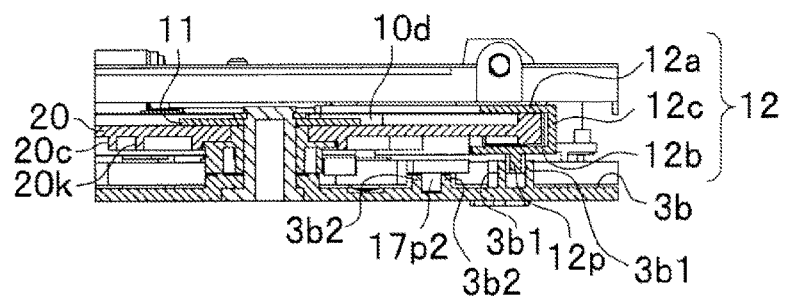
FIG. 8C is a cross sectional view of a portion of FIG. 8A taken along a line F-F.

FIG. 8A shows, in top plan, the inside of the display device 1 seen from the upper side, when the first lid 4 and the second lid 5 shown in FIG. 1 are closed, FIG. 8B shows a cross section of a portion of FIG. 8A taken along a ling E-E shown in FIG. 8A, and FIG. 8C shows a cross section of a portion of FIG. 8A taken along a line F-F shown in FIG. 8A.

Above the main cam 20, a drive lever (travel control means, first lever) 11 is rotatably supported coaxially with the main cam 20. The clutch lever 12 is combined with the drive lever 11 such that a guide pin 11p is inserted.

Figure 9A:
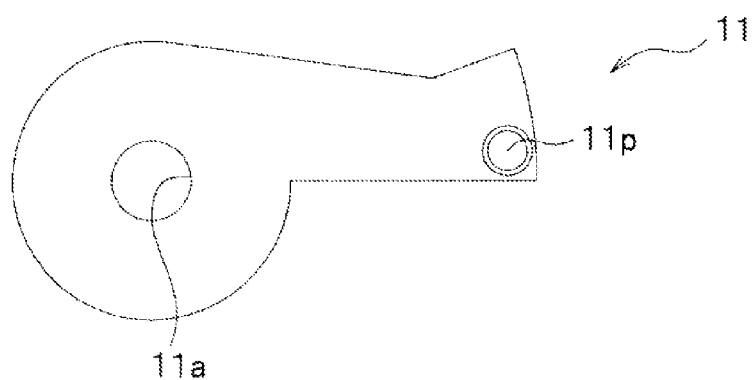
FIG. 9A is a top plan view of a drive lever seen from the upper side.
Figure 9B:
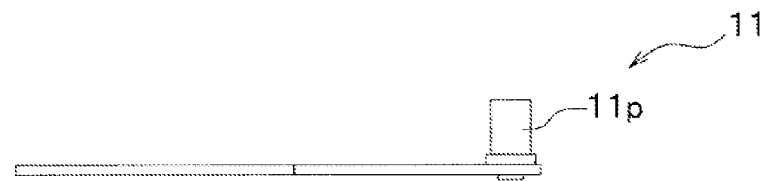
FIG. 9B is a side view of the drive lever seen from the front side.
Figure 9C:
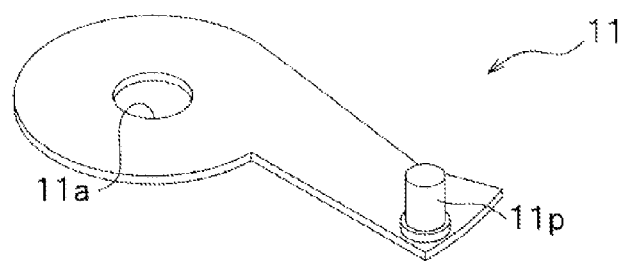
FIG. 9C is a perspective view of the drive lever seen obliquely from the upper side.

FIG. 9A shows, in top plan, the drive lever 11 seen from the upper side, FIG. 9B shows a side of the drive lever 11 of FIG. 9A seen from the front side, and FIG. 9C perspectively shows the drive lever 11 seen obliquely from the upper side.

The drive lever 11 is a plate-like member at a middle of which a rotation shaft insertion hole 11a is formed by press forming. One end of the driver lever 11 is fixed by swaging such that the guide pin 11*p* made of stainless steel (for example, SUS304) is protruded upward.

<Clutch Lever 12>

Figure 10A:
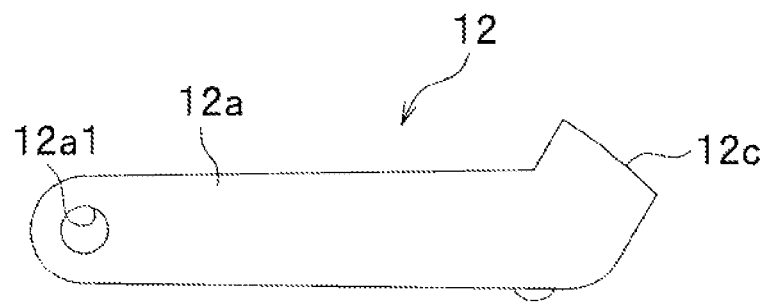
FIG. 10A is a top plan view of a clutch lever seen from the upper side.
Figure 10B:
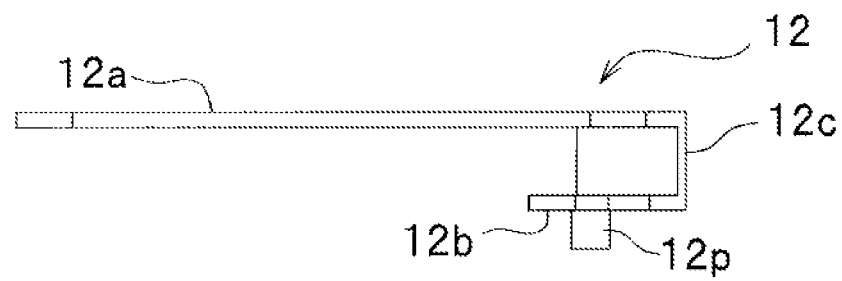
FIG. 10B is a side view of the clutch lever seen from the front side.
Figure 10C:
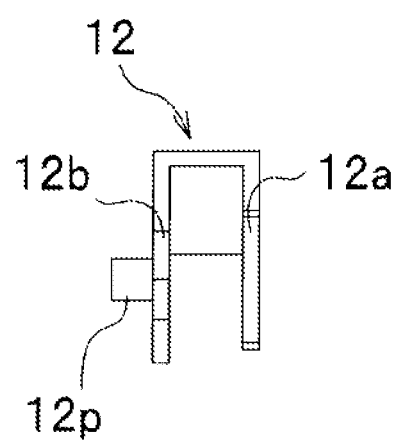
FIG. 10C is left side view of the clutch lever seen from a left side.
Figure 10D:
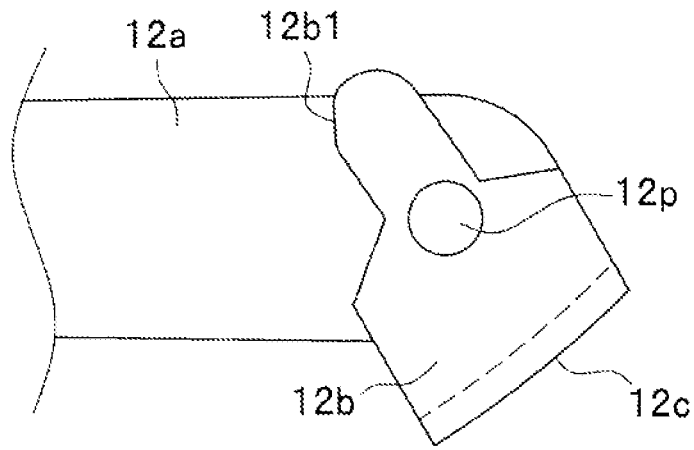
FIG. 10D is a bottom plan view of a portion near a lower plate of the clutch lever seen from a lower side.
Figure 10E:
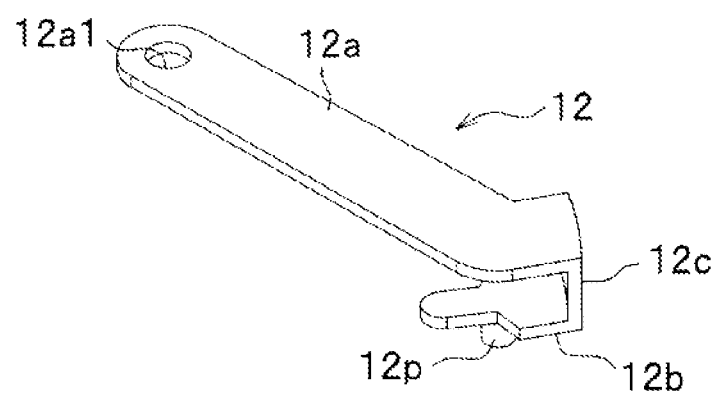
FIG. 10E is a perspective view of the clutch lever seen obliquely from the upper side.

FIG. 10A shows, in top plan, the clutch lever 12 seen from the upper side, FIG. 10B shows a side of the clutch lever 12 of FIG. 10A seen from the front side, FIG. 10C shows a left side of the clutch lever 12 seen from a left side, FIG. 10D shows, in bottom plan, the clutch lever 12 seen from the lower side, and FIG. 12E perspectively shows the clutch lever 12 seen obliquely from the upper side.

As shown in FIG. 10B, the clutch lever 12 is formed to have a substantially square-U shape, and includes an upper plate 12*a* located at an upper position and extending horizontally, a lower plate 12*b* located at a lower position and extending horizontally, and a side plate 12*c* connecting between one end of the upper plate 12*a* and one end of the lower plate 12*b* and extending vertically.

A pin insertion hole 12*a*1 is formed at the other end of the upper plate 12*a*.

As shown in FIG. 10D, a guide pin (boss) 12*p* is provided by press fitting or the like at the lower plate 12*b* so as to protrude downward. A lid lock introduction portion 12*b*1 is formed linearly at a portion of the lower plate 12*b*.

<Base 3*b*>

Figure 11A:
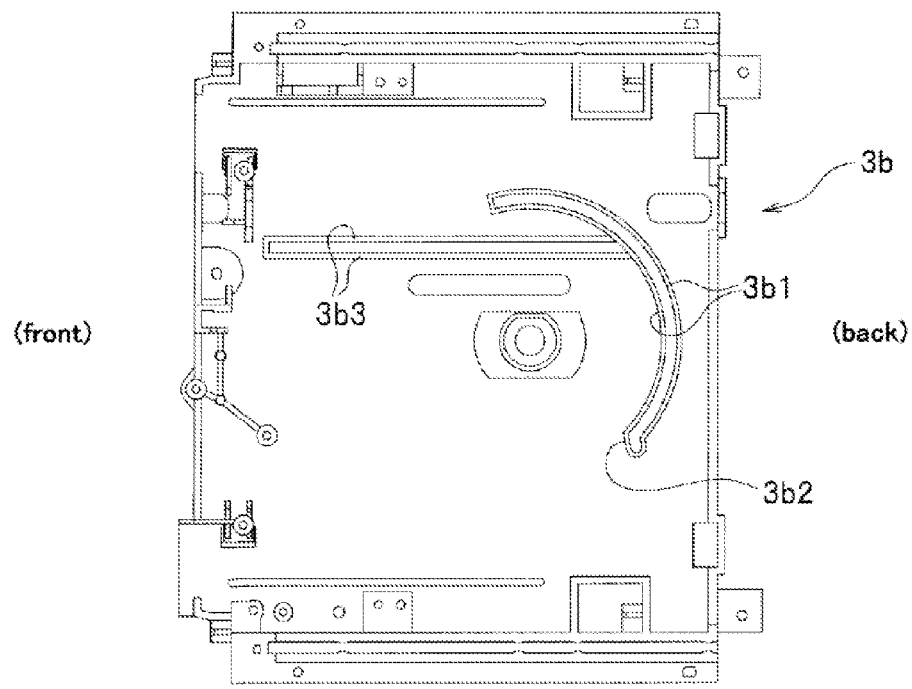
FIG. 11A is a top plan view of a base located below the main cam shown in FIG. 8A.
Figure 11B:
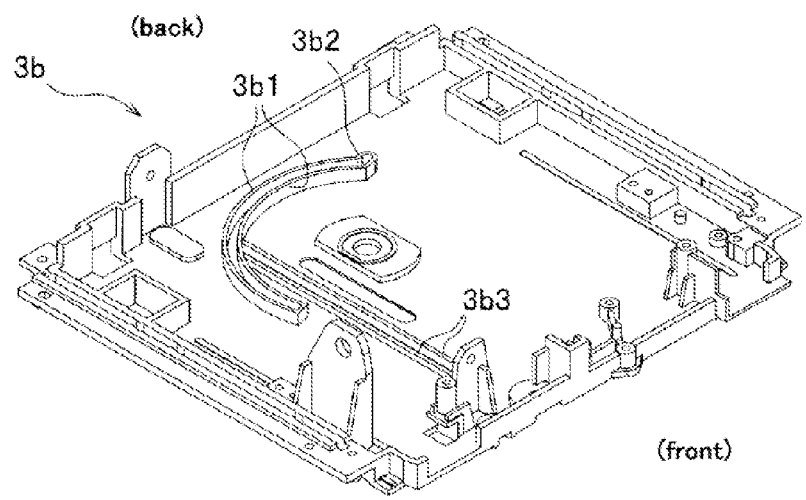
FIG. 11B is a perspective view of the base located below the main cam.

FIG. 11A shows, in top plan, the base 3*b* located below the main cam 20 shown in FIG. 8A seen from the upper side, and FIG. 11B perspectively shows the base 3*b* located below the main cam 20 shown in FIG. 8A.

On the base 3*b*, a first clutch lever guide rib 3*b*1 protruding upward is formed which has an arc shape and in which the guide pin 12*p* provided so as to extend downward from the clutch lever 12 is set and guided, and also a second clutch lever guide rib (lock guide groove) 3*b*2 protruding upward is formed which has a short linear shape and which is continuous from the first clutch lever guide rib 3*b*1, whereby a track to guide the guide pin 12*p* of the clutch lever 12 is formed (refer to FIG. 8C).

Also, on the base 3*b*, a tilt rack guide rib 3*b*3, in which a travel direction guide pin 17*p*2 (refer to FIG. 17B) extending downward from the tilt rack 17 is set and guided, is formed linearly along a front and rear direction. The tilt rack guide rib 3*b*3 is formed to protrude upward so as to guide the travel direction guide pin 17*p*2 of the tilt rack 17 in the front and rear direction (direction indicated by arrows α2 and α3 shown in FIG. 8A) (refer to FIG. 8C).

As shown in FIG. 8B, the drive lever 11 is rotatably supported coaxially with the main cam 20 immediately above the main cam 20. And, the guide pin 11*p* of the drive lever 11 is inserted through the pin insertion hole 12*a*1 of the clutch lever 12 from below, whereby the drive lever 11 is linked with the clutch lever 12. With the above configuration, the drive lever 11 and the clutch lever 12 can act in a synchronized manner via the guide pin 11*p*.

And, as shown in FIG. 8C, the lower plate 12*b* of the clutch lever 12 is provided and located to oppose the clutch pressing rib 20*c*1 of the clutch guide rib 20*c* provided at the lower side of the main cam 20 in a clockwise direction such that the side plate 12*c* located at the outside of the external gear 20*g*1 of the main cam 20 is provided therebetween.

The guide pin 12*p*, which extends toward a portion located below the lower plate 12*b* of the clutch lever 12, is set between the clutch lever guide ribs 3*b*1 and 3*b*2 formed on the base 3*b* so as to protrude upward and is guided along the track of the clutch lever guide ribs 3*b*1 and 3*b*2.

Accordingly, the drive lever 11, which is linked with the clutch lever 12 via the guide pin 11*p* of the drive lever 11, is caused to travel together with the clutch lever 12 along the track of the clutch lever guide ribs 3*b*1 and 3*b*2 formed on the base 3*b*.

<Slide Base 13>

On the other hand, as shown in FIGS. 8A and 6B, the guide pin 11*p* of the drive lever 11, which is inserted through the pin insertion hole 12*a*1 of the clutch lever 12, is inserted in a slide hole 13*s* which has an elongated shape so as to extend in a right and left direction of a slide base (first travel body) 13.

The slide base 13 is a member to open and close the opening 2*a*1 shown in FIGS. 1 and 2 by the first lid 4 and the second lid 5.

A guide shaft 13*j*, which is provided in front and rear direction (right and left direction in FIG. 8A) of the display device 1, is inserted in the slide base 13, and the slide base is caused to travel along the guide shaft 13*j* in the front and rear direction (right and left direction in the paper of FIG. 8A) in accordance with the travel of the guide pin 11*p* of the drive lever 11.

A drive shaft 13*k* is rotatably inserted in the slide base 13 in the right and left direction (up and down direction in the paper of FIG. 8A)

Figure 12A:
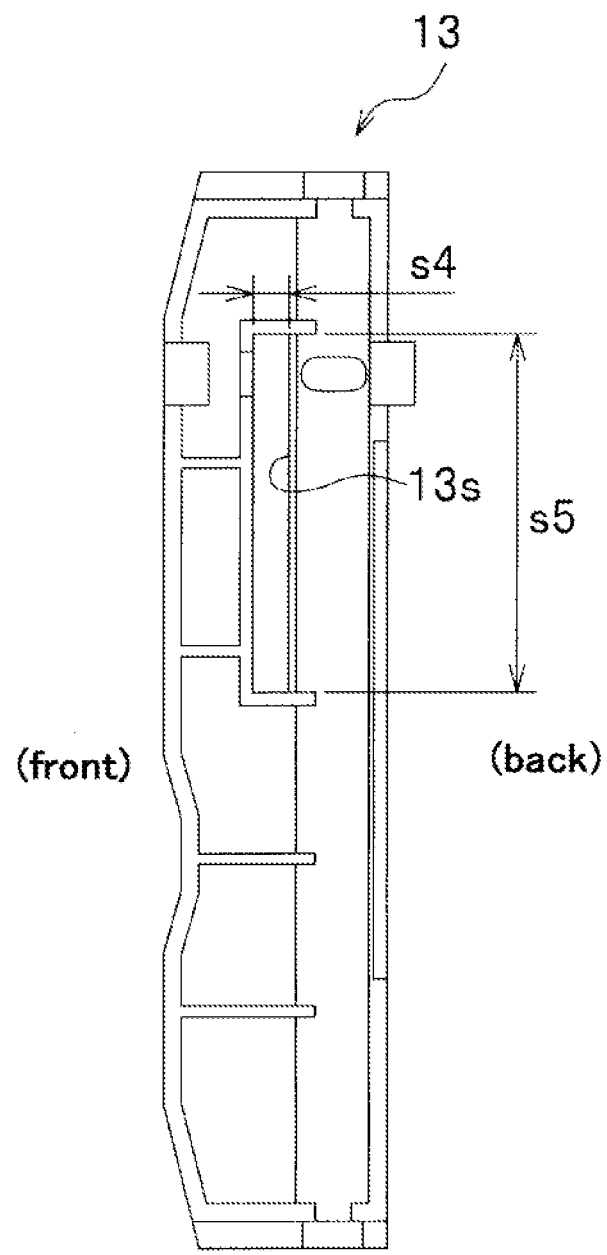
FIG. 12A is a top plan view of a slide base seen from the upper side.
Figure 12B:
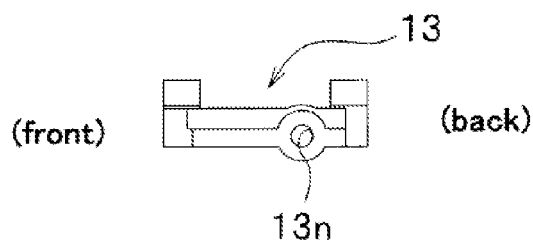
FIG. 12B is a front side view of the slide base.
Figure 12C:
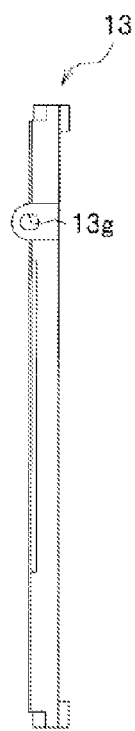
FIG. 12C is a right side view of the slide base.
Figure 12D:
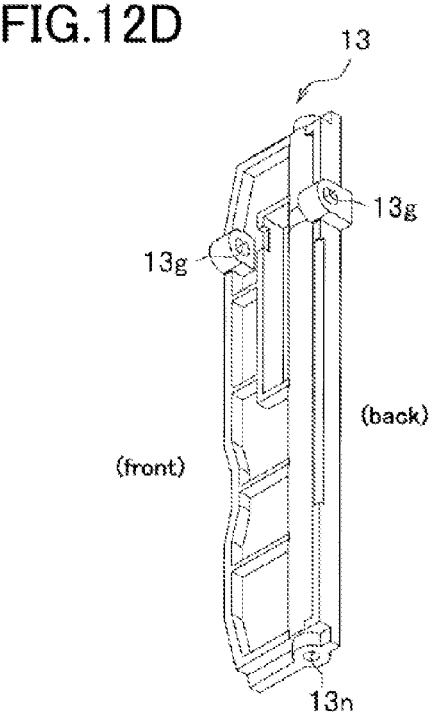
FIG. 12D is a perspective view of the slide base.

FIG. 12A shows, in top plan, the slide base 13 seen from the upper side, FIG. 12B shows a front side of the slide base 13 shown in FIG. 12A, FIG. 12C shows a right side of the slide base 13 shown in FIG. 12A, and FIG. 12D perspectively shows the slide base 13 shown in FIG. 12A.

The slide base 13 is a long shaped member extending in the right and left direction of the display device 1.

The slide hole 13*s*, which has an elongated shape and through which the guide pin 11*p* (refer to FIG. 9) of the drive lever 11 is inserted, is formed at the slide base 13 in a longitudinal direction. The slide base 13 has a width dimension s4 measuring a dimension slightly larger than an outer diameter of the guide pin 11*p* to thereby allow the guide pin 11*p* to slide, and a length dimension s5 configured to well fulfill a movement range of the guide pin 11*p* of the drive lever 11.

Also, two guide holes 13*g*, through which the guide shaft 13*j* is inserted, are formed at the slide base 13 (refer to FIG. 8A) in a shorter direction. The guide hole 13*g* is a hole elongated in a height direction so as to cancel height direction dimension errors of component members and assembly. The guide hole 13*g* has a dimension slightly larger than an outer diameter of the guide shaft 13*j* so that the slide base 13 is enabled to travel freely in the front and rear direction of the display device 1.

Further, a drive hole 13*n*, through which the drive shaft (travel control means, travel means) 13*k* (refer to FIG. 8A) is inserted in the longitudinal direction, is formed at the slide base 13 along the longitudinal direction. The drive hole 13*n* has a hole diameter slightly larger than a diameter of the drive shaft 13*k* to thereby allow the drive shaft 13*k* to freely rotate.

<Action of Main Cam 20 and Slide Base 13>

As shown in FIG. 2, when the first lid 4 and the second lid 5 are moved rearward for storage thereby opening the opening 2*a*1, drive force of the motor 7 is conveyed to the external gear 20*g* of the main cam 20 via the worm gear 7*w*, the worm wheel 7*h*, the first spur gear and the second spur gear 7*a* in the slide base 13, and the main cam 20 is rotated in a clockwise direction (direction indicated by an arrow γ1 shown in FIG. 8A).

And, when the main cam 20 is rotated in the clockwise direction (direction indicated by the arrow γ1 shown in FIG. 8A), the clutch pressing rib 20*c*1 (refer to FIG. 7C) of the clutch guide rib 20c provided at the lower side of the main cam 20 presses the lower plate 12b of the clutch lever 12, and the clutch lever 12 and the drive lever 11 travel in the clockwise direction (direction indicated by the arrow γ1 shown in FIG. 8A) in accordance with the track of the clutch lever guide ribs 3b1 and 3b1. Consequently, the slide base 13 travels inside the display device 1 in the rearward direction (direction indicated by an arrow α3 shown in FIG. 8A), and the first lid 4 and the second lid 5 are opened (to be detailed later).

Meanwhile, when the first lid 4 and the second lid 5 are moved forward from a position shown in FIG. 2 to a position shown in FIG. 1 thereby closing the opening 2a1, the main cam 20 is rotated in a counterclockwise direction (direction indicated by an arrow γ2 shown in FIG. 8A). When the main cam 20 is rotated in the counterclockwise direction, the drive lever pressing rib 20d (refer to FIG. 7A) provided at the upper side of the main cam 20 presses the drive lever 11 in the counterclockwise direction (direction indicated by the arrow γ2 shown in FIG. 8A) (refer to FIGS. 8A and 8C).

Thus, when the main cam 20 is rotated in the counterclockwise direction (direction indicated by the arrow γ2 shown in FIG. 8A), the clutch lever 12 and the drive lever 11 travel in the counterclockwise direction (direction indicated by the arrow γ2 shown in FIG. 8A) in accordance with the track of the clutch lever guide ribs 3b1 and 3b1 of the base 3b. Consequently, the slide base 13 travels inside the display device 1 in the forward direction (direction indicated by an arrow α2 shown in FIG. 8A), and the first lid 4 and the second lid 5 are closed as shown in FIG. 1 (to be detailed later).

Figure 13:
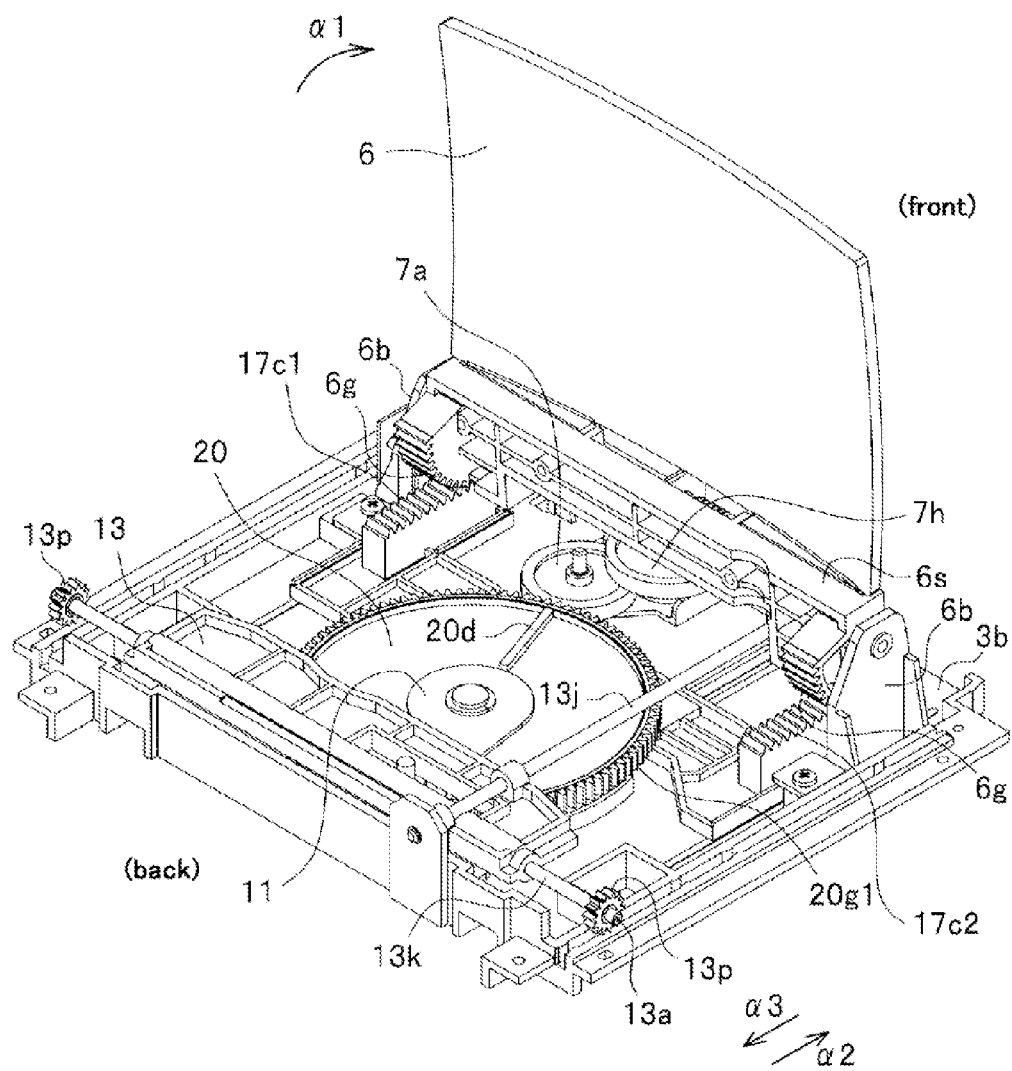
FIG. 13 is a perspective view of an inside structure of the display device of FIG. 3 seen obliquely from a rear upper side.

FIG. 13 perspectively shows an inside structure of the display device 1 of FIG. 3 seen obliquely from the rear upper side. In FIG. 13, a first cam 8, a second cam 9 (to be described later), the first lid 4, the second lid 5 and a part of a lid rail 10 are omitted for the purpose of better showing the inside structure of the display device 1.

Also, in the slide base 13, the drive shaft 13k is rotatably attached in the drive hole 13n in an orthogonal direction to the travel direction (direction indicated by the arrows α2 and α3 shown in FIG. 8A) of the slide base 13. A pinion (travel control means, travel means) 13p is fixed at each of both ends of the drive shaft 13k as shown in FIG. 13. The drive shaft 13k drives the second cam 9 to drive the second lid 5. And, the pinion 13p drives the first cam 8 to drive the first lid 4.

<First Cam 8, Second Cam 9, Lid Rail 10>

As shown in FIG. 6, positioned from the inside, the second cam (travel control means, travel means, second cover travel body) 9 to travel the second lid 5, the first cam (travel control means, travel means, first cover travel body) 8 to travel the first lid 4 (refer to FIG. 1), and a couple of lid rails (cover guide body, travel control means) 10 to guide the track of opening and closing of the first lid 4 and the second lid 5 are provided at a side of both sides of the display device 1.

That is to say, when viewed from the front of the display device 1, the second cam 9, the first cam 8, and the couple of lid rails 10 are provided in pairs at both sides so as to be symmetrically arranged in the horizontal direction. Therefore, description will be made of the second cam 9, the first cam 8, and the couple of lid rails 10 provided at one of the both sides, and description thereof provided at the other one of the both sides will be omitted.

<Second Cam 9>

Figure 14A:
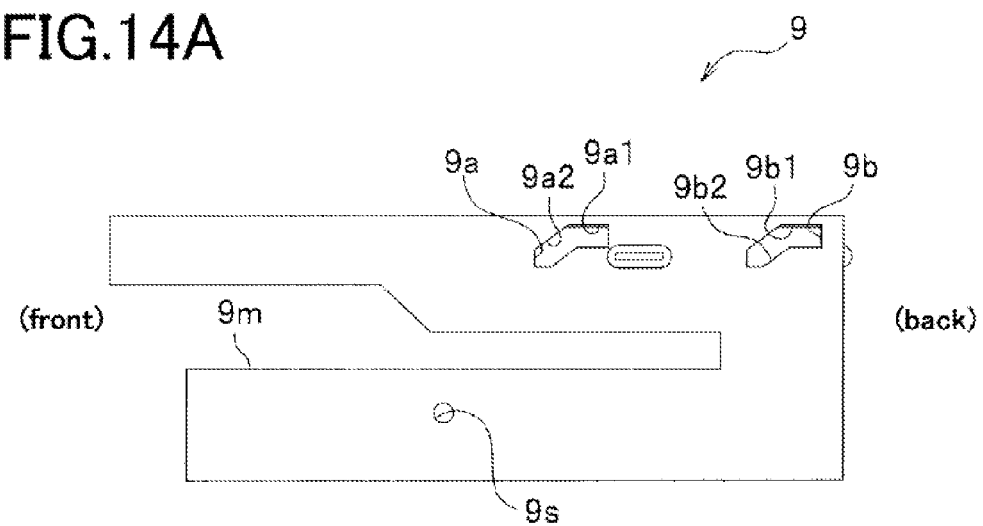
FIG. 14A is a view of a second cam seen from an inside.
Figure 14B:
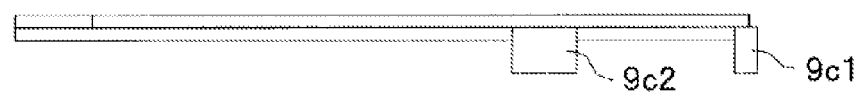
FIG. 14B is a view of the second cam seen from the lower side.
Figure 14C:
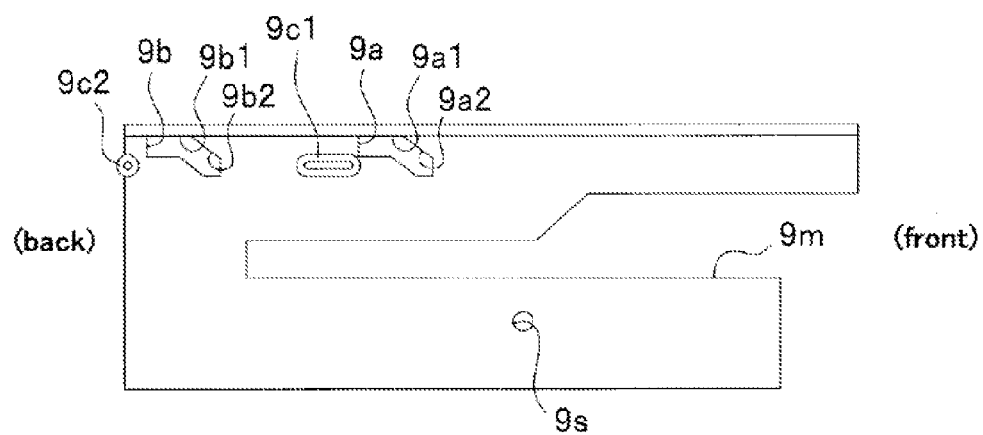
FIG. 14C is a view of the second cam seen from an outside.
Figure 14D:
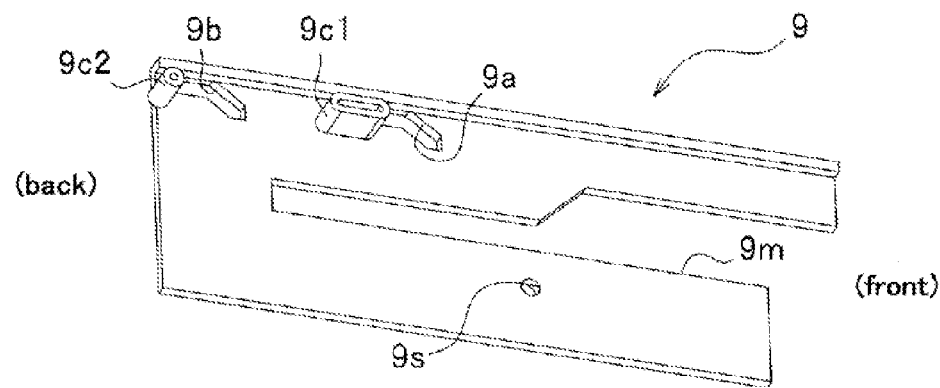
FIG. 14D is a perspective view of the second cam seen from a rear lower side.

FIG. 14A shows the second cam 9 viewed from the inside, FIG. 14B shows the second cam 9 viewed from a lower side, FIG. 14C shows the second cam 9 viewed from the outside, and FIG. 14D perspectively shows the second cam 9 viewed from the rear lower side.

The second cam 9 is a member to perform action of opening and closing the second lid 5 (refer to FIG. 1) and is formed to have a rectangular flat plate shape extending in the front and rear direction.

A shaft insertion hole (through-hole) 9s, through which the drive shaft 13k supported by the slide base 13 shown in FIG. 6B is inserted, is formed at the second cam 9. The second cam 9 is caused to move by the drive shaft 13k in the front and rear direction based on the linear motion of the slide base 13 moving in the front and rear direction (direction indicated by the arrows α2 and a3 shown in FIG. 6B).

A second front guide groove (second guide hole) 9a to guide a front boss 5p1 (refer to FIG. 5) of the second lid 5, and a second rear guide groove (second guide hole) 9b to guide a rear boss 5p2 of the second lid 5 are formed at the second cam 9.

The second front guide groove 9a includes a parallel portion (parallel straight line portion) 9a1 formed horizontally, and a second inclined descendent portion (inclined portion) 9a2 formed to extend continuously from an end of the parallel portion 9a1 so as to be inclined downward. An angle made between the parallel portion 9a1 and the second inclined descendent portion 9a2 can be arbitrarily determined, for example, 45 degrees.

The second rear guide groove 9b includes a parallel portion (parallel straight line portion) 9b1, and a second inclined descendent portion (inclined portion) 9a2 formed to extend continuously from an end of the parallel portion 9b1 so as to be inclined downward. An angle made between the parallel portion 9b1 and the second inclined descendent portion 9b2 can be arbitrarily determined, for example, 45 degrees.

In this connection, it is more preferable if the angle between the parallel portion 9a1 and the second inclined descendent portion 9a2 is set, as shown in FIGS. 14A and 14C, equal to the angle between the parallel portion 9b1 and the second inclined descendent portion 9b2, because the second lid 5 can be caused to travel without inclination.

When the second lid 5 shown in FIG. 1 is to be closed, the parallel portion 9a1 of the second front guide groove 9a and the parallel portion 9b1 of the second rear guide groove 9b act to guide the second lid 5 forward to thereby close the opening 2a1.

When the second lid 5 shown in FIG. 2 is to be opened, the second inclined descendent portion 9a2 of the second front guide groove 9a and the second inclined descendent portion 9b2 of the second rear guide groove 9b act to guide the second lid 5 rearward to thereby open the opening 2a1.

Also, the second cam 9 includes a relief groove 9m (refer to FIG. 14) having a recess shape and serving as clearance for a first front boss 4p1 (refer to FIG. 4) of the first lid 4.

As shown in FIG. 6B, due to the provision of the relief groove 9m of the second cam 9, the first front boss 4p1 of the first lid 4 can duly act without interruption.

And, the second cam 9 includes a front guide boss 9c1 and a rear guide boss 9c2 which project outward, and which are set in a second guide groove 10b (refer to FIG. 16) of the lid rail 10, whereby the front and rear direction linear motion is guided.

<First Cam 8>

Figure 15A:
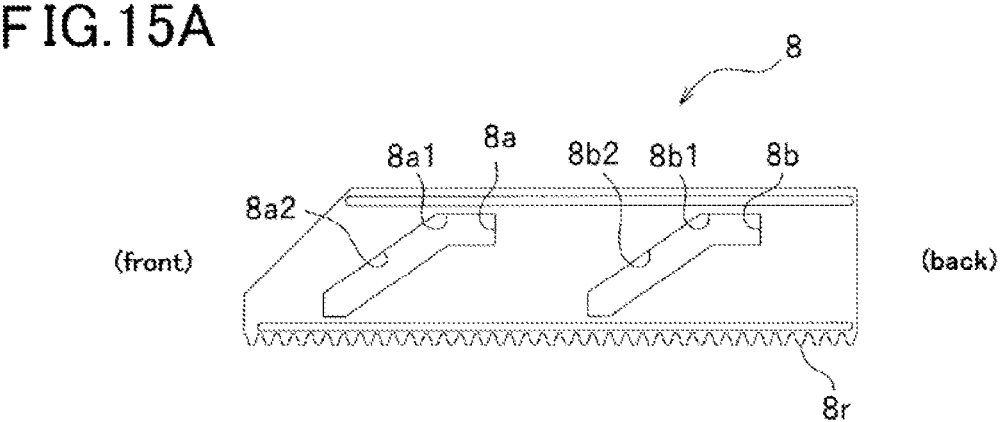
FIG. 15A is a view of a first cam seen from the inside.
Figure 15B:
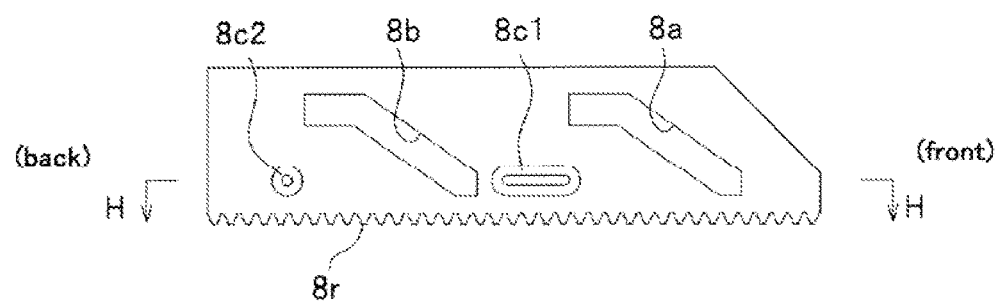
FIG. 15B is a view of the first cam seen from the outside.
Figure 15C:
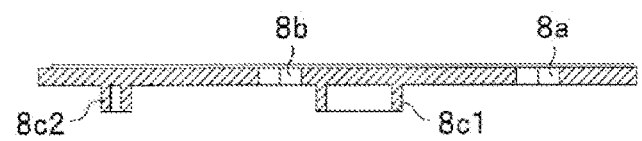
FIG. 15C is a cross sectional view of a portion of FIG. 15B taken along a line H-H.
Figure 15D:
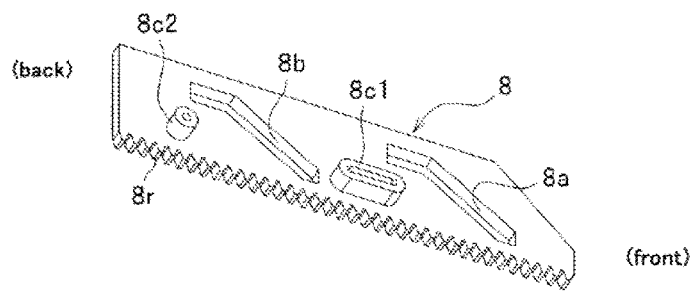
FIG. 15D is a perspective view of the first cam seen from the rear lower side.

FIG. 15A shows the first cam 8 viewed from the inside, FIG. 15B shows the first cam 8 viewed from the outside, FIG. 15C shows a cross section of the first cam 8 taken along a line H-H shown in FIG. 15B, and FIG. 15D perspectively shows the first cam 8 viewed from the rear lower side.

The first cam 8 is a member to perform action of opening and closing the first lid 4 (refer to FIG. 1) and is formed to have a rectangular flat plate shape extending in the front and rear direction.

A rack (travel control means, travel means) 8r is formed at a lower end rim of the first cam 8 so as to engage with the pinion 13p from the above which is fixed to each of the both ends of the drive shaft 13k shown FIG. 13. The first cam 8 is caused to move in the front and rear direction by the rotation movement of the pinion 13p when the slide base 13 shown in FIG. 8A moves linearly in the front and rear direction (direction indicated by the arrows α2 and α3 shown in FIG. 8A).

The first cam 8 includes a first front guide groove (first guide hole) 8a to guide the front boss 4p1 (refer to FIG. 4) of the first lid 4, and a first rear guide groove (first guide hole) 8b to guide a first rear boss 4p2 of the first lid 4.

The first front guide groove 8a includes a parallel portion (parallel straight line portion) 8a1 formed horizontally, and a first inclined descendent portion (inclined portion) 8a2 extending continuously from an end of the parallel portion 8a1 so as to inclined downward. An angle made between the parallel portion 8a1 and the first inclined descendent portion 8a2 can be arbitrarily determined, for example, 45 degrees.

The first rear guide groove 8b includes a parallel portion (parallel straight line portion) 8b1 formed horizontally, and a first inclined descendent portion (inclined portion) 8b2 extending continuously from an end of the parallel portion 8b1 so as to inclined downward. An angle made between the parallel portion 8b1 and the first inclined descendent portion 8b2 can be arbitrarily determined, for example, 45 degrees.

In this connection, it is more preferable if the angle between the parallel portion 8a1 and the first inclined descendent portion 8a2 is set, as shown in FIGS. 15A and 15B, equal to the angle between the parallel portion 8b1 and the first inclined descendent portion 8b2, because the first lid 4 can be caused to travel without inclination.

When the first lid 4 shown in FIG. 1 is to be closed, the parallel portion 8a1 of the first front guide groove 8a and the parallel portion 8b1 of the first rear guide groove 8b act to guide the first lid 4 forward to thereby close the opening 2a1.

When the first lid 4 shown in FIG. 2 is to be opened, the first inclined descendent portion 8a2 of the first front guide groove 8a and the first inclined descendent portion 8b2 of the first rear guide groove 8b act to guide the first lid 4 rearward to thereby open the opening 2a1.

And, the first cam 8 includes a front guide boss 8c1 and a rear guide boss 8c2 which project outward, and which are set in a first guide groove 10a (refer to FIG. 16) of the lid rail 10, whereby the front and rear direction linear motion is guided.

<Lid Rail 10>

Figure 16A:
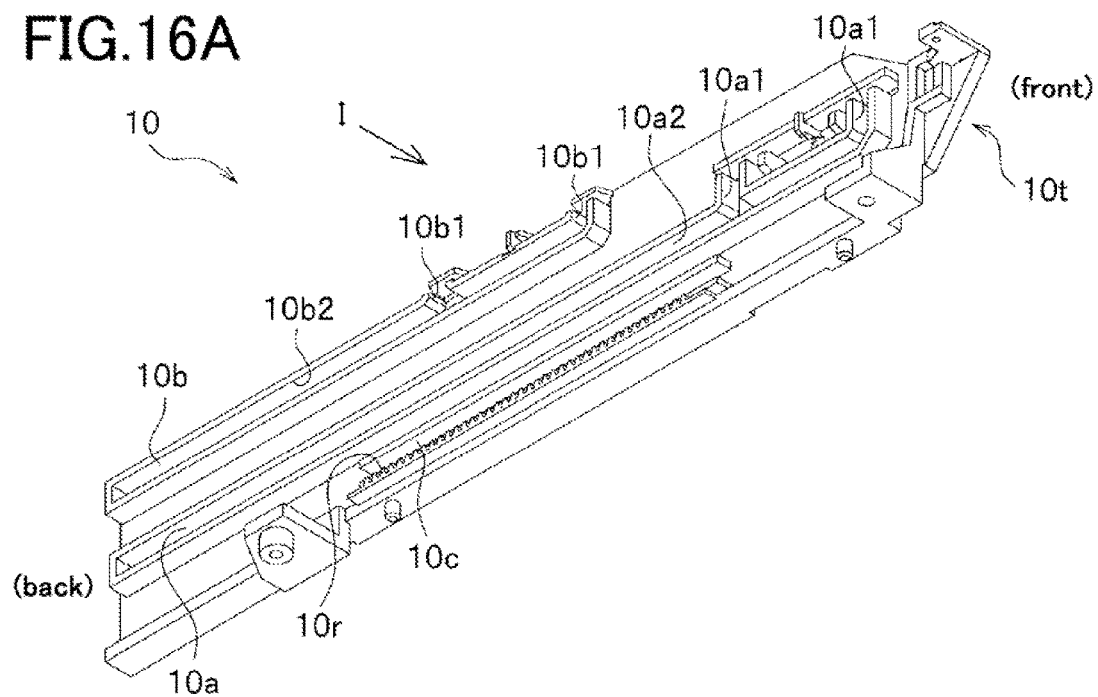
FIG. 16A is a perspective view of a lid rail seen obliquely from the inside and the front lower side.
Figure 16B:
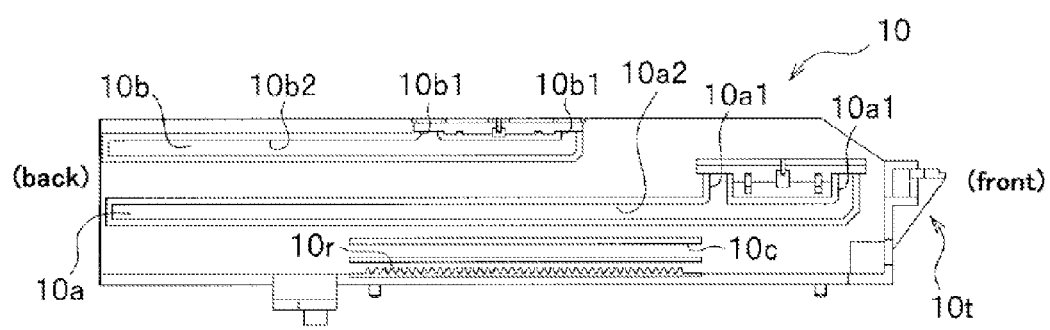
FIG. 16B is an inside view of the lid rail seen from the inside in a direction indicated by an arrow I shown in FIG. 16A.
Figure 16C:
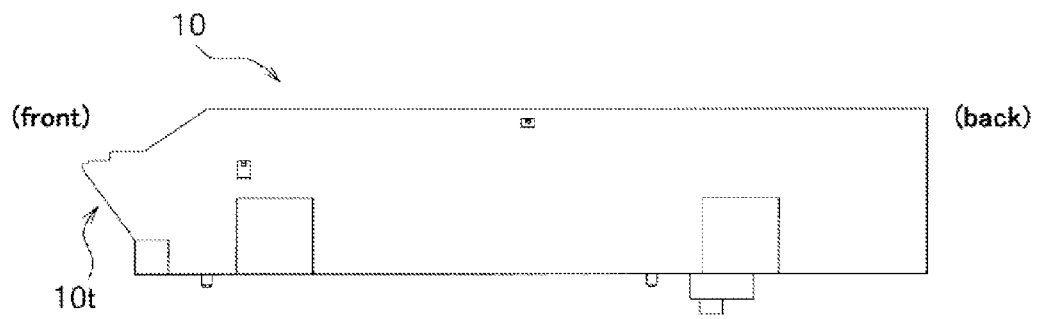
FIG. 16C is a side view of the lid rail seen from the outside.

FIG. 16A perspectively shows an inside of the lid rail 10 viewed obliquely from the front lower side, FIG. 16B shows the lid rail 10 viewed from the inside in a direction indicated by an arrow I shown in FIG. 16A, and FIG. 16C shows the lid rail 10 viewed from the outside.

The lid rails 10 are provided in pairs symmetrically at right and left sides, but since a lid closing detection switch sw1 (refer to FIG. 8A) is arranged only at the lid rail 10 provided on the observer's right, description will be made of the lid rail 10 provided on the observer's right (at a lower side of paper of FIG. 8A).

The lid rail 10 is arranged immediately inside each of side plates 2t, 3t (refer to FIG. 2) of the upper case 2 and the lower case 3 and guides the first cam 8 and the second cam 9 in the front and rear direction.

Also, the lid rail 10 guides the first cam 8, the second cam 9, the first lid 4 and the second lid 5 in the front and rear direction, whereby the opening 2a1 can be duly opened and closed by the first lid 4 and the second lid 5 as shown FIGS. 1 and 2.

In the lid rail 10, a first guide groove (third guide hole) 10a, in which the front boss 4p1 and the first rear boss 4p2 of the first lid 4 shown in FIG. 4 are set and guided, and also in which the front guide boss 8c1 and the rear guide boss 8c2 of the first cam 8 shown in FIG. 15 are set and guided, is formed such that a rib is projected inward.

The first guide groove 10a includes a first vertical guide groove 10a1 to guide the first lid 4 upward when closing the first lid 4 shown in FIG. 1, and a first horizontal guide groove 10a2 to guide the first cam 8 and the first lid 4 rearward when opening the first lid 4 shown in FIG. 2.

Also, in the lid rail 10, a second guide groove (fourth guide hole) 10b, in which the front boss 5p1 and the second rear boss 5p2 of the second lid 5 shown in FIG. 5 are set and guided, and also in which the front guide boss 9c1 and the rear guide boss 9c2 of the second cam 9 shown in FIG. 14 are set and guided, is formed such that a rib is projected inward.

The second guide groove 10b includes a second vertical guide groove 10b1 to guide the second lid 5 upward when closing the second lid 5 shown in FIG. 1, and a second horizontal guide groove 10b2 to guide the second cam 9 and the second lid 5 rearward when opening the second lid 5 shown in FIG. 2.

A rack 10r which is engaged with the pinion 13p fixed to each of the both ends of the drive shaft 13k below the lid rail 10 is formed at the lower portion of the lid rail 10. Immediately above the rack 10r, a drive shaft guide groove 10c, which has a linear shape, and in which an end portion 13a (refer to FIG. 13) of the drive shaft 13k having the pinion 13p fixed thereto is set and guided in the front and rear direction, is formed such that a rib is projected in an inward direction.

In a front portion of the lid rail 10, an attaching portion 10t is provided to which the lid closing detection switch sw1 (refer to FIG. 8A) is attached which detects that the first lid 4 and the second lid 5 are closed, as shown in FIG. 1.

<Action of Pinion 13p of Drive Shaft 13k, Second Cam 9 and First Cam 8>

The end portion 13a of the drive shaft 13k is rotatably and slidably engaged with the drive shaft guide groove 10c provided at each of the right and left lid rails 10. Also, the pinion 13p fixed to the drive shaft 13k is engaged with the rack 10r of the lid rail 10 and therefore is rotated on the rack 10r of the lid rail 10 when the slide base 13 moves in the front and rear direction (direction indicated by arrows α2 and α3 shown in FIG. 8A).

Since the shaft insertion hole 9s through which the drive shaft 13k is rotatably inserted is formed at each of the right and left second cams 9 (refer to FIG. 14), the right and left second cams 9 travel in the front and rear direction at a speed same as a speed of the slide base 13.

The second front boss 5p1 and the second rear boss 5p2 are set respectively in the second front guide groove 9a and the second rear guide groove 9b of the second cam 9 and make contact in the front and read direction, whereby the second lid 5 is caused to move in the front and read direction.

Meanwhile, since the rack 8r of the first cam 8 is engaged with the pinion 13p at an upper location of the pinion 13p, the both right and left first cams 8 (refer to FIG. 15) are caused to move in the front and second direction at a speed same as a circumferential speed of the pinion 13p.

The first front boss 4p1 and the first rear boss 4p2 are set respectively in the first front guide groove 8a and the first rear guide groove 8b of the first cam 8 and make contact in the front and rear direction, whereby the first lid 4 is caused to move in the front and rear direction.

Since a ratio of a front and rear direction travel distance of a center (drive shaft 13k, slide base 13) of the pinion 13p to a circumferential travel distance of the pinion 13p corresponds to a ratio of a radius of the pinion 13p to a diameter of the pinion 13p, the circumferential travel distance of the pinion 13p is equal to twice the front and rear direction travel distance of the center (slide base 13) of the pinion 13p.

Accordingly, the right and left first cams 8 move in the front and rear direction at a speed equal to twice a speed of the right and left second cams 9, and therefore the first lid 4 moves in the front and second direction at a speed equal to twice a speed of the second lid 5.

From a position where the opening 2a1 is closed by the first lid 4 and the second lid 5 as shown in FIG. 1 to a position where the opening 2a1 is opened by the first lid 4 and the second lid 5 as shown in FIG. 2, the first lid 4 travels for a distance equal to substantially twice a travel distance of the second lid 5, but since the first lid 4 moves at a speed equal to substantially twice a speed of the second lid 5, the first lid 4 and the second lid 5 reach the storage position shown in FIG. 2 almost at the same time.

In this connection, since the first cam 8 and the second cam 9 are regulated from moving in the up and down direction respectively by the first guide groove 10a and the second guide groove 10b provided in the lid rail 10, an engagement between the pinion 13p and the first cam 8 is maintained.

<Configuration of Rise-Up and Retraction Action of Combiner 6>

Description will now be made of configuration of rise-up and retraction action of the combiner 6.

As shown in FIGS. 6 and 8A, the aforementioned tilt rack (second travel body) 17, which includes combiner rotation racks (display portion drive gear portions) 17c1 and 17c2 to drive action of raising up and retracting the combiner 6, is provided at a front of the inside of the display device 1, so as to be freely movable in the front and rear direction.

Meanwhile, the combiner 6 is fixed to a combiner support 6s by screwing and thus supported by the combiner support 6s.

Gears 6g (refer to FIGS. 13 and 34) are provided in pairs at right and left ends of the combiner support 6s.

The rise-up (refer to FIG. 3) and retraction (refer to FIG. 2) action of the combiner 6 is performed such that the gears 6 of the combiner support 6s are engaged with the combiner rotation racks 17c1 and 17c2 of the tilt rack 17 as shown in FIG. 13.

<Tilt Rack 17>

Figure 17A:
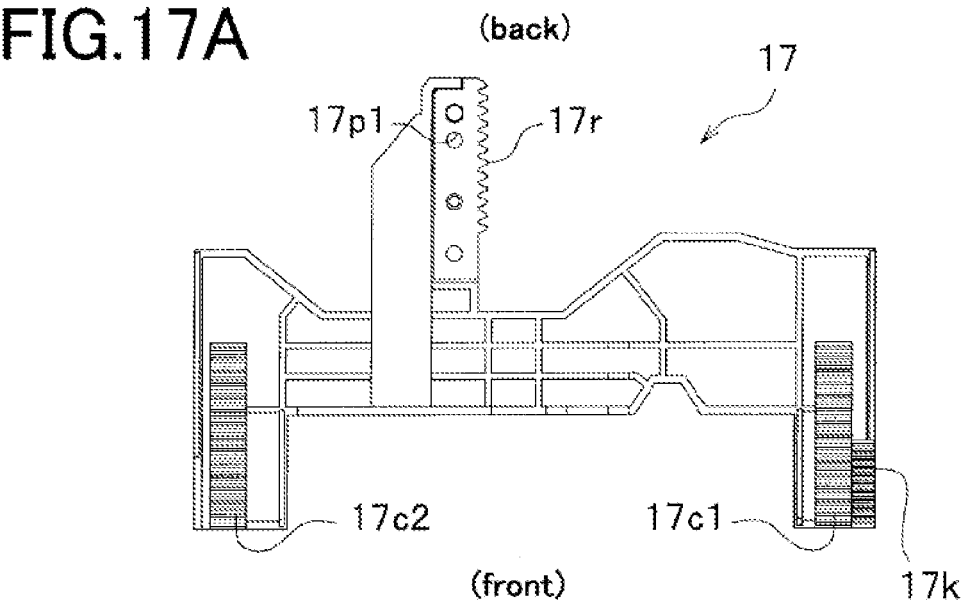
FIG. 17A is a top plan view of a tilt rack seen from the upper side.
Figure 17B:
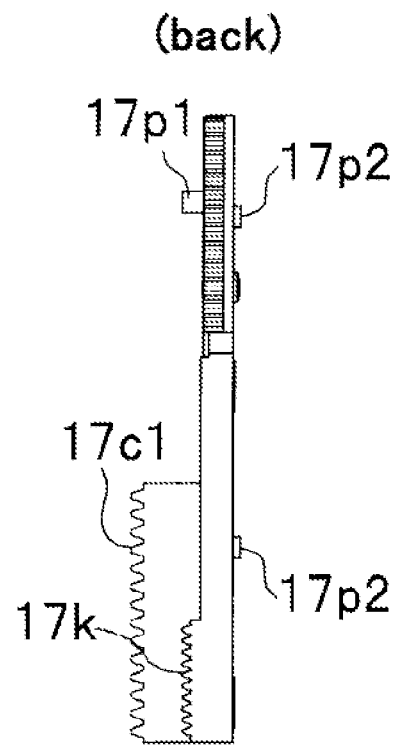
FIG. 17B is a right side view of the tilt rack.
Figure 17C:
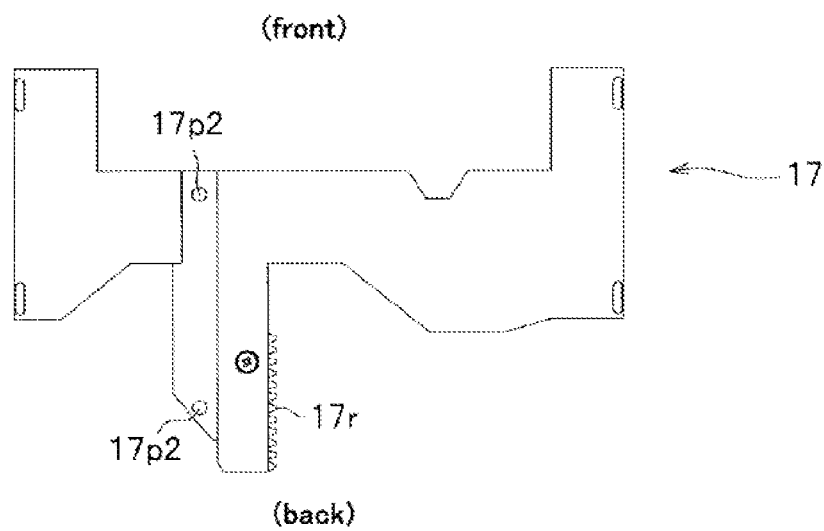
FIG. 17C is a bottom plan view of the tilt rack seen from the lower side.
Figure 17D:
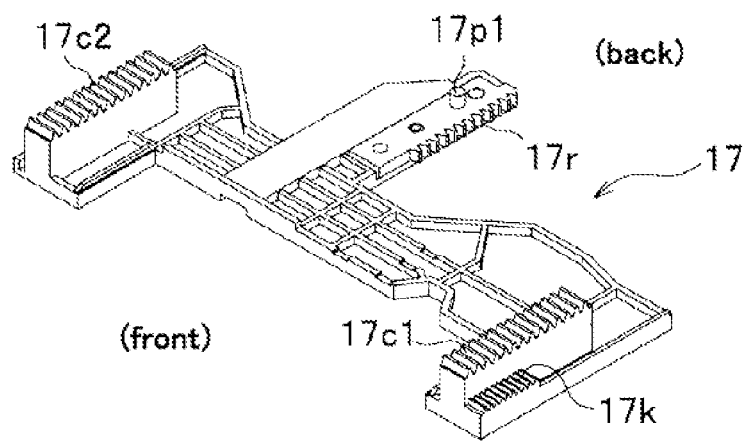
FIG. 17D is a perspective view of the tilt rack seen obliquely from the front upper side.

FIG. 17A shows, in top plan, the tilt rack 17 seen from the upper side, FIG. 17B shows a right side of the tilt rack 17, FIG. 17C shows, in bottom plan, the tilt rack 17 seen from the lower side, and FIG. 17D perspectively shows the tilt rack 17 seen obliquely from the front upper side.

The combiner rotation racks 17c1 and 17c2 are provided in pairs at respective ends of the tilt rack 17 so as to extend in the front and rear direction.

An angle detection rack (angle detection gear portion) 17k, which is engaged with an angle detection gear (gear portion) 14g used in an angle sensor (angle detector) 18 to detect that the combiner 6 is raised up, is provided outside the combiner rotation rack 17c1 so as to extend in the front and rear direction with a pitch shorter than a pitch of the combiner rotation rack 17c1.

The aforementioned combiner drive rack 17r, which is engaged with the partial gear 20g2 of the main cam 20, is provided at the rear of the tilt rack 17 so as to extend in the front and rear direction.

A guide pin 17p1 is provided by press fitting or the like at the rear of the combiner drive rack 17r of the tilt rack 17 so as to protrude upward. The guide pin 17p1 is made of stainless steel (SUS304) or the like.

The travel direction guide pins 17p2, which guide the tilt rack 17 in the front and rear direction of the display device 1, are provided in pairs at the lower side of the tilt rack 17 so as to protrude downward.

<Rise-Up and Retraction Action of Combiner 6>

The combiner drive rack 17r of the tilt rack 17 is provided and located below the main cam 20 shown in FIG. 6B.

And, the guide pin 17p1 of the tilt rack 17 is inserted in a combiner guide rib 20k (refer to FIGS. 7A and 7B) of the main cam 20 and is guided along the track of the combiner guide rib 20k.

Specifically, since the combiner relief rib 20k1 of the combiner guide rib 20k of the main cam 20 has a constant radius, the tilt rack 17 is prevented from traveling in the front and rear direction while the guide pin 17p1 of the tilt rack 17 is located within the combiner relief rib 20k1 (that is, when the first lid 4 and the second lid 5 shown in FIG. 1 are closed, and when the first lid 4 and the second lid 5 are being opened and closed). That is to say, the combiner 6 actuated by the tilt rack 17 is kept stored.

And, after the first lid 4 and the second lid 5 are completely opened as shown in FIG. 2, the guide pin 17p1 of the tilt rack 17 travels to the combiner actuating rib 20k2 (refer to FIGS. 7A and 7D) having its diameter gradually decreasing and is guided, whereby the tilt rack 17 is moved toward the partial gear 20g2 of the main cam 20.

Consequently, the combiner drive rack 17r of the tilt rack 17 and the partial gear 20g2 of the main cam 20 are engaged with each other, whereby the tilt rack 17 travels rearward (direction indicated by the arrow α3 shown in FIG. 8A) or forward (direction indicated by the arrow α2 shown in FIG. 8A).

When the tilt rack 17 travels rearward or forward, the combiner rotation racks 17c1 and 17c2 of the tilt rack 17 are engaged with a gear 6g of the combiner 6 as shown in FIG. 13, whereby the combiner 6 is raised up (refer to an arrow α1 shown in FIG. 13) and retracted.

<Detection Structure of Rise-Up of Combiner 6>

Figure 18A:
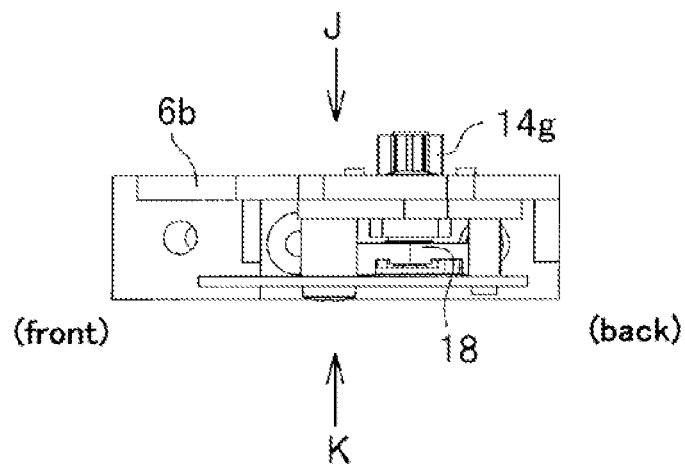
FIG. 18A is an enlarged view of a portion indicated by G shown in FIG. 8A.
Figure 18B:
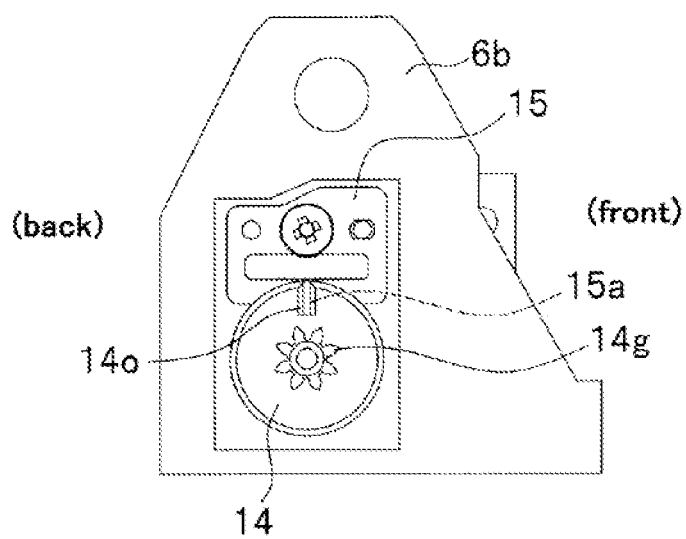
FIG. 18B is a side view of the portion shown in FIG. 18A seen in a direction indicated by an arrow J shown in FIG. 18A.
Figure 18C:
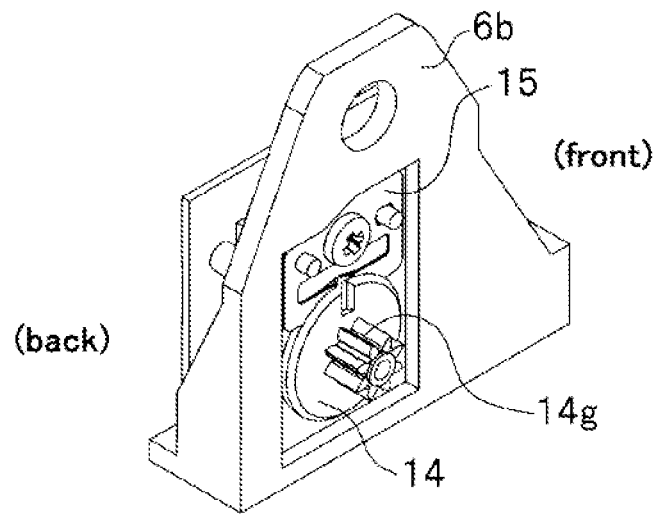
FIG. 18C is a perspective view of a combiner rise-up detection structure shown in FIG. 18B seen from the inside and obliquely from the rear upper side.
Figure 18D:
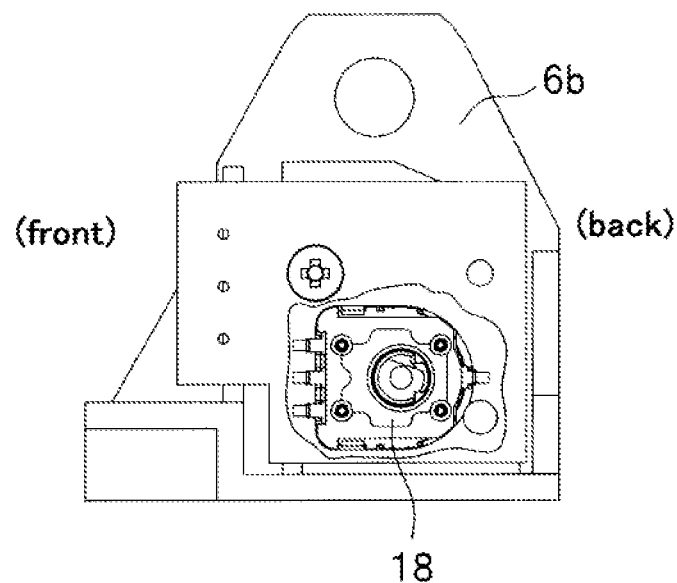
FIG. 18D is a side view of the portion shown in FIG. 18A seen in a direction indicated by an arrow K shown in FIG. 18A, wherein a part is cut out.

FIG. 18A shows, in an enlarged manner, an area enclosed by an ellipse indicated by G shown in FIG. 8A, FIG. 18B shows the area shown in FIG. 18A seen in a direction indicated by J shown in FIG. 18A, FIG. 18C shows a configuration of a detection structure of rise-up of the combiner 6 seen from the inside and obliquely from the rear upper side, and FIG. 18D shows the area shown in FIG. 18A seen in a direction indicated by K shown in FIG. 18A wherein a portion is cut out. In FIGS. 18A to 18D, a portion near the angle sensor 18 is extracted and shown, and the other portions are left out.

As shown in FIG. 13, the combiner 6 is fixed to the combiner support 6s, and the combiner support 6s is rotatably attached to a combiner bracket 6b attached to a base 3b fixed to the lower case 3.

The angle sensor 18 to detect the rise-up position of the combiner 6 is provided at a support portion of the combiner

6 as shown in FIGS. 8A and 18A. As shown in FIGS. 18A to 18D, a rotary circular plate 14 having an angle detection gear 14g is rotatably supported at the combiner bracket 6b so as to oppose the angle sensor 18. A shaft of the rotary circular plate 14 is inserted in a rotation detection hole of the angle sensor 18, and the shaft of the rotary circular plate 14 and the rotation detection structure of the angle sensor 18 rotate together without rattling.

The angle sensor 18 detects a rotation angle of the rotary circular plate 14 thereby detecting the rise-up position of the combiner 6.

As shown in FIG. 17D, the angle detection rack 17k is provided with a pitch shorter than a pitch of the combiner rotation rack 17c1.

In order to efficiently detect an angle of the combiner 6, detection is performed only at a rise-up angle of the combiner 6 ranging around 80 degrees, and a gear portion of the angle detection rack 17 is formed on a basis of a gear portion of the combiner rotation rack 17c1.

The angle detection gear 14g engages with the angle detection rack 17k of the tilt rack 17 shown in FIG. 8A when the combiner 6 is nearly raised up (around 80 degrees of the rise-up angle of the combiner 6), and thus resolution capability of detection angle of the angle detection gear 14g is enhanced When the combiner 6 is postured far away from the rise-up position, the angle sensor 18 must be set to show an initial angle. So, in order to verify the initial position, a boss 15a of a plate spring 15 is inserted in a notch 140 formed at the rotary circular plate 14. With the configuration, the initial angle for angle detection can be secured by the boss 15a of the plate spring 15 at rotation of the rotary circular plate 14.

FIGS. 19A to 19D show relative position relations between the angle detection gear 14g and the angle detection rack 17k which correspond to rise-up and retraction positions of the combiner 6, wherein the angle detection gear 14g and the angle detection rack 17 are seen such that the angle detection gear 4g is cross-sectioned.

Figure 19A:
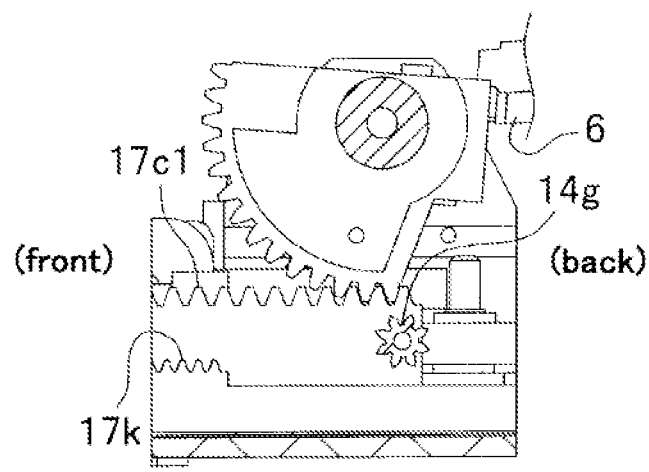
FIG. 19A is a schematic view of a relative positional relation between an angle detection gear and an angle detection rack, seen when the combiner is retracted for storage.
Figure 19B:
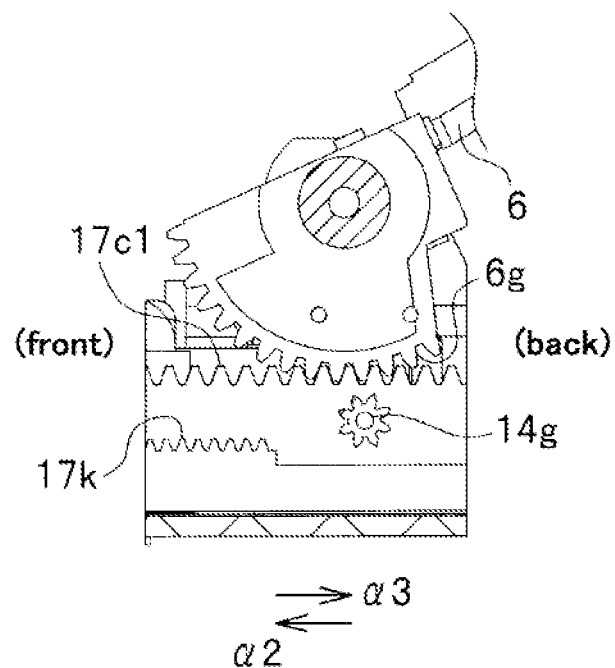
FIG. 19B is a schematic view of a relative positional relation between the angle detection gear and the angle detection rack, seen immediately after the combiner starts being raised up.
Figure 19C:
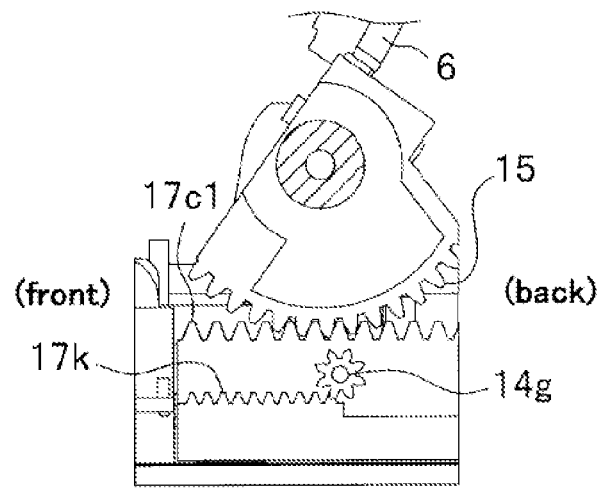
FIG. 19C is a schematic view of a relative positional relation between the angle detection gear and the angle detection rack, seen when the combiner is located close to rise-up position.
Figure 19D:
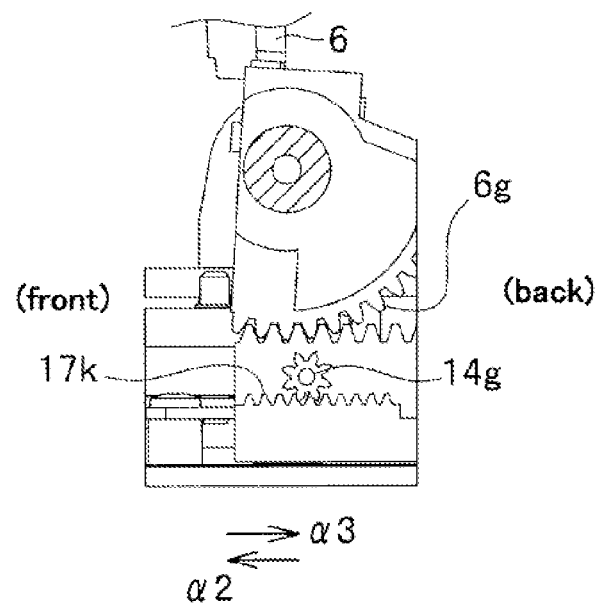
FIG. 19D is a schematic view of a relative positional relation between the angle detection gear and the angle detection rack, seen when the combiner is raised up.

FIG. 19A shows a relative position relation between the angle detection gear 14g and the angle detection rack 17k when the combiner 6 is retracted for storage, FIG. 19B shows a relative position relation between the angle detection gear 14g and the angle detection rack 17k immediately after the combiner 6 starts rising up, FIG. 19C shows a relative position relation between the angle detection gear 14g and the angle detection rack 17k when the combiner 6 is situated close to the rise-up position, and FIG. 19D shows a relative position relation between the angle detection gear 14g and the angle detection rack 17k when the combiner 6 is raised up.

With the above configuration, when the tilt rack 17 is caused to travel by the drive of the motor 7 rearward (direction indicated by the arrow α3 shown in FIG. 8A) from the position in which the combiner 6 is retracted and stored, the angle detection gear 14g and the angle detection rack 17k move from the position of FIG. 19A into the position of FIG. 19B.

And, when the combiner 6 is raised up gradually from the position of FIG. 2 in which the combiner 6 is retracted, the angle detection gear 14g of the rotary circular plate 14 and the angle detection rack 17k of the tilt rack 17 are engaged with each other and are rotated as shown in FIG. 19C.

And then, when the combiner 6 reaches the rise-up position, the position becomes as shown in FIG. 19D and the rotation angle of the rotary circular plate 14 is detected by the angle sensor 18, whereby the rise-up position of the combiner 6 is detected.

By contraries, when the combiner 6 moves from the rise-up position of FIG. 3 into the retraction position of FIG. 2, the tilt rack 17 is caused to travel by the drive of the motor 7 forward (direction indicated by the arrow α2 shown in FIG. 8A), and the position shown in FIG. 19D transits into the position shown in FIG. 19A.

Specifically, when the tilt rack 17 travels forward (direction indicated by the arrow α2 shown in FIG. 8A) from the position of FIG. 19D and via the position of FIG. 19C, the engagement between the angle detection rack 17k of the tilt rack 17 and the angle detection gear 14g of the rotary circular plate 14 is released (refer to FIG. 19B), and the boss 15a of the plate spring 15 is inserted in the notch 14o formed at the rotary circular plate 14. At this time, the angle sensor 18 is set in position to detect the initial position.

Subsequently, the position relation between the angle detection rack 17k of the tilt rack 17 and the angle detection gear 14g of the rotary circular plate 14 becomes as shown in FIG. 19A, and the combiner 6 is set in the out-of-use (retracted) position (refer to FIGS. 2 and 1).

<Detection of Closed Position of Opening 2a1>

Description will now be made of detection of the closed position of the opening 2a1 shown in FIGS. 1 and 2.

As described earlier, the opening 2a1 is opened and closed by the first lid 4 and the second lid 5.

The second lid 5 is closed such that the second cam 9 driven by the drive shaft 13k shown FIGS. 6B and 8A arrives at the front (to be detailed later). And, the first lid 4 is closed such that the first cam 8 (refer to FIG. 6) driven by the pinion 13p (refer to FIG. 13) fixed to the drive shaft 13k arrives at the front (to be detailed later).

The closing of the first lid 4 and the second lid 5 is detected in such a manner that the lid closing detection sensor (covering position detection means) sw1 provided at the front portion of the lid rail 10 as shown in the bottom portion of FIG. 8A is pressed by the tip portion of the second cam 9.

In this connection, it is configured such that even after the opening 2a1 is closed by the first lid 4 and the second lid 5, the second cam 9 travels forward (direction indicated by the arrow α2 shown in FIG. 8A) a little further to thereby make contact with the lid closing detection sensor sw1. Consequently, dimension errors of the first lid 4, the first cam 8, the second lid 5, the second cam 9 and the like and assembly errors can be cancelled thus reliably closing the opening 2a1.

<Support Structure when the Combiner 6 is Raised Up>

Figure 20A:
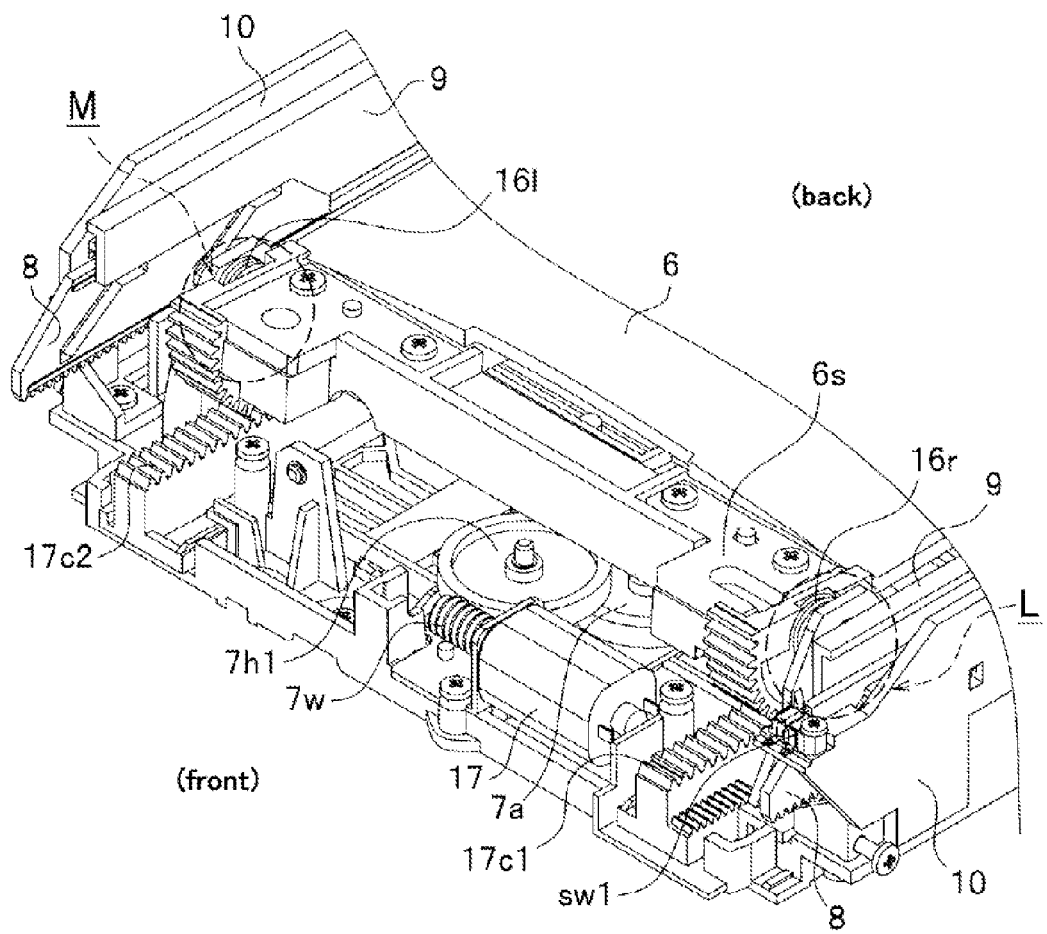
FIG. 20A is a perspective view of a combiner support structure seen obliquely from the upper side.
Figure 20B:
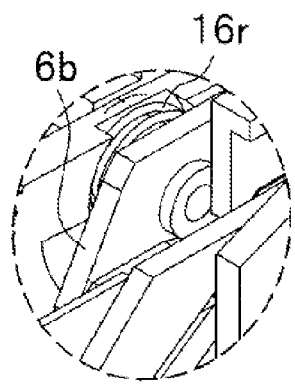
FIG. 20B is an enlarged view of an area enclosed by a circle indicated by L shown in FIG. 20A.
Figure 20C:
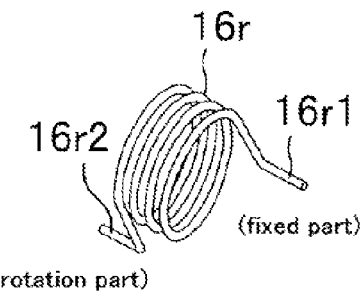
FIG. 20C is a perspective view of a right torsion coil spring, seen when the combiner is retracted.
Figure 20E:
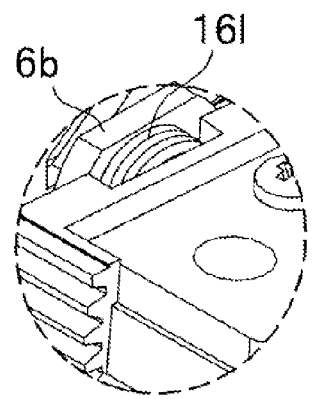
FIG. 20E is an enlarged view of an area enclosed by a circle indicated by M shown in FIG. 20A.
Figure 20D:
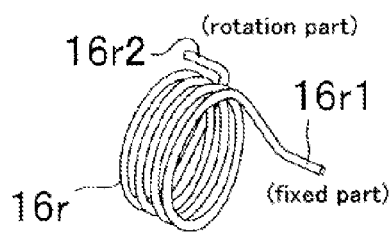
FIG. 20D is a perspective view of the right torsion coil spring, seen when the combiner is raised up.

FIG. 20A perspectively shows a support structure of the combiner 6 seen obliquely from the front upper side, seen when the combiner 6 is retracted and stored, FIG. 20B shows, in an enlarged manner, an area enclosed by a circle indicated by L shown in FIG. 20A, FIG. 20C perspectively shows a right torsion coil spring 16r, seen when the combiner 6 is retracted, and FIG. 20D perspectively shows the right torsion coil spring 16r, seen when the combiner 6 is raised up.

FIG. 20E shows, in an enlarged manner, an area enclosed by a circle indicated by M shown in FIG. 20A, FIG. 20F perspectively shows a left torsion coil spring 16l, seen when the combiner 6 is retracted, and FIG. 20G perspectively shows the left torsion coil spring 16l, seen when the combiner 6 is raised up.

The torsion coil springs (biasing means) 16r, 16l are symmetrically provided at both right and left sides.

One end 16r1 (refer to FIG. 20C) of the torsion coil spring 16r is engaged with the right combiner bracket 6b fixed to the base 3b, and the other end 16r2 (refer to FIG. 20C) of the torsion coil spring 16*r* is engaged with the combiner support 6*s* to which the combiner 6 is fixed.

When the combiner 6 is raised up, the other end 16*r*2 of the torsion coil spring 16*r* is rotated by the combiner support 6*s* as shown in FIG. 20D thereby providing the torsion coil spring 16*r* with elasticity, and an elastic force is generated to act in such a direction as to cause the combiner 6 to be retracted.

One end 16*l*1 (refer to FIG. 20F) of the torsion coil spring 16*l* is engaged with the left combiner bracket 6*b* fixed to the base 3*b*, and the other end 16*l*2 (refer to FIG. 20F) of the torsion coil spring 16*l* is engaged with the combiner support 6*s* to which the combiner 6 is fixed.

When the combiner 6 is raised up, the other end 16*l*2 of the torsion coil spring 16*l* is rotated by the combiner support 6*s* as shown in FIG. 20G thereby providing the torsion coil spring 16*l* with elasticity, and an elastic force is generated to act in such a direction as to cause the combiner 6 to be retracted.

FIG. 21 shows a graph of torque values in a direction of retraction of the combiner 6 in relation to rotation degrees of the combiner 6, wherein the horizontal axis indicates rotation angle (degrees) and the vertical axis indicates torque value (N.mm) in the direction of retraction of the combiner 6.

Since the horizontal distance between the rotation center of the combiner 6 and the gravity center of the combiner 6 becomes shorter in accordance with an increase in the rotation angle of the combiner 6, the torque value (thin solid line shown in FIG. 21) generated due to the weight of the combiner 6 in the direction of the retraction of the combiner 6 decreases.

The torque value (broken line shown in FIG. 21) generated due to the elasticity of the torsion coil springs 16*r*, 16*l* in the direction of the retraction of the combiner 6 increases in accordance with an increase in the elasticity of the torsion coil springs 16*r*, 16*l* resulting from an increase of the torsion displacement of the torsion coil springs 16*r*, 16*l*. The torsion coil springs 16*r*, 16*l* apply a given amount of elastic force in the direction of retraction of the combiner 6 raised up.

An aggregate amount of torque value (thick solid line shown in FIG. 21) increases with an increase of the rotation angle, wherein the torque value is defined as combination between the torque value generated due to the weight of the combiner 6 in the direction of the retraction of the combiner 6 and the torque value generated due to the elasticity of the torsion coil springs 16*r*, 16*l* in the direction of the retraction of the combiner 6.

Consequently, a torque is applied in the direction of retraction at a position of the combiner 6 raised up (around at a rotation angle of 90 degrees in FIG. 21).

As a result, the gear 6*g* of the combiner support 6*s* can surely make contact with the combiner rotation racks 17*c*1 and 17*c*2 of the tilt rack 17, whereby the combiner 6 raised up can be suppressed from vibrating due to disturbance.

And, it is configured such that the elastic force acting on the combiner 6 becomes reduced while the combiner 6 becomes retracted, and gets to "0" when the combiner 6 is completely retracted.

In this connection, if a prescribed torque value is applied to the combiner 6 raised up, it may be configured such that the elastic force acting on the combiner 6 gets to a value different from "0" when the combiner 6 is completely retracted, unlike as shown in FIG. 21.

<Opening and Closing Action of the Opening 2*a*1 by Means of the First Lid 4 and the Second Lid 5, and Rising Up Action of the Combiner 6>

Description will now be made of the action of opening and closing the opening 2*a*1 by means of the first lid 4 and the second lid 5, and the rising up action of the combiner 6.

<Summary of Opening and Closing Action of the Opening 2*a*1 by Means of the First Lid 4 and the Second Lid 5>

When the first lid 4 and the second lid 5 are closed as shown in FIG. 1, the inside of the display device 1 is as shown in FIG. 8.

The second lid 5 is driven by the second cam 9 as described earlier, and the second cam 9 is driven by the drive shaft 13*k* as shown in FIG. 6B.

Also, the first lid 4 is driven by the first cam 8, and the first cam 8 is driven by the rotation of the pinion 13*p* wherein the pinion 13*p* fixed to the drive shaft 13*k* shown in FIG. 13 is engaged with the rack 8*r* of the first cam 8. Meanwhile, the drive shaft 13*k* is supported with respect to its longitudinal direction at right and left sides by the slide base 13 and travels in the front and rear direction inside the display device 1 based on a linear movement of the slide base 13 moving in the front and rear direction (direction indicated by the arrows α2 and α3 shown in FIG. 8A.).

Therefore, the second cam 9 (refer to FIG. 6B) and the first cam 8 travel in the front and rear direction (direction indicated by the arrows α2 and α3 shown in FIG. 8A.) in accordance with a linear movement of the drive shaft 13*k* supported by the slide base 13 moving in the front and rear direction (direction indicated by the arrows α2 and α3 shown in FIG. 8A.), and then the first lid 4 and the second lid 5 travel in the front direction or in the rear direction, thereby realizing the closed position of the opening 2*a*1 with the first and second lids 4 and 5 moved to the front direction (refer to FIG. 1), and the opened position of the opening 2*a*1 with the first and second lids 4 and 5 moved to the rear direction (refer to FIGS. 2 and 3).

In the slide base 13, as shown in FIG. 8B, the guide pin 11*p* of the drive lever 11 passing through the pin insertion hole 12*a*1 of the clutch lever 12 is inserted through the slide hole 13*s*. The guide pin 11*p* of the drive lever 11 slides in the right and left direction in the slide hole 13*s* of the slide base 13 and also travels in the front and rear direction (direction indicated by the arrows α2 and α3 shown in FIG. 8A.), whereby the drive lever 11 travels in the front and rear direction (direction indicated by the arrows α2 and α3 shown in FIG. 8A.).

Since the guide pin 11*p* of the drive lever 11 passes through the pin insertion hole 12*a*1 of the clutch lever 12, the drive lever 11 and the clutch lever 12 perform a combination action.

When the first lid 4 and the second lid 5 are closed, the main cam 20 is rotated in a counterclockwise direction (direction indicated by the arrow γ2 shown in FIG. 8A) as shown in FIG. 8A. Then, a drive lever pressing rib 20*d* having a linear shape and provided at the upper side of the main cam 20 presses the drive lever 11 in the counterclockwise direction (direction indicated by the arrow γ2 shown in FIG. 8A), whereby the guide pin 11*p* of the drive lever 11 travels in the counterclockwise direction (direction indicated by the arrow γ2 shown in FIG. 8A).

Therefore, the slide base 13, through which the guide pin 11*p* is inserted, travels in the front direction (direction indicated by the arrow α2 shown in FIG. 8A), whereby the second cam 9 and the first cam 8 travel in the front direction (direction indicated by the arrow α2 shown in FIG. 8A), then first lid 4 and the second lid 5 situated at the position shown in FIG. 2 travel in the front direction (direction indicated by the arrow α2 shown in FIG. 2), and the opening 2a1 of the chassis k is closed by the first lid 4 and the second lid 5 as shown in FIG. 1.

Meanwhile, when the first lid 4 and the second lid 5 are opened, the main cam 20 is rotated in a clockwise direction (direction indicated by the arrow γ1 shown in FIG. 8A). Then, a clutch pressing rib 20c1 (refer to FIGS. 7A and 7C) of a clutch guide rib 20c provided at the lower side of the main cam 20 presses the lower plate 20b located at the lower side of the main cam 20 of the clutch lever 12 in the clockwise direction (direction indicated by the arrow γ1 shown in FIG. 8A). Therefore, the guide pin 11p of the drive lever 11 linked with the clutch lever 12 travels in the clockwise direction (direction indicated by the arrow γ1 shown in FIG. 8A).

Thus, the slide base 13, through which the guide pin 11p is inserted, travels in the rear direction (direction indicated by the arrow α3 shown in FIG. 8A), whereby the second cam 9 and the first cam 8 travel in the rear direction (direction indicated by the arrow α3 shown in FIG. 8A), then the first lid 4 and the second lid 5 situated at the position shown in FIG. 1 travel in the rear direction (direction indicated by the arrow α3 shown in FIG. 1), and the opening 2a1 of the chassis k is opened by the first lid 4 and the second lid 5 as shown in FIG. 2.

<Detail of Opening and Closing Action of the Opening 2a1 by Means of the First Lid 4 and the Second Lid 5>

Detailed description will now be made of the opening and closing action of the opening 2a1 by means of the first lid 4 and the second lid 5.

FIG. 22A to 26A schematically show, in side view, the action of the first cam 8, the second cam 9, the pinion 13p and the drive shaft 13, seen while the first lid 4 and the second lid 5 closed are opened, and FIGS. 22B to 26B schematically show, in side view, the position of the first lid 4 and the second lid 5 at respective positions of FIGS. 22A to 26A.

As described above, the action of opening and closing the opening 2a1 by the first lid 4 and the second lid 5 is performed by the slide base 13 (shown in FIG. 8A) traveling in the front and rear direction (refer to the arrows α2 and α3 shown in FIG. 8A).

That is, when the opening 2a1 is to be closed by the first lid 4 and the second lid 5 as shown in FIG. 1, the slide base 13 travels in the front direction (direction indicated by the arrow α2 shown in FIG. 8A), and when the opening 2a1 is to be opened by the first lid 4 and the second lid 5 as shown in FIG. 2, the slide base 13 travels in the rear direction (direction indicated by the arrow α3 shown in FIG. 8A).

Figure 22A:
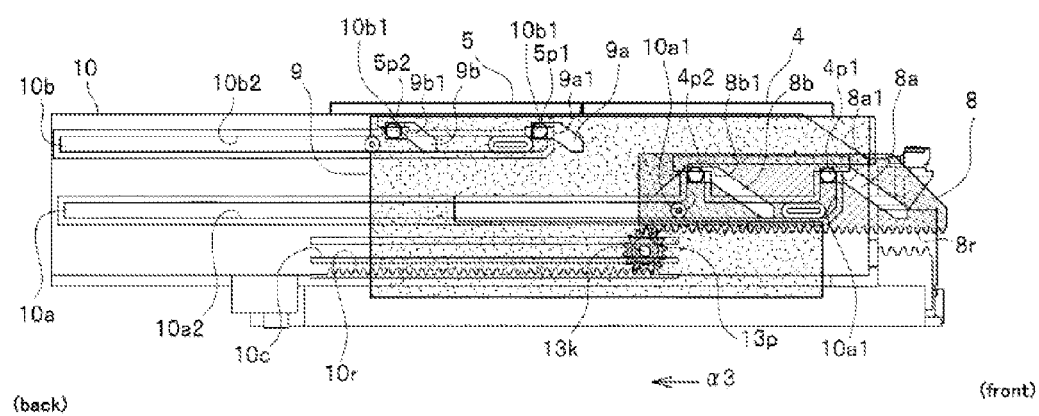
FIG. 22A is a schematic side view of action of the first cam, the second cam, a pinion and a drive shaft, while the first lid and the second lid which are closed are opened.
Figure 22B:
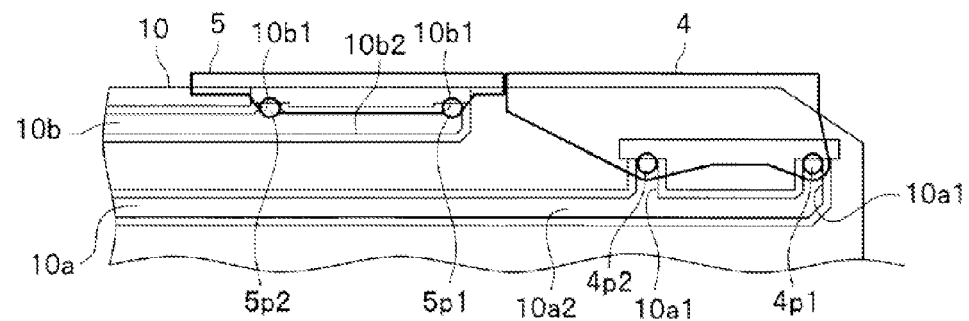
FIG. 22B is a schematic side view of position of the first lid and the second lid located at position of FIG. 22A.

Referring to FIG. 22A, the first front boss 4p1 and the first rear boss 4p2 of the first lid 4 are set in the first front guide groove 8a and the first rear guide groove 8b of the first cam 8 and also in the first guide groove 10a of the lid rail 10.

Meanwhile, the second front boss 5p1 and the second rear boss 5p2 of the second lid 5 are set in the second front guide groove 9a and the second rear groove 9b of the second cam 9 and also in the second guide groove 10b of the lid rail 10.

When the opening 2a1 is closed by the first lid 4 and the second lid 5 as shown in FIG. 1, the position is as shown in FIG. 22A. When the opening 2a1 is to be closed, the first front boss 4p1 and the first rear boss 4p2 of the first lid 4 are set and located at the upper end of the first vertical guide grooves 10a1, 10a1 of the first guide groove 10a of the lid rail 10. And, the second front boss 5p1 and the second rear boss 5p2 of the second lid 5 are set and located at the upper end of the second vertical guide grooves 10b1, 10b1 of the second guide groove 10b of the lid rail 10.

When the first lid 4 and the second lid 5 start traveling to be opened, the position is as described above.

In this connection, a vertical travel distance of the first lid 4, that is the first vertical guide groove 10a1, is set longer than the second vertical guide groove 10b1 in order to prevent the first lid 4 and the second lid 5 from interfering with each other when the first lid 4 and the second lid 5 travel horizontally.

Figure 27A:
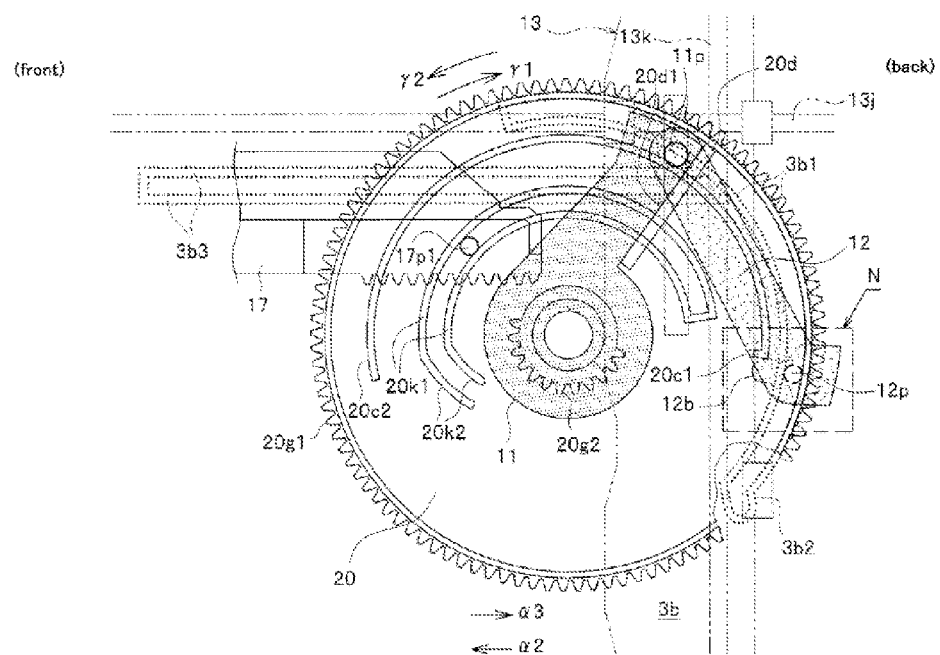
FIG. 27A is a transparent view of a portion close to the main cam, seen from the upper side while the first lid and the second lid are being opened.
Figure 27B:
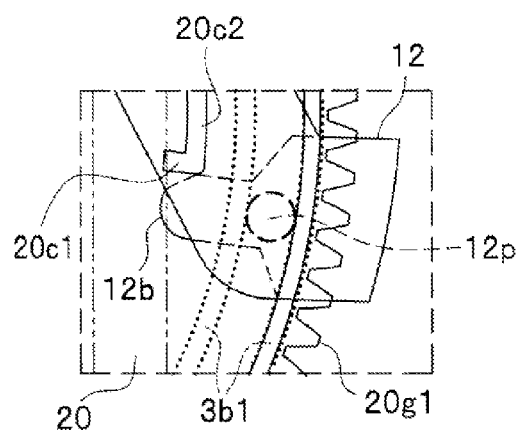
FIG. 27B is an enlarged view of an area enclosed by a rectangle indicated by N shown in FIG. 27A.

FIG. 27A transparently shows, in top plan, a portion near the main cam 20, seen from the upper side, when the first lid 4 and the second lid 5 are being opened, and FIG. 27B shows, in an enlarged manner, an area enclosed by a rectangle indicated by N shown in FIG. 27A.

FIGS. 27A and 27B are shown in transparent view for better understanding the action of the drive lever 11 and clutch lever 12.

When the motor 7 is driven to open the opening 2a1, the main cam 20 is rotated in the clockwise direction as indicated by an arrow γ1 shown in FIG. 27A. At this time, since the guide pin 17p1 of the tilt rack 17 is set in the combiner relief rib 20k1 provided at the lower side of the main cam 20 and having a constant radius, the guide pin 17p1 of the tilt rack 17 stays in the position shown in FIG. 8A.

Meanwhile, the clutch pressing rib 20c1 (refer to FIGS. 7A and 7C) of the clutch guide rib 20c provided at the lower side of the main cam 20 presses the lower plate 12b located at the lower side of the main cam 20 of the clutch lever 12 in the clockwise direction (direction indicated by the arrow γ1 shown in FIG. 27A), whereby the guide pin 11p of the drive lever 11 linked with the clutch lever 12 is rotated in the clockwise direction (direction indicated by the arrow γ1 shown in FIG. 27A), and the slide base 13 travels in the rear direction. At this, time, the guide pin 12p provided so as to extend downward from the clutch lever 12 is set in the first clutch lever guide rib 3b1 having an arc shape and provided on the base 3b and is guided along the track of the first clutch lever guide rib 3b1 having an arc shape.

When the drive shaft 13k supported by the slide base 13 travels in the rear direction, the second cam 9 and the first cam 8 travel in the rear direction, and the first lid 4 and the second lid 5 travel in the rear direction (direction indicated by an arrow α3 shown in FIG. 27A) thereby performing the opening action.

Figure 23A:
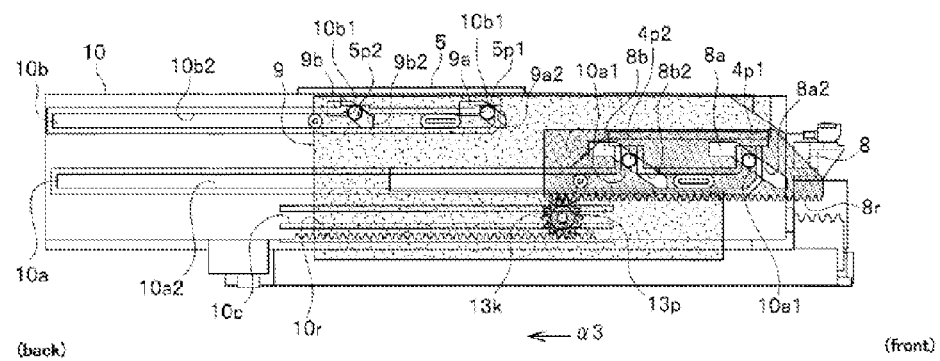
FIG. 23A is a schematic side view of action of the first cam, the second cam, the pinion and the drive shaft, while the first lid and the second lid which are closed are opened.
Figure 23B:
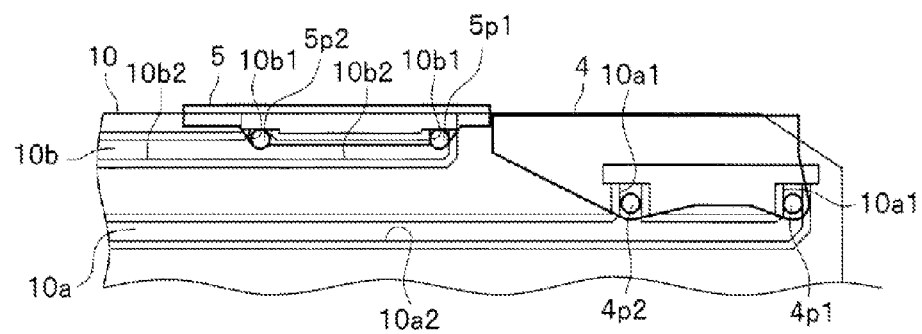
FIG. 23B is a schematic side view of position of the first lid and the second lid located at position of FIG. 23A.

When the second cam 9 and the first cam 8 travel in the rear direction, as shown in FIG. 23A, the first front boss 4p1 and the first rear boss 4p2 of the first lid 4 are set in the first inclined descendent portion 8a2 and the first inclined descendent portion 8b2 of the first cam 8 thus being forced downward, and also are set in the first vertical guide groove 10a1 of the first guide groove 10a of the lid rail 10, and therefore the first lid 4 descends substantially vertically while maintaining its horizontal posture.

In the same way, the second front boss 5p1 and the second rear boss 5p2 of the second lid 5 are set in the second inclined descendent portion 9a2 and the second inclined descendent portion 9b2 of the second cam 9 thus being forced downward, and also are set in the second vertical guide groove 10b1 of the second guide groove 10b of the lid rail 10, and therefore the second lid 5 descends substantially vertically while maintaining its horizontal posture.

Figure 24A:
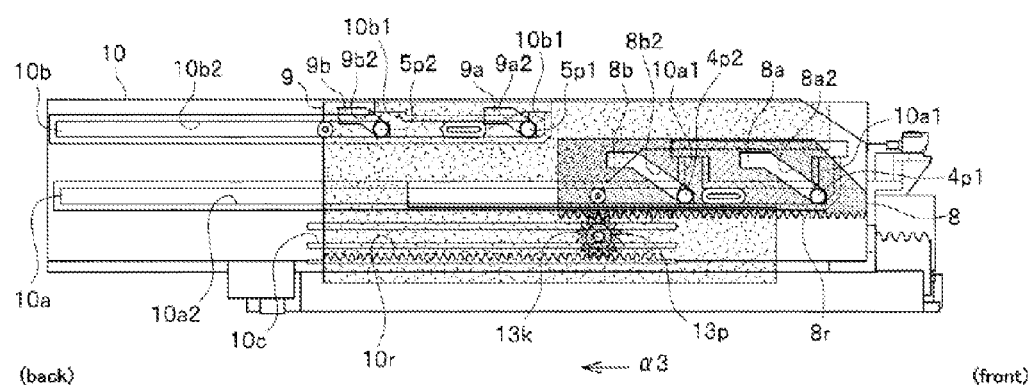
FIG. 24A is a schematic side view of action of the first cam, the second cam, the pinion and the drive shaft, while the first lid and the second lid which are closed are opened.
Figure 24B:
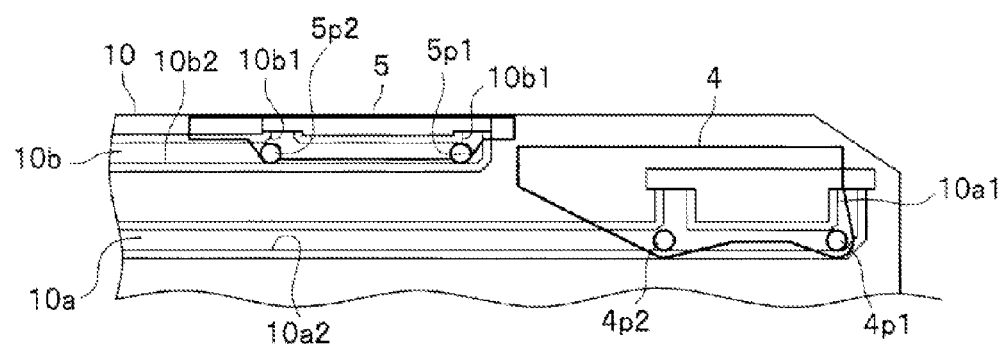
FIG. 24B is a schematic side view of position of the first lid and the second lid located at position of FIG. 24A.

Then, when the first lid 4 and the second lid 5 complete descending, as shown in FIG. 24Aa, the first front boss 4p1 and the first rear boss 4p2 of the first lid 4 are set respectively in the first inclined descendent portion 8a2 of the first front guide groove 8a and the first inclined descendent portion 8b2 of the first rear guide groove 8b of the first cam 8 thus being forced rearward, that is the travel direction of the first cam 8, and also are set in the first parallel guide groove 10a2 of the first guide groove 10a of the lid rail 10, and therefore the first lid 4 travels in the rear direction.

Also, the second front boss 5p1 and the second rear boss 5p2 of the second lid 5 are set respectively in the second inclined descendent portion 9a2 of the second front guide groove 9a and the second inclined descendent portion 9b2 of the second rear guide groove 9b of the second cam 9 thus being forced rearward, that is the travel direction of the second cam 9, and also are set in the second parallel guide groove 10b2 of the second guide groove 10b of the lid rail 10, and therefore the second lid 5 travels in the rear direction.

Figure 25A:
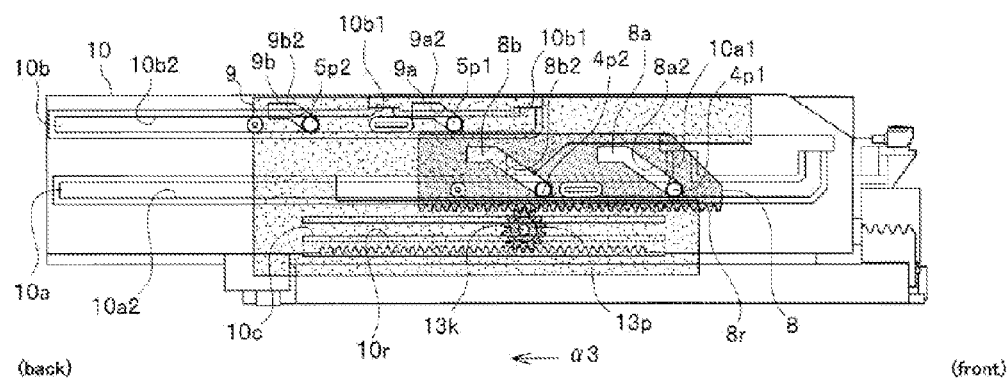
FIG. 25A is a schematic side view of action of the first cam, the second cam, the pinion and the drive shaft, while the first lid and the second lid which are closed are opened.
Figure 25B:
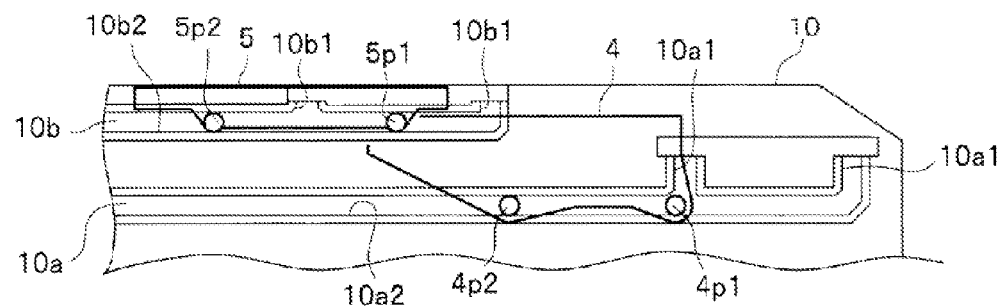
FIG. 25B is a schematic side view of position of the first lid and the second lid located at position of FIG. 25A.
Figure 26A:
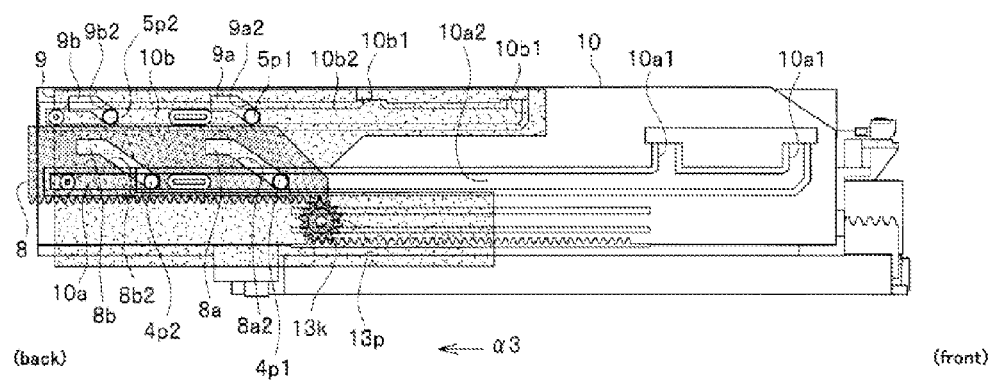
FIG. 26A is a schematic side view of action of the first cam, the second cam, the pinion and the drive shaft, while the first lid and the second lid which are closed are opened.

Then, when the first cam 8 and the second cam 9 travel further rearward as shown in FIG. 25A and the first lid 4 and the second lid 5 travel rearward and arrive at a storage position shown in FIG. 26A, the action of opening the first lid 4 and the second lid 5 is completed. At this time, when the first lid 4 and the second lid 5 arrive at the opened storage position, an action of locking lids is performed as described below.

Description will now be made of the action of locking lids, when the first lid 4 and the second lid 5 are fully opened.

<Start of Action of Locking Lids, when the First Lid 4 and the Second Lid 5 are Fully Opened>

Figure 28A:
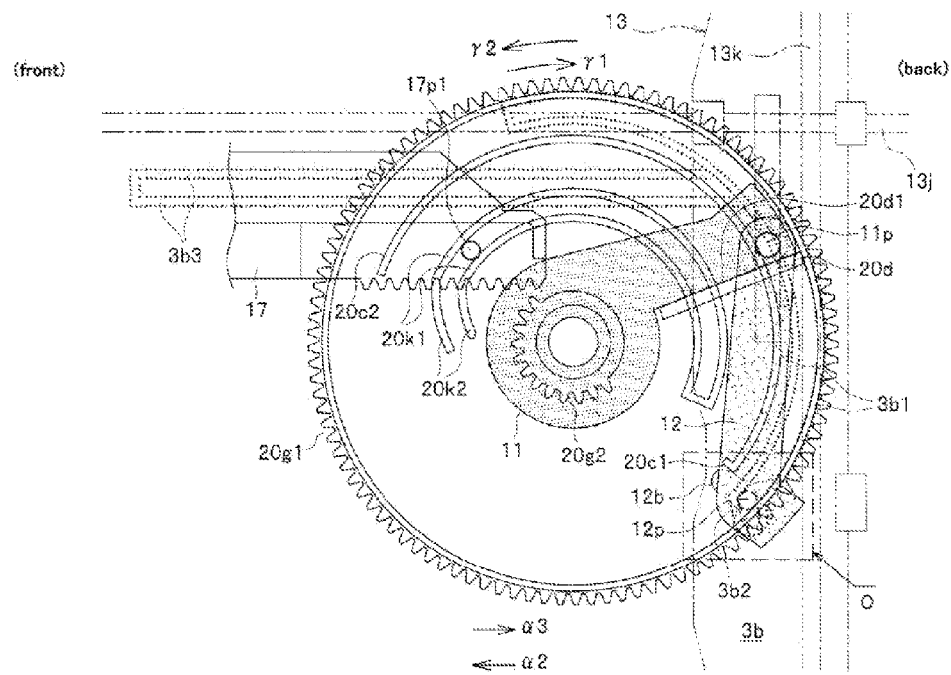
Figure 28B:
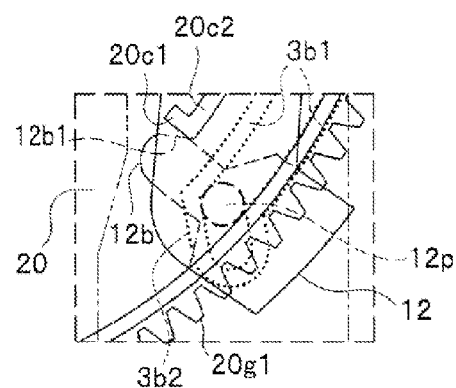

FIGS. 28A and 28B show the position of the start of locking first lid 4 and the second lid 5, when the first lid 4 and the second lid 5 are fully opened, wherein FIG. 28A transparently shows, in top plan, a portion near the main cam 20, seen from the upper side, and FIG. 28B shows, in an enlarged manner, an area enclosed by a rectangle indicated by O shown in FIG. 28A, where a portion near the second clutch lever guide rib 3b2 of the base 3b is seen from the upper side.

When the main cam 20 is rotated in the clockwise direction (direction indicated by an arrow γ1 shown in FIG. 28A), and the clutch pressing rib 20c1 (refer to FIGS. 7A and 7C) of the clutch guide rib 20c provided at the lower side of the main cam 20 presses the lower plate 12b of the clutch lever 12 thereby fully opening the first lid 4 and the second lid 5, the first lid 4 and the second lid 5 arrive at the storage position presenting a position shown in FIG. 28A. The guide pin 12p extending downward below the clutch lever 12 is guided by the first clutch lever guide rib 3b1 having an arc shape and provided on the base 3b and arrives immediately in front of the second clutch lever guide rib 3b2 having a linear shape and provided on the base 3b as shown in FIG. 28B.

<During Action of Locking the First Lid 4 and the Second Lid 5 Fully Opened>

Figure 29A:
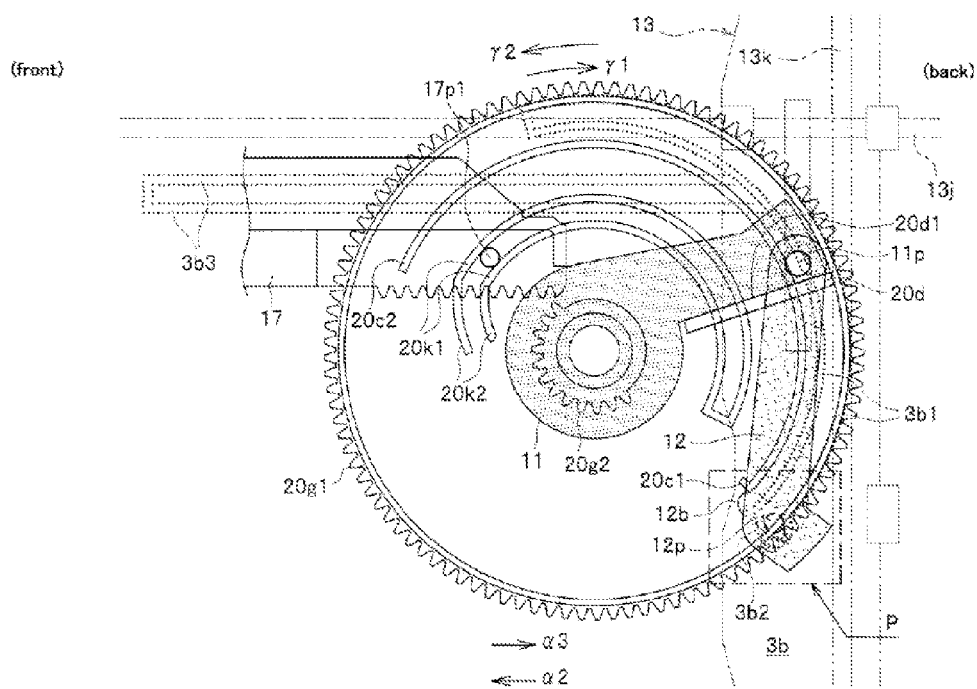
Figure 29B:
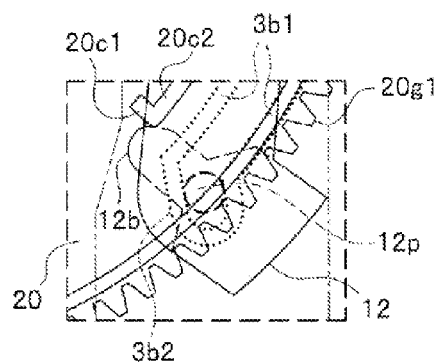

FIGS. 29A and 29B show the position during the action of locking the first lid 4 and the second lid 5, when the first lid 4 and the second lid 5 are fully opened, wherein FIG. 29A transparently shows a portion near the main cam 20 seen from the upper side, and FIG. 29B shows, in an enlarged manner, an area enclosed by a rectangle indicated by P shown in FIG. 29A and located close to the second clutch lever guide rib 3b2 of the base 3b, seen from the upper side.

When the main cam 20 rotates in a clockwise direction (direction shown by an arrow γ1 shown in FIG. 29A), the lower plate 12b of the clutch lever 12 is put in the position shown in FIG. 29A due to pressing force of the clutch pressing rib 20c1 (refer to FIGS. 7A and 7C) of the main cam 20.

At this time, as shown in FIG. 29B, the clutch pressing rib 20c1 (refer to FIGS. 7A and 7C) of the clutch guide rib 20c provided at the lower side of the main cam 20 makes contact with the lid lock introduction portion 12b1 having a linear shape and provided at the lower plate 12b of the clutch lever 12, therefore the lower plate 12b of the clutch lever 12 is pressed outward and then the guide pin 12p extending toward a portion located below the clutch lever 12 is set smoothly from the first clutch lever guide rib 3b1 having an arc shape and provided on the base 3b into the second clutch lever guide rib 3b2 having a linear shape and provided on the base 3b.

<Completion of Action of Locking the First Lid 4 and the Second Lid 5 Fully Opened>

Figure 30A:
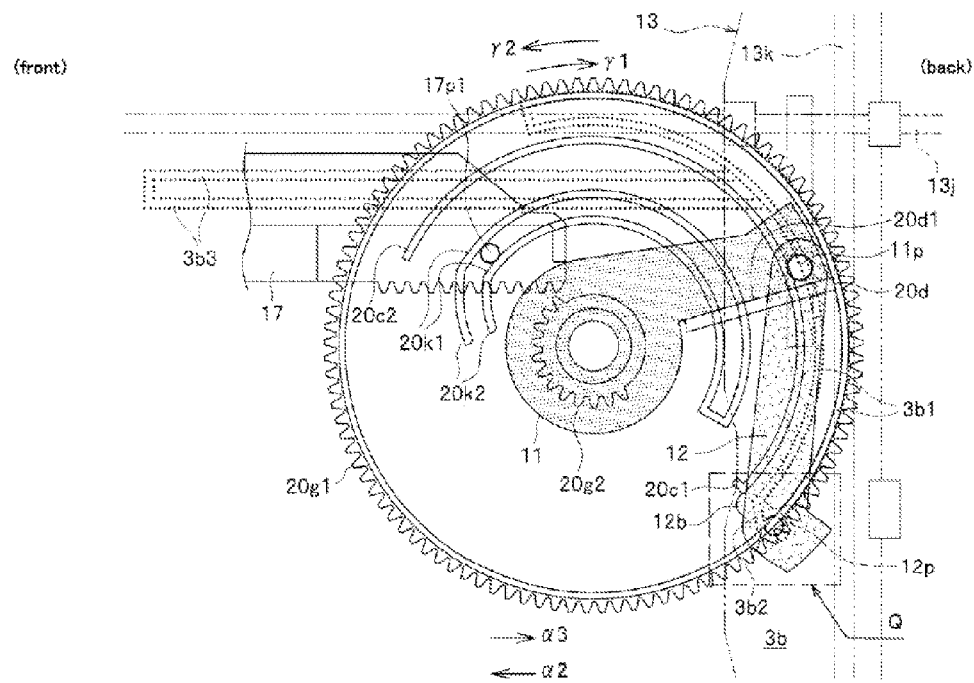
Figure 30B:
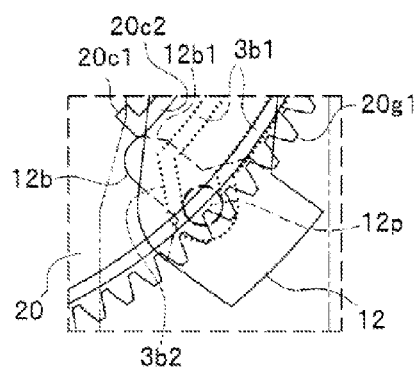

FIGS. 30A and 30B show the position at the completion of the action of locking the first lid 4 and the second lid 5, when the first lid 4 and the second lid 5 are fully opened, wherein FIG. 30A transparently shows a portion near the main cam 20 seen from the upper side, and FIG. 30B shows, in an enlarged manner, an area enclosed by a rectangle indicated by Q shown in FIG. 30A and located close to the second clutch lever guide rib 3b2 of the base 3b, seen from the upper side.

When the main cam 20 rotates further in the clockwise direction (direction indicated by an arrow γ1 shown in FIG. 30A), the lower plate 12b of the clutch lever 12 is put in the position shown in FIG. 30A due to pressing force of the clutch pressing rib 20c1 (refer to FIGS. 7A and 7C) of the main cam 20.

At this time, as shown in FIG. 30B, the clutch pressing rib 20c1 (refer to FIGS. 7A and 7C) of the clutch guide rib 20c provided at the lower side of the main cam 20 presses outward the lid lock introduction portion 12b1 having a linear shape and provided at the lower plate 12b of the clutch lever 12, and therefore the guide pin 12p extending below the clutch lever 12 is completely set into the second clutch lever guide rib 3b2 having a linear shape and provided on the base 3b.

Figure 26B:
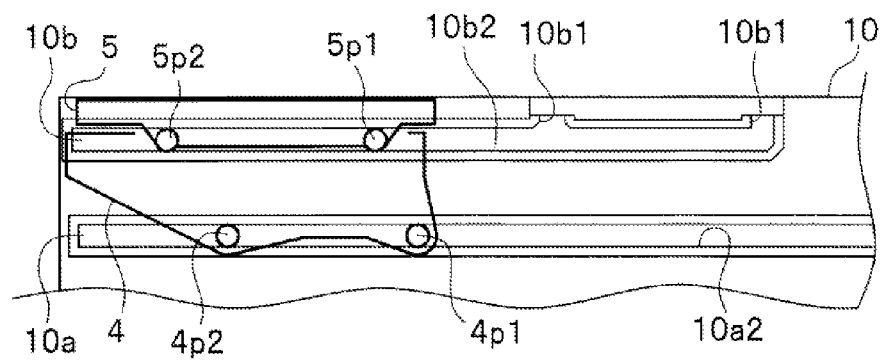
FIG. 26B is a schematic side view of position of the first lid and the second lid located at position of FIG. 26A.

Consequently, the first lid 4 and the second lid 5, which are stored in the chassis k with fully opened lids (refer to FIG. 2) shown in FIGS. 26A and 26B, are locked.

Figure 31A:
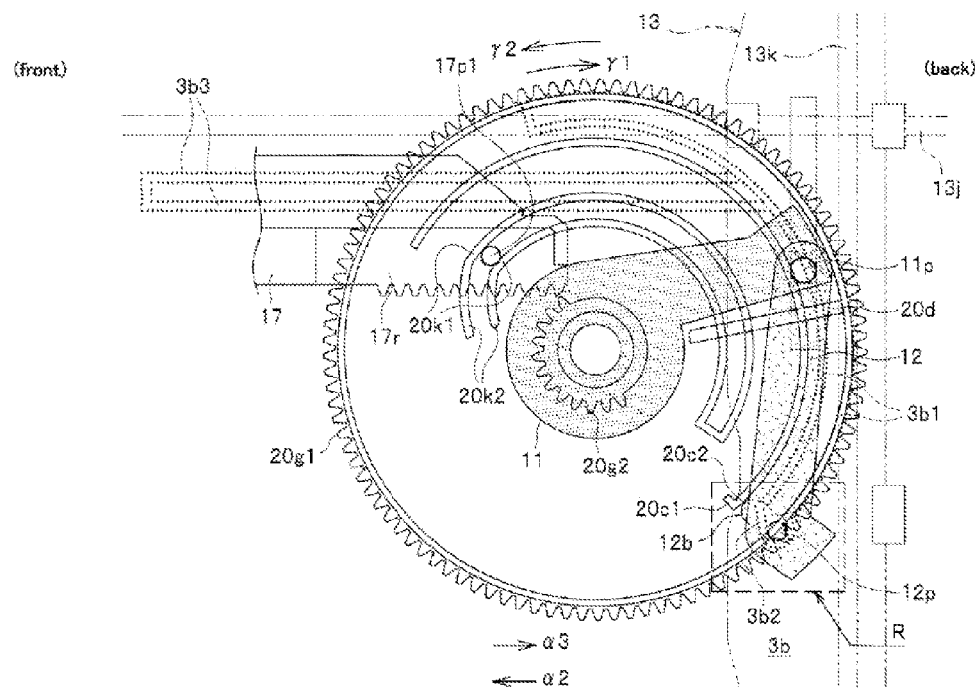
Figure 31B:
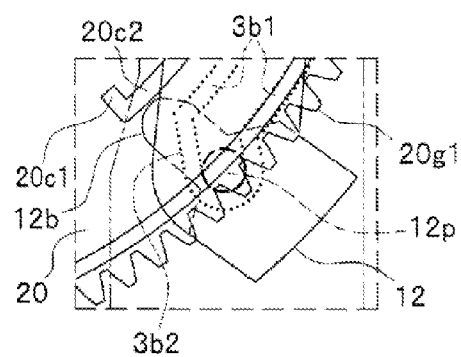

FIGS. 31A and 31B show the position before the action of raising up the combiner 6, wherein FIG. 31A transparently shows, in top plan, a portion near the main cam 20 seen from the upper side, and FIG. 31B shows, in an enlarged manner, an area enclosed by a rectangle indicated by R shown in FIG. 31A and located close to the second clutch lever guide rib 3b2 of the base 3b, seen from the upper side.

After the first lid 4 and the second lid 5 are fully opened (refer to FIG. 2) and stored, when the main cam 20 rotates in the clockwise direction (direction indicated by an arrow γ1 shown in FIG. 31A), the clutch pressing rib 20c1 of the clutch guide rib 20c provided at the lower side of the main cam 20 comes off from the lower plate 12b of the clutch lever 12, and the lower plate 12b of the clutch lever 12 makes contact with an outer circumference surface of the clutch relief rib 20c2 provided at the lower side of the main cam 20 and slides, as shown in FIG. 31A. Consequently, the guide pin 12p provided below the clutch lever 12 is kept set in the second clutch lever guide rib 3b2 having a linear shape and provided on the base 3b and the first lid 4 and the second lid 5, which are fully opened, are kept locked.

At this time, the guide pin 17p1 of the tilt rack 17 is set in the combiner relief rib 20k1 having a constant radius and provided at the lower side of the main cam 20, therefore the tilt rack 17 does not travel in the front and rear direction of the display device 1 (direction indicated by arrows α2 and α3 shown in FIG. 31A), and the combiner 6 is retracted and positioned in storage as shown in FIG. 2.

<Action of Raising Up the Combiner 6>

As a result of the action described above, the opening 2*a*1 of the upper case 2 is opened, and subsequently, the action of raising up the combiner 6 is performed.

Figure 32A:
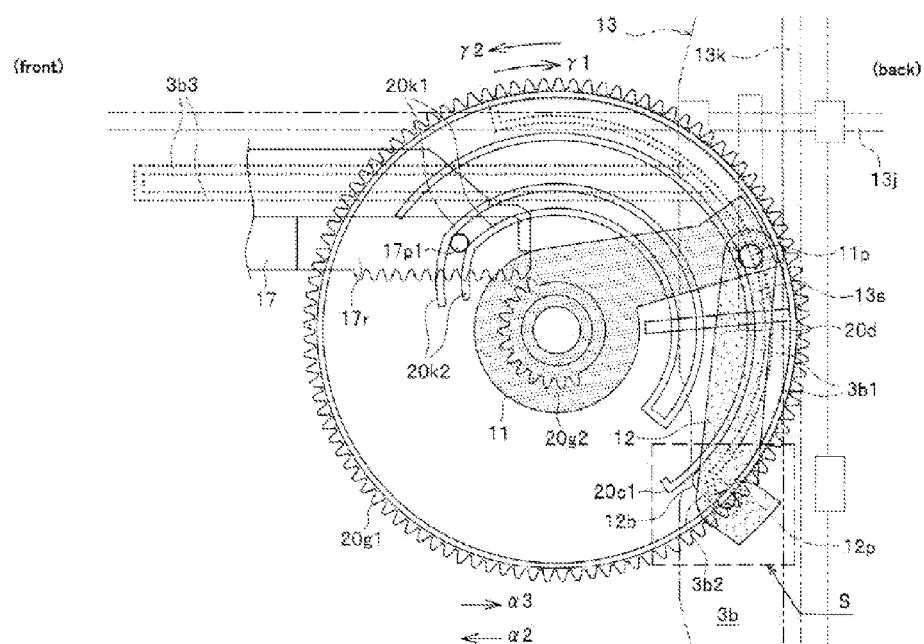
Figure 32B:
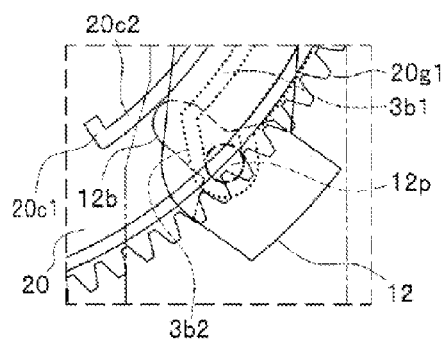

FIGS. 32A and 32B show the main cam 20, seen when the combiner 6 starts rising up, wherein FIG. 32A shows, in top plan, a portion close to the main cam 20 seen from the upper side, and FIG. 32B shows, in an enlarged manner, an area located close to the second clutch lever guide rib 3*b*2 of the base 3*b* and enclosed by a rectangle indicated by S shown in FIG. 32A, seen from the upper side.

When the main cam 20 rotates in the clockwise direction (direction indicated by an arrow γ1 shown in FIG. 31A), the position in which the combiner 6 starts rising up as shown in FIGS. 32A and 32B is reached.

The guide pin 17*p*1 of the tilt rack 17 travels from the combiner relief rib 20*k*1 having a constant radius and provided at the lower side of the main cam 20 and leads to a boundary with the combiner actuating rib 20*k*2 having a gradually decreasing radius.

Figure 33A:
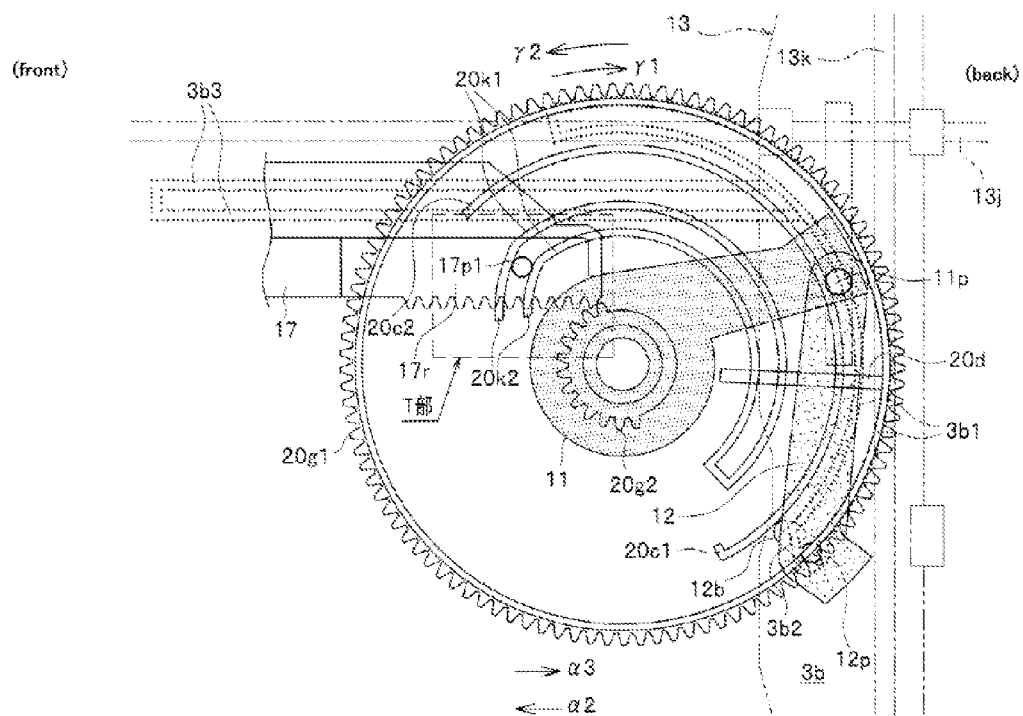
Figure 33B:
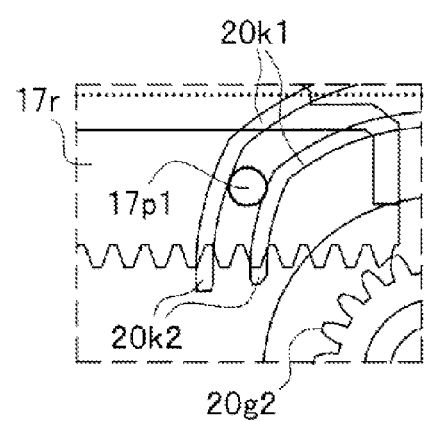

FIGS. 33A and 33B show the position in which the combiner 6 starts rising up, wherein FIG. 33A shows, in top plan, a portion close to the main cam 20, seen from the upper side, and FIG. 33B shows, in an enlarged manner, an area enclosed by a rectangle indicated by T shown in FIG. 33A, specifically the combiner actuating rib 20*k*2 provided at the lower side of the main cam 20 and having a gradually decreasing radius, seen from the upper side.

When the main cam 20 rotates further in the clockwise direction (direction indicated by an arrow γ1 shown in FIG. 33A), the guide pin 17*p*1 of the tilt rack 17 is set in the combiner actuating rib 20*k*2 provided at the lower side of the main cam 20 and having a gradually decreasing radius.

As a result, the guide pin 17*p*1 of the tilt rack 17 travels in the rear direction (direction indicated by the arrow α3 shown in FIGS. 33A and 8A), and therefore the tilt rack 17 travels in the rear direction (direction indicated by the arrow α3 shown in FIGS. 33A and 8A).

Then, a gear portion of the combiner drive rack 17*r* of the tilt rack 17 is engaged with the partial gear 20*g*2 provided at the lower side of the main cam 20 such that the gear phase is matched (with respective tooth mountain and valley intermeshed) as shown in FIG. 33B.

Further, when the main cam 20 rotates in the clockwise direction (direction indicated by an arrow γ1 shown in FIG. 33A), the partial gear 20*g*2 provided at the lower side of the main cam 20 is engaged with a gear portion of the combiner drive rack 17*r*, whereby the tilt rack 17 travels in the rear direction (direction indicated by the arrow α3 shown in FIG. 8A).

Figure 34:
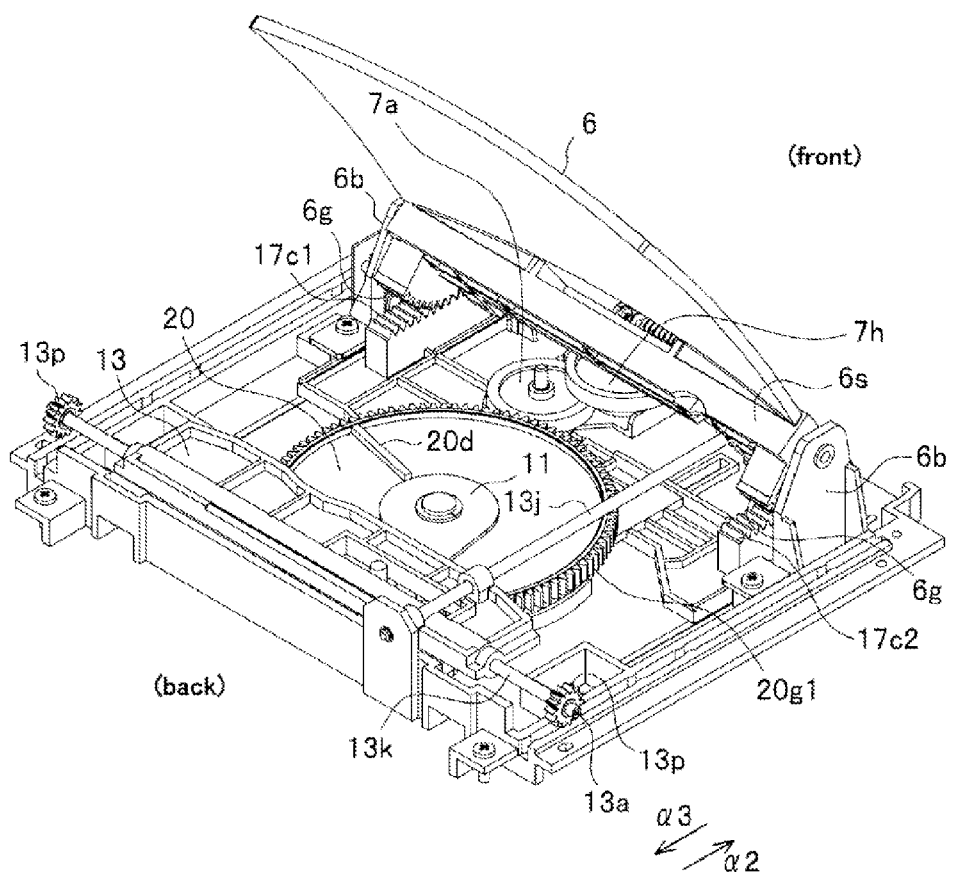
FIG. 34 is a perspective view of an inside structure of the display device, seen obliquely from the rear upper side.

When the tilt rack 17 travels in the rear direction (direction indicated by the arrow α3 shown in FIG. 8A), the combiner rotation racks 17*c*1 and 17*c*2 of the tilt rack 17 are engaged with the right and left gears 6*g* (refer to FIG. 19A) provided at the both sides of the combiner support 6*s* of the combiner 6 as shown in FIG. 34, whereby the combiner 6 starts rising up. FIG. 34 perspectively shows the inside structure of the display device 1, seen obliquely from the rear upper side. In FIG. 34, the first cam 8, the second cam 9, the first lid 4, the second lid 5 and a part of the lid rail 10 are omitted for better showing the inside structure of the display device 1.

When the tilt rack 17 travels further in the rear direction (direction indicated by an arrow α3 shown in FIG. 34), the angle detection rack 17*k* of the tilt rack 17 is engaged with the angle detection gear 14*g* of the angle sensor 18 (refer to FIG. 18) as shown in FIG. 19C.

When the tilt rack 17 travels in the rear direction, the combiner 6 comes to reach the rise-up position (refer to FIG. 19D) as shown in FIG. 13, then the angle sensor 18 detects based on the position of the angle detection gear 14*g* that the combiner 6 reaches the rise-up position, and the action of raising up the combiner 6 is completed.

An image projected on the combiner 6 by a light source provided in the upper and lower cases 2 and 3 is located at different places depending on an observing point of a user, for example a driver, and therefore the rise-up position of the combiner 6 must be adjusted by the user. So, it is configured such that the user is enabled to adjust the rise-up position of the combiner 6 by rotating the motor 7 in the normal direction or the reverse direction by an operation button (not shown) while the combiner 6 is raised up.

<Action of Storing the Combiner 6 and Action of Closing the First Lid 4 and the Second Lid 5>

When the combiner 6 is retracted for storage, an action reversed to the action described above is performed.

When the motor 7 is rotated in the reversed direction, the main cam 20 is rotated in the counterclockwise direction (direction indicated by the arrow γ2 shown in FIG. 8A), and the tilt rack 17 travels in the front direction as indicated by the arrow α2 shown in FIG. 33A. Then, the combiner rotation racks 17*c*1 and 17*c*2 of the tilt rack 17 are engaged with the right and left gears 6*g* (refer to FIGS. 19D and 19C) provided at both sides of the combiner support 6*s* of the combiner 6, whereby the combiner 6 starts being retracted.

And, after the combiner 6 is retracted, the gear portion of the combiner drive rack 17*r* of the tilt rack 17 comes out of engagement with the partial gear 20*g*2 provided at the lower side of the main cam 20 as shown FIGS. 31A and 31B.

Subsequently, when the main cam 20 is rotated in the counterclockwise direction (direction indicated by the arrow γ2 shown in FIG. 8A) and reaches the position shown in FIG. 30A, the drive lever pressing rib 20*d* provided at the upper side of the main cam 20 presses the drive lever 11 in the counterclockwise direction (direction indicated by the arrow γ2 shown in FIG. 8A).

Consequently, as shown in FIG. 28A, the guide pin 12*p* provided below the clutch lever 12 comes off from the second clutch lever guide rib 3*b*2 having a short linear shape and provided at the base 3*b* and is set into the first clutch lever guide rib 3*b*1 having an arc shape.

Further, when the main cam 20 is rotated in the counterclockwise direction (direction indicated by the arrow γ2 shown in FIG. 8A), the drive lever pressing rib 20*d* provided at the upper side of the main cam 20 presses the drive lever 11 in the counterclockwise direction (direction indicated by the arrow y2 shown in FIG. 8A), and the guide pin 12*p* provided below the clutch lever 12 is guided along the track of the first clutch lever guide rib 3*b*1 having an arc shape and provided at the base 3*b*.

As a result, the slide base 13 travels in the front direction as indicated by an arrow α2 shown in FIG. 27A. Consequently, the second cam 9 and the first cam 8 travel in a reversed process shown in the order from FIG. 26A through FIG. 23A thereby moving the first lid 4 and the second lid 5 in a process shown from FIG. 26B through FIG. 23B in the front direction, whereby the first lid 4 and the second lid 5 travel in the front direction (refer to the arrow α2 shown in FIG. 2) and then finally in the upward direction.

When the opening 2*a*1 is closed by the first lid 4 and the second lid 5 as shown in FIG. 1, the tip end portion of the second cam 9 presses the lid closing detection sensor sw1 provided at the front portion of the lid rail 10 as shown in FIG. 8A, and it is detected that the first lid 4 and the second lid 5 are closed, whereby the main cam 20 is stopped from rotating in the counterclockwise direction (direction indicated by the arrow γ2 shown in FIG. 8A) thus completing the action of closing the first lid 4 and the second lid 5, and the opening 2a1 of the upper case 2 is closed by the first lid 4 and the second lid 5 (refer to FIGS. 1 and 22).

When the opening 2a1 is closed by the first lid 4 and the second lid 5 as shown in FIG. 1, the first lid 4 and the second lid 5 are biased downward by a plate spring (not shown). Specifically, for example, a plate spring having a substantially wing shape with its center portion protruding downward is provided at an upper position of each of the first lid 4 and the second lid 5 closed, wherein the first lid 4 and the second lid 5, which are closed, are pressed downward by the plate springs having a substantially wind shape.

As a result, the first lid 4 and the second lid 5 are suppressed from generating noises resulting from vibrations attributable to disturbance so as not to give uncomfortable feeling to a user, for example, a driver.

Also, the first lid 4 and the second lid 5 shown in FIG. 3, also when positioned for storage, are biased forward (direction indicated by the arrow P2 shown in FIG. 6) by the plate spring 3z (refer to FIG. 6) and thereby fixedly held so as to prevent generation of noises resulting from vibrations attributable to disturbance.

As described above, the combiner support 6s is biased by the torsion coil springs 16r, 16l (refer to FIG. 20) thereby allowing the gear 6g to reliably make contact with the combiner rotation racks 17c1 and 17c2 of the tilt rack 17 thus fixedly holding the combiner 6 in order to prevent the combiner 6 from shaking, so that it does not happen also at the rise-up position that the combiner 6 swings by vibration or shock thus disturbing the image.

With the configuration described above, the following effects can be achieved.

1. Since the action of raising up and retracting the combiner 6 and the action of opening and closing the first lid 4 and the second lid 5 are driven by one drive source, that is the motor 7, the number of drive sources and the number of component members are reduced and the assembly is simplified. Therefore, the cost of manufacturing can be reduced.
2. Since the cover is divided into two sections, specifically the first lid 4 and the second lid 5, and also since the first lid 4 and the second lid 5 are stored with one lapped over the other, the entire depth dimension of the display device 1 can be reduced thus enabling the device to be downsized.
3. Since the cover is divided and slid thereby performing the action of opening and closing, the range of cover movement is not required thus enabling the whole of the display device 1 to be downsized.
4. Since the first lid 4 moves at a speed equal to twice a travel speed of the second lid 5, the action time of the first lid 4 and the second lid 5 can be shortened, and also the action of opening and closing the first lid 4 and the second lid 5 can be performed smoothly.
5. Since the first lid 4 moves at a speed equal to twice a travel speed of the second lid 5, the action time of the first lid 4 and the second lid 5 can be made equivalent.
6. Since the first lid 4 moves at a speed equal to twice a travel speed of the second lid 5, the time of storing the first lid 4 and the second lid 5 can be made equivalent thus enhancing the action appearance and improving the visibility, and thereby the commodity value is increased.
7. Since the first lid 4 and the second lid 5 are driven simultaneously by respective different component members, the load can be distributed and reduced, thus enabling a smooth action.
8. When the opening 2a1 is covered by the first lid 4 and the second lid 5, since the upper surfaces of the upper case2, the first lid 4 and the second lid 5 can be made flush with one another, a good design quality is achieved.

Second Embodiment

A second embodiment of the present invention will be described. In the second embodiment, a cover is divided into three sections.

Figure 35:
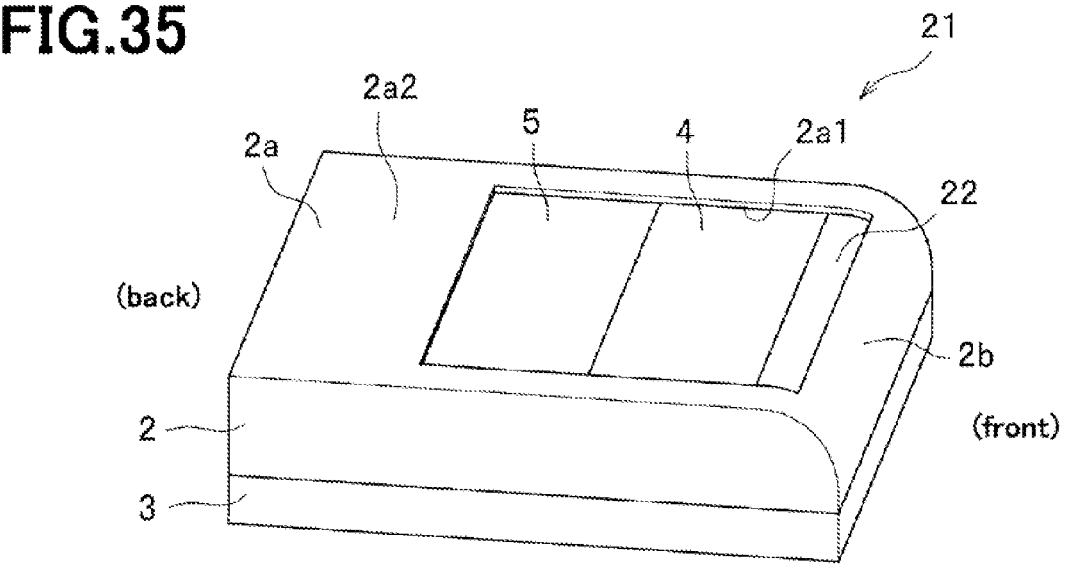
FIG. 35 is a perspective view of a display device according to a second embodiment of the present invention, seen obliquely from the front upper side, when a cover is closed.

FIG. 35 perspectively shows a display device 21 according to the second embodiment viewed obliquely from a front upper side, wherein the cover is closed.

Figure 36:
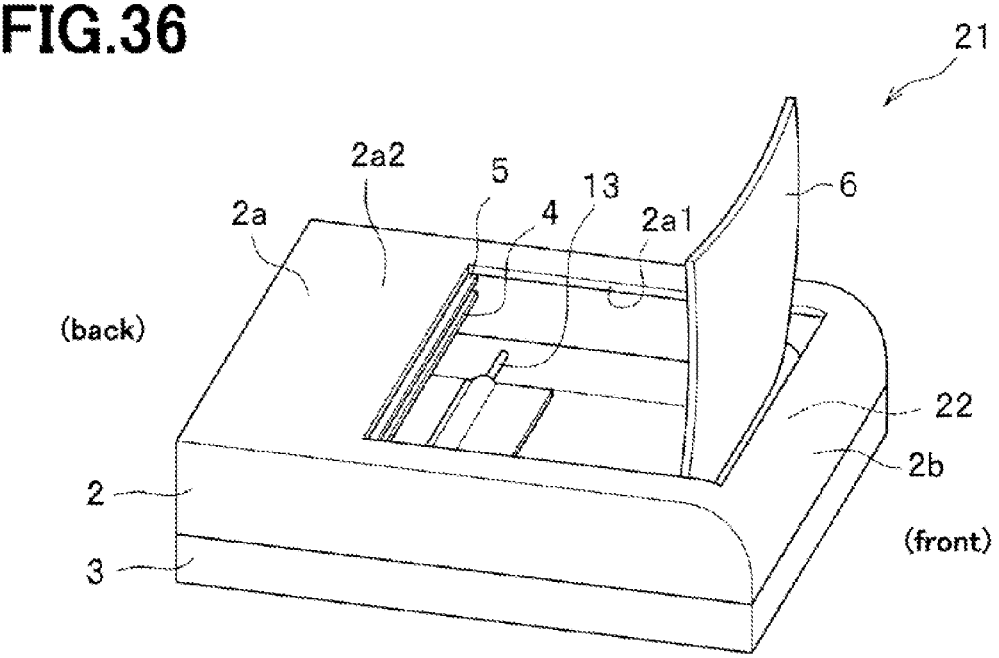
FIG. 36 is a perspective view of the display device according to the second embodiment, seen obliquely from the front upper side, when a combiner is raised up.

FIG. 36 perspectively the display device 21 viewed obliquely from the front upper side, wherein a combiner 6 is raised up.

In the display device 21 according to the second embodiment, the cover to cover up the opening 2a1 is divided into a first lid 4, a second lid 5 and a third lid (rotary cover member) 22.

The display device 21 according to the second embodiment is configured the same as the display device 1 according to the first embodiment except that since a part of the opening 2a1 is covered by the third lid 22, the first lid 4 and the second lid 5 are dimensioned smaller, wherein component members having the same or similar configuration are denoted with the same reference numerals and therefore a detailed description thereof will be omitted.

When the combiner 6 is not in use, the opening 2a1 of the display device 21 is closed by the first lid 4, the second lid 5 and the third lid 22 as shown in FIG. 35.

When the combiner 6 is in use, the first lid 4 and the second lid 5 are retracted to be stored below a rear portion 2a2 of an upper surface plate 2a of an upper case 2 as shown in FIG. 36, in the same way as in the first embodiment.

The third lid 22 is rotated to be stored in a front portion 2b of the upper case 2.

Figure 37A:
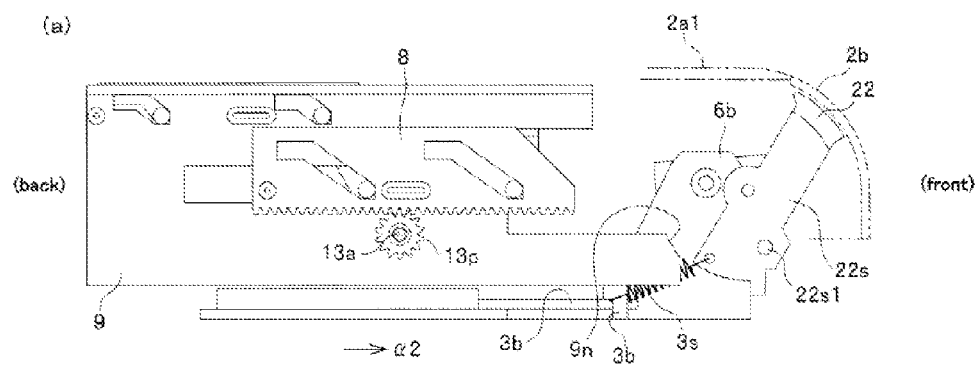
FIG. 37A is an inside side view of the display device according to the second embodiment, seen when an opening is opened.
Figure 37B:
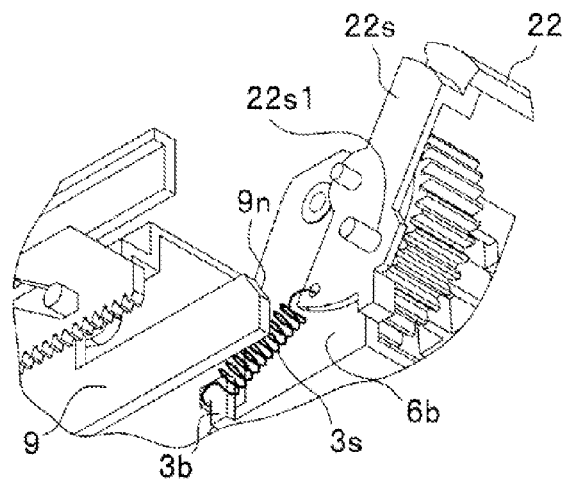
FIG. 37B is a perspective view of an inside of the display device according to the second embodiment, seen obliquely from the front lower side, when the opening is opened.

FIG. 37A shows an inner side of the display device 21 viewed when the opening 2a1 is opened, and FIG. 37B perspectively shows an inside of the display device 21 viewed obliquely from a front lower side, when the opening 2a1 is opened.

Figure 38A:
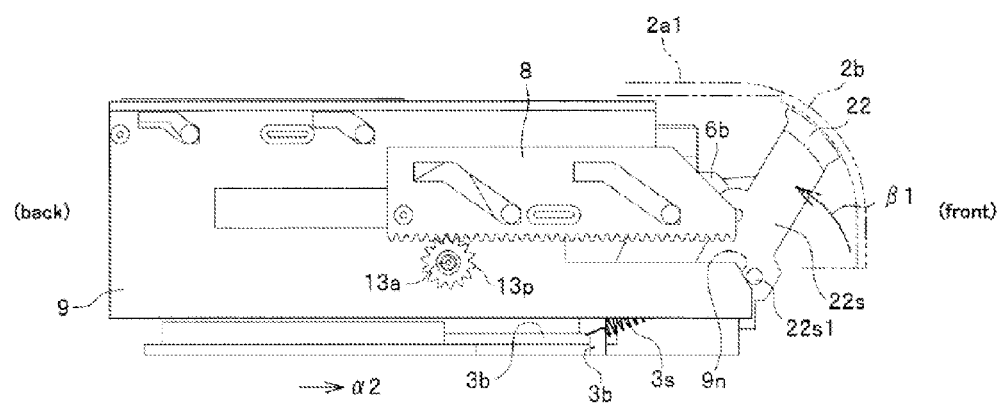
FIG. 38A is a side view of an inside of the display device according to the second embodiment, showing process of closing the opening.
Figure 38B:
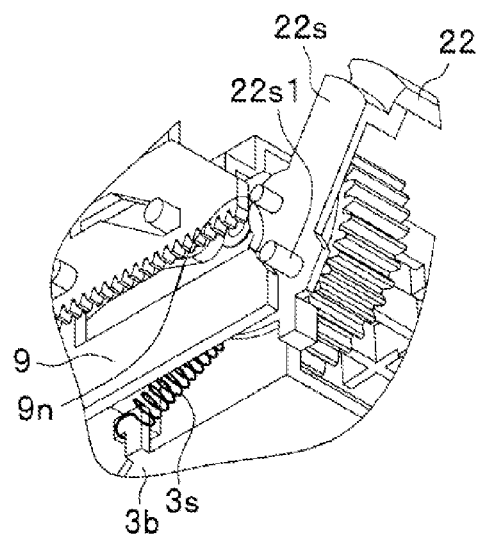
FIG. 38B is a perspective view of the inside of the display device seen obliquely from the front lower side, showing process of closing the opening.

FIG. 38A shows an inner side of the display device 21 viewed when the opening 2a1 is being closed, and FIG. 38B perspectively shows the inside of the display device 21 viewed obliquely from the front lower side, when the opening 2a1 is being closed.

Figure 39A:
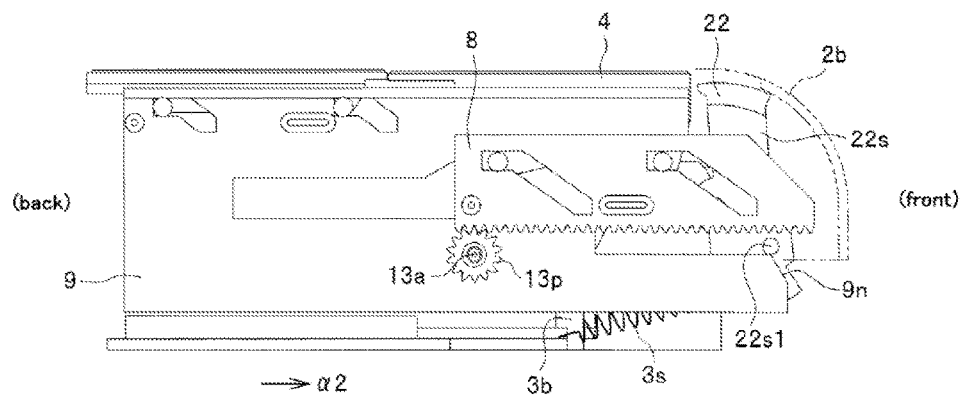
FIG. 39A is a side view of the inside of the display device according to the second embodiment, when the opening is closed.
Figure 39B:
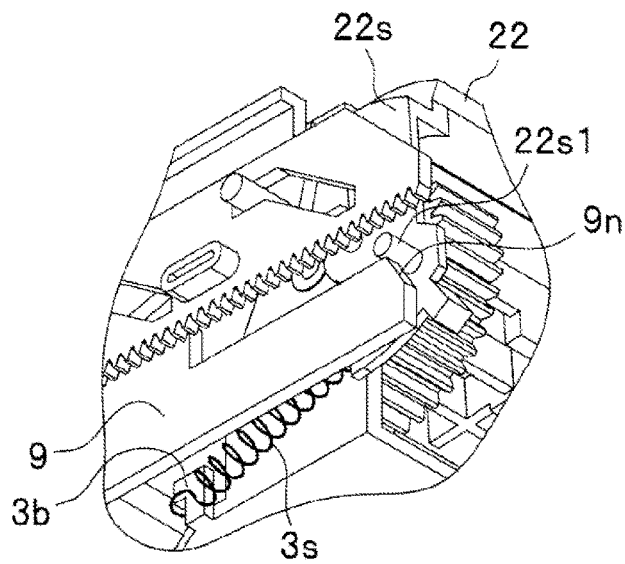
FIG. 39B is a perspective view of the inside of the display device seen obliquely from the front lower side, when the opening is closed.

FIG. 39A shows the inner side of the display device 21 viewed when the opening 2a1 is closed, and FIG. 39B perspectively shows the inside of the display device 21 viewed obliquely from the front lower side, when the opening 2a1 is closed.

A support member 22s (rotation opening and closing means) to which the third lid 22 is fixed is rotatably supported at a combiner bracket 6b fixed to a base 3b.

The support member 22s includes a drive boss (rotation opening and closing means) 22s1 projecting outward. The support member 22s is engaged with the other end of a tension coil spring (rotation opening and closing means) 3s whose one end is engaged with a base 3b, whereby the support member 22s is biased in a direction in which the third lid 22 is opened.

With the configuration described above, when the combiner 6 is in use as shown in FIG. 36, the support member 22s is biased by the tension coil spring 3s, whereby the third lid 22 is kept opened as shown in FIG. 37.

And, when the combiner 6 becomes out of use, a first cam 8 and a second cam 9 move forward as indicated by an arrow α2 shown in FIG. 38A. At this time, an inclined portion (rotation opening and closing means, closing action portion) 9n formed at a front corner of the second cam 9 pushes up the drive boss 22s1 of the support member 22s upward, whereby the support member 22s rotates rearward (direction indicated by an arrow 31 shown in FIG. 38A), and the third lid 22 rotates rearward (direction indicated by the arrow 31 shown in FIG. 38A).

And, when the opening 2a1 of the upper case 2 is closed by the first lid 4, the second lid 5 and the third lid 22, a tip end portion of the second cam 9 makes contact with a lid closing detection sensor sw1 (refer to FIG. 8A) thus detecting the completion of the action, whereby a motor 7 stops operation, and the first cam 8 and the second cam 9 stop the forward travel action. And, the second cam 9 is stopped from pressing against the drive boss 22s1 of the support member 22s, and the position becomes as shown in FIG. 39. As a result, the opening 2a1 of the display device 21 is closed by the first lid 4, the second lid 5 and the third lid 22 as shown in FIG. 35.

The opening 2a1 of the display device 21 is opened in a way opposite to the way described above, specifically in the order from FIG. 39A/B through FIG. 37A/B.

According to the second embodiment, since the cover is composed of three lids, the first lid 4 and the second lid 5 therein have a smaller depth dimension than the first and second lids 4 and 5 in the first embodiment, and therefore the depth dimension of the entire display device 21 can be reduced. Consequently, the display device 21 can be further downsized.

Also, since the opening and closing of the third lid 22 is performed by rotation movement, the operation is more stable compared to parallel movement. And, the operation space is smaller, which contributes to downsizing of the display device 21.

Further, since the opening 2a1 of the display device 21 is closed by the first lid 4, the second lid 5 and the third lid 22, the degree of design freedom, such as dimension, can be increased.

Third Embodiment

A third embodiment of the present invention will be described. In a display device 31 according to the third embodiment, a first lid 4 is retracted immediately below an upper surface plate 2a of an upper case 2, and a second lid 5 is retracted below the first lid 4. Except the configuration described above, the third embodiment has the same configuration as the first embodiment.

Figure 40:
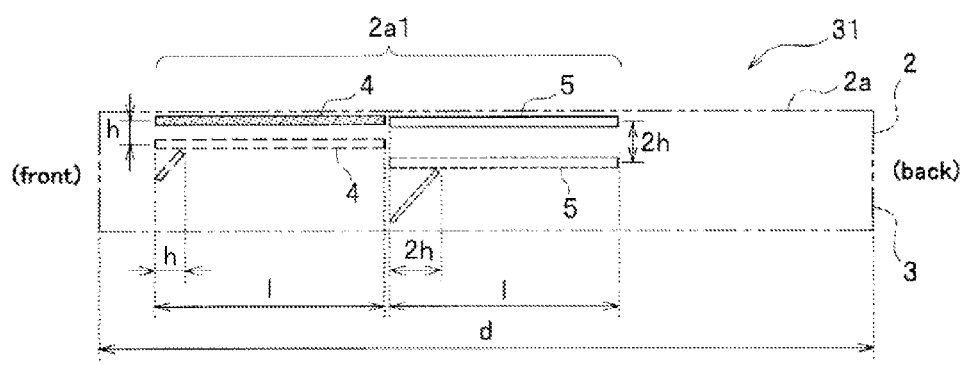
FIG. 40 is a schematic view of a display device according to a third embodiment of the present invention seen from the side, when the opening is closed by the first lid and the second lid.

FIG. 40 schematically shows the display device 31 according to the third embodiment viewed from a side, when an opening 2a1 is closed by the first lid 4 and the second lid 5.

Figure 41:
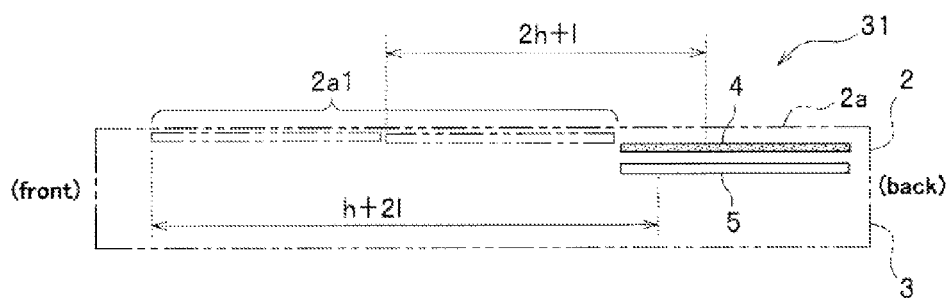
FIG. 41 is a schematic view of the display device according to the third embodiment seen from the side, when the opening is opened such that the first lid and the second lid are stored in an upper case.

FIG. 41 schematically shows the display device 31 viewed from the side, when the opening 2a1 is opened such that the first lid 4 and the second lid 5 are retracted in the upper case 2.

Figure 42A:
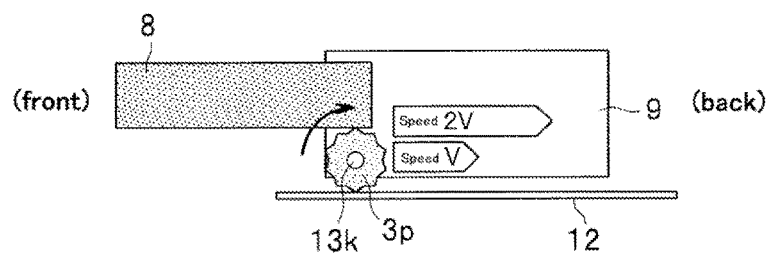
Figure 42B:
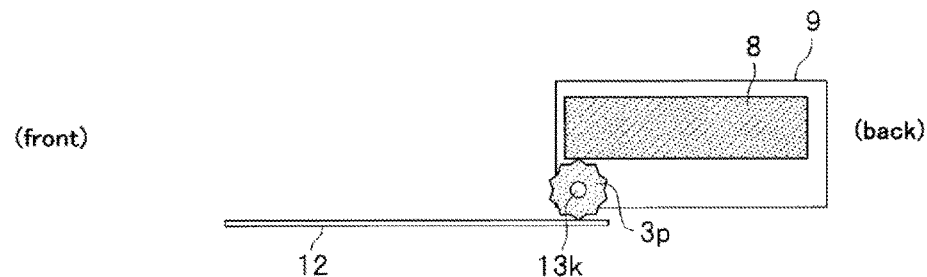

FIGS. 42A and 42B schematically show relation between a travel speed of a first cam 8 and a travel speed of a second cam 9, wherein FIG. 42A shows a position when the opening 2a1 is closed by the first lid 4 and the second lid 5, and FIG. 42B shows a position when the opening 2a1 is opened by the first lid 4 and the second lid 5.

In the display device 31, when the a combiner 6 is not in use, the opening 2a1 is closed by the first lid 4 and the second lid 5 as shown in FIG. 40. On the other hand, when the combiner 6 is in use, the opening 2a1 is opened, and the first lid 4 and the second lid 5 are retracted below the upper surface plate 2a as shown in FIG. 41, wherein the first lid 4 is located at an upper position, and the second lid 5 is located at a lower position.

A drive shaft 13k is inserted through a second cam 9 to move the second lid 5 as shown in FIGS. 42A and 42B, and the second cam 9 travels forward and rearward at the same speed as the drive shaft 13k. Meanwhile, since a first cam 8 to move the first lid 4 is caused to travel by engagement with a pinion 13p (refer to FIGS. 22A to 26A) fixed to the drive shaft 13k, the first cam 8 travels at a speed equal to twice the speed of the drive shaft 13k, that is, twice the speed of the second cam 9.

When the display device 31 becomes in use, if the first lid 4 is assumed to travel downward vertically for dimension h, then the second lid 5 which is retracted below the first lid 4 is assumed to travel downward vertically for dimension 2h as shown in FIG. 40.

Then, the first lid 4 and the second lid 5 travel rearward to be stored below the upper surface plate 2a of the upper case 2 such that the first lid 4 is retracted at the upper position and the second lid 5 is retracted at the lower position in an overlapped manner, whereby the opening 2a1 is opened.

In this connection, it is assumed that a horizontal travel distance of the first lid 4 is 2l (l is a small-case letter of L), and a vertical travel distance thereof is h. Also, if the vertical travel distance of the first lid 4 is assumed to be equal to a horizontal travel distance of the first cam 8, a travel distance of the first cam 8 to move the first lid 4 is 2l+h. Then, a travel distance of the second cam 9, which is ½ of the travel distance of the first cam 8 as shown in FIG. 42, is therefore h/2+l.

Meanwhile, since the second lid 5 travels for the distance 2 h+l, if the vertical travel distance of the second lid 5 is assumed to be equal to the horizontal distance of the second cam 9, then the travel distance of the second cam 9 to move the second lid 5 is 2 h+l.

In the third embodiment, when the opening 2a1 is opened, the first lid 4 is retracted at the upper position and the second lid is retracted at the lower position unlike in the first embodiment, whereby the degree of design freedom of the display device 31 can be increased.

<Travel Track of the First Cam 8 and the Second Cam 9 in the First Embodiment>

For the purpose of comparison with the third embodiment, description will be made of the travel track of the first cam 8 and the second cam 9 in the first embodiment.

Figure 43:
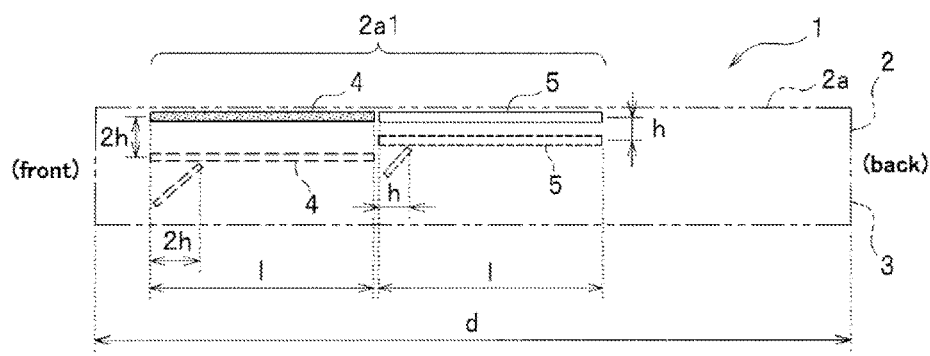
FIG. 43 is a schematic view of the display device according to the first embodiment, seen from the side, when the opening is closed by the first lid and the second lid.

FIG. 43 schematically shows the display device 1 according to the first embodiment viewed from a side, when the opening 2a1 is closed by the first lid 4 and the second lid 5.

Figure 44:
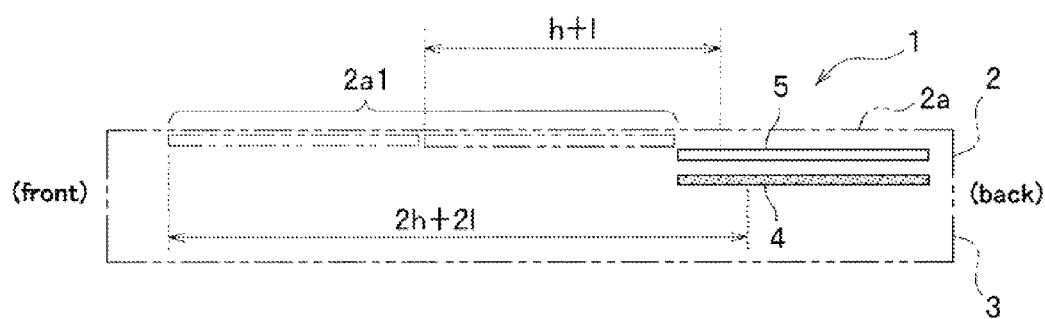
FIG. 44 is a schematic view of the display device according to the first embodiment, seen from the side, when the opening is opened such that the first lid and the second lid are stored in the upper case.

FIG. 44 schematically shows the display device 1 according to the first embodiment viewed from the side, when the opening 2a1 is opened such that the first lid 4 and the second lid 5 are retracted to be stored in the upper case 2.

In the display device 1 according to the first embodiment, when the combiner 6 is not in use, the opening 2a1 is closed by the first lid 4 and the second lid 5 as shown in FIG. 43. Meanwhile, when the combiner 6 is in use, the opening 2a1 is opened such that the first lid 4 and the second lid 5 are retracted below the upper surface plate 2a as shown in FIG. 44, wherein the first lid 4 is located at the lower position and the second lid 5 is located at the upper position unlike in the third embodiment.

When the display device 1 becomes in use, if the first lid 4 is assumed to travel first downward vertically for the dimension 2h as shown in FIG. 34, the second lid 5 is retracted above the first lid 4 and therefore is assumed to travel vertically for the dimension h.

And, as shown in FIG. 44, the first lid 4 and the second lid 5 travel rearward to be retracted below the upper surface plate 2a of the upper case 2 thus opening the opening 2a1 such that the first lid 4 is located at the lower position and the second lid 5 is located at the upper position in an overlapped manner unlike in the third embodiment.

In this connection, if it is assumed that a horizontal travel distance of the first lid 4 is 2l, a vertical travel distance thereof is 2 h, and an inclination angle of the guide groove is 45 degrees, then a travel distance of the first cam 8 is 2l+2 h. A travel distance of the second cam 9, which is equal to ½ of a travel distance of the first cam 8, is therefore h+l.

Meanwhile, since the second lid 5 travels for the distance h+l, if the inclined angle of the guide groove is set at 45 degrees, the travel distance of the second cam 9 to move the second lid 5 is h+l.

Compared with the third embodiment in which the travel distance of the second cam 9 is 2 h+l, the travel distance of the second cam 9 in the first embodiment is h+l. Thus, the travel distance of the second cam 9 in the first embodiment is shorter by a distance h compared with in the third embodiment. A depth dimension d of the display device 1 depends on the travel distance of the second cam 9.

Accordingly, the first embodiment in which the first lid 4 is located at the lower position and the second lid 5 is located at the upper position for storage and in which the depth dimension d is shorter is more preferable compared to the third embodiment in which the first lid 4 is located at the upper position and the second lid 5 is located at the lower position for storage.

Also, in the third embodiment, the travel track of the first lid 4 intersects with the travel track of the second lid 5 as can be seen in FIGS. 40 and 41. Meanwhile, in the first embodiment, the travel track of the first lid 4 does not intersect with the travel track of the second lid 5 as can be seen in FIGS. 43 and 44. Thus, since the travel track of the first lid 4 does not intersect with the travel track of the second lid 5, the travel structure of the first lid 4 and the second lid 5 in the first embodiment is considered simple.

In view of this, the first embodiment in which the first lid 4 is located at the lower position and the second lid 5 is located at the upper position for storage is more preferable than the third embodiment in which the first lid 4 is located at the upper position and the second lid 5 is located at the lower position.

Other Embodiments

1. In the first to third embodiments described above, the combiner 6, on which a virtual image is projected, is used as a display portion, but the present invention is not limited to such a configuration, and the display portion may be replaced by other members than the combiner 6, such as a liquid crystal display (LCD).
2. In the description of the first to third embodiments, the inclined portion 9n formed at the front corner of the second cam 9 is used as a closing action portion of the second cam 9 but may be replaced by a member which has, for example, a curved shape rather than an inclined shape.
3. In the description of the first to third embodiments, the closing action portion is formed at the second cam 9 but may alternatively be formed at the first cam 8.

The present invention has been described with reference to specific embodiments but is not limited to the embodiments described above, and it is to be understood that the design can be changed as appropriate without departing from the spirit of the present invention and various alterations and modifications are possible within the scope of the present invention.

That is to say, the embodiments of the present invention can arbitrarily be modified within a scope where the spirit of the present invention is not changed.

Technical thought observed based on the first to third embodiments described above will hereinafter be described.
(Observation 1)
A display device is provided which includes: a display portion to display information; a storage member adapted to store the display portion and including an opening at an upper side thereof for allowing the display portion to protrude through; a cover member including a plurality of lids adapted to cover the opening and each having a smaller surface area than the opening; and a cover member opening and closing means adapted to open and close the plurality of lids, respectively, wherein a overlapping position is present in which the plurality of lids are overlapped with one another, and a covering position is present in which the plurality of lids close the opening, and wherein a drive source adapted to raise up and retract the display portion and also to open and close the cover member is included.
(Observation 2)
A display device is provided which is configured as described in Observation 1 and which includes travel means to move the plurality of lids at respective different speeds, when the above described covering position is transferred to the overlapping position, or when the overlapping position is transferred to the covering position.
(Observation 3)
A display device is provided which is configured as described in Observation 2, in which the cover member includes a first lid including first bosses and a second lid including second bosses, and which further includes: a first travel body moved by the travel means by power of the drive source; a drive shaft adapted to travel along with the first travel body in a travel direction of the cover member; a first cover travel body provided at a side of the storage member in parallel and adapted to move in the travel direction in accordance with a rotation action of the drive shaft and a travel action of the drive shaft in the travel direction; and a second cover travel body provided at the side of the storage member in parallel and adapted to move in the travel direction in accordance with the travel action of the drive shaft, wherein the first lid is engaged with the first cover travel body by the first bosses, and the second lid is engaged with the second cover travel body by the second bosses.
(Observation 4)
A display device is provided which is configured as described in Observation 3, in which a cover guide body is provided at the side of the storage member, and which includes: a first horizontal portion extending in the travel direction; and a first vertical portion connected with the first horizontal portion and extending in a first direction intersecting with the travel direction, wherein the first cover travel body includes first guide holes including first inclined portions extending in a second direction intersecting with the travel direction, and the first bosses of the first lid are engaged with the cover guide body and the first guide holes, wherein the second cover travel body includes second guide holes including second inclined portions extending in the second direction intersecting with the travel direction, and the second bosses of the second lid are engaged with the cover guide body and the second guide holes, and wherein the first lid and the second lid are transferred from the covering position to the overlapping position in accordance with the first cover travel body and the second cover travel body traveling in the travel direction and also are transferred from the overlapping position to the covering position.
(Observation 5)
A display device is provided which is configured as described in Observation 4 and in which an angle made between the first direction and the second direction is substantially 45 degrees.
(Observation 6)
A display device is provided which is configured as described in Observation 5 and in which the display portion is engaged with the second travel body adapted to freely travel by power of the drive source in the travel direction, wherein the display portion which is stored becomes raised up and also the display portion which is raised up becomes stored in accordance with traveling of the second travel body.
(Observation 7)
A display device is provided which is configured as described in Observation 6 and in which a rotary body is provided which is rotated by the drive source and which moves the first travel body and the second travel body in the travel direction by a rotary action.

DESCRIPTION OF THE REFERENCE NUMERALS 1, 21, 31 display device
2 upper case (storage member)
2a1 opening
3 lower case (storage member)
3b base (base plate)
3b2 second clutch lever guide rib (lock guide groove)
3s tension coil spring (rotation opening and closing means)
4 first lid (cover member, first cover member, cover member with a longer travel distance)
4p1 first front boss (first boss)
4p2 first rear boss (first boss) second lid (second cover member, cover member with a shorter travel distance)
5p1 second front boss (second boss)
5p2 second rear boss (second boss)
6 combiner (display portion)
7 motor (travel control means, drive source)
8 first cam (travel control means, travel means, first cover travel body)
8a first front guide groove (first guide hole)
8a1 parallel portion (parallel straight line portion)
8a2 first inclined descendent portion (first inclined portion)
8b first rear guide groove (first guide hole)
8b1 parallel portion (parallel straight line portion)
8b2 first inclined descendent portion (first inclined portion)
8r rack (travel control means, travel means)
9 second cam (travel control means, travel means, second cover travel body)
9a second front guide groove (second guide hole)
9a1 parallel portion (parallel straight line portion)
9a2 second inclined descendent portion (second inclined portion)
9b second rear guide groove (second guide hole)
9b1 parallel portion (parallel straight line portion)
9b2 second inclined descendent portion (second inclined portion)
9n inclined portion (rotation opening and closing means)
10 lid rail (cover guide body, travel control means)
10a first guide groove (third guide hole)
10b second guide groove (fourth guide hole)
11 drive lever (travel control means, lever, first lever)
12 clutch lever (travel control means, lever, second lever)
12p guide pin (boss)
13 slide base (first travel body, travel control means)
13k drive shaft (travel control means, travel means)
13p pinion (travel control means, travel means)
14g angle detection gear (gear portion)
16l torsion coil spring (biasing means)
16r torsion coil spring (biasing means)
17 tilt rack (second travel body, travel control means)
17c1, 17c2 combiner rotation rack (display portion driving gear portion)
17k angle detection rack (angle detection gear portion)
18 angle sensor (angle detector)
20 main cam (rotary body, travel control means)
22 third lid (rotary cover member)
22s support member (rotation opening and closing means)
22s1 drive boss (rotation opening and closing means)
sw1 lid closing detection sensor (covering position detection means)
k chassis (storage member)

What is claimed is:
1. A display device comprising:
a display portion;
a storage member configured to house the display portion and comprising an opening through which the display portion passes;
a plurality of cover members configured to cover the opening and to travel from the opening to a region of the storage member adjacent to the opening so as to be overlapped with each other at the region;
a travel control mechanism configured to cause the plurality of cover members to transfer between a covering position, in which the opening is closed by the plurality of cover members, and an overlapping position, in which the plurality of cover members are overlapped with each other, and configured to cause the display portion to transfer between a rise-up position and a storage position; and
only one drive source configured to drive the travel control mechanism,
wherein the travel control mechanism comprises: a rotary body rotated by drive force of the drive source; a first travel body configured to travel by rotation of the rotary body in a travel direction of the plurality of cover members to move the plurality of cover members; and a second travel body configured to cause the display portion to transfer between the rise-up position and the storage position in accordance with the rotation of the rotary body, and
wherein the display device comprises a lever engaged with the rotary body and configured to move the first travel body, and
wherein the rotary body has a partial gear and a guide rib to control the second travel body.
2. A display device according to claim 1, wherein the travel control mechanism moves the plurality of cover members at respective different speeds.
3. A display device according to claim 1, wherein each of the plurality of cover members has a surface area smaller than an area of the opening, and a total surface area of the plurality of cover members is larger than the area of the opening.

4. A display device according to claim 1, wherein when the plurality of cover members are disposed in the overlapping position, one of the plurality of cover members with a longer travel distance of the plurality of cover members is located below another one of the plurality of cover members with a shorter travel distance.

5. A display device according to claim 1, wherein the plurality of cover members comprise a first cover member comprising first bosses, which are disposed on opposing sides of the first cover member so as to protrude outwardly, and the second cover member comprising second bosses, which are disposed on opposing sides of the second cover member so as to protrude outwardly, the drive source is a motor, a first cover travel body comprising first guide holes having the first bosses set therein and configured to be moved by the first travel body thereby moving the first cover member, a second cover travel body comprising second guide holes having the second bosses set therein and configured to be moved by the first travel body thereby moving the second cover member, and a cover guide body comprising a third guide hole having the first bosses set therein and a fourth guide hole having the second bosses set therein and configured to guide the first cover travel body and the second cover travel body.

6. A display device according to claim 5, wherein the first guide holes and the second guide holes comprise first inclined portions and second inclined portions, respectively, which are inclined with respect to the travel direction.

7. A display device according to claim 6, wherein the first guide holes and the second guide holes each comprise parallel straight line portions, which are continuous respectively with at least one end of the first inclined portions and the second inclined portions and which are parallel to an upper surface of the storage member.

8. A display device according to claim 5, wherein the first travel body comprises a drive shaft to move the plurality of cover members, the first cover travel body comprises a rack, and the drive shaft comprises a pinion to engage with the rack of the first cover travel body thereby moving the first cover travel body.

9. A display device according to claim 5, wherein the lever comprises a first lever and a second lever that work in combination to move the first travel body in a first direction or a second direction based on a rotation direction of the rotary body.

10. A display device according to claim 9, wherein when the plurality of cover members are moved to the storage position, a boss disposed at the second lever is set in a lock guide groove of a base so as to be maintained thereby stopping travel of the second lever and the first lever, whereby the plurality of cover members are kept in the storage position.

11. A display device according to claim 1, wherein the second travel body comprises a display portion driving gear portion to drive the display portion and an angle detection gear portion having a shorter gear pitch than the display portion driving gear portion and configured to engage with a gear portion of an angle detector to detect the rise-up position of the display portion.

12. A display device according to claim 1, wherein the display device comprises a covering position detection mechanism to detect the covering position by using a position of the travel control mechanism.

13. A display device according to claim 1, wherein the display device comprises a biasing mechanism to bias the display portion in a retraction direction of the display portion when the display portion is raised up.

14. A display device according to claim 1, wherein the travel control mechanism moves the plurality of cover members from the overlapping position to the covering position such that each of the plurality of cover members reach the covering position at a same timing, and also moves the plurality of cover members from the covering position to the overlapping position such that each of the plurality of cover members reach the overlapping position at a same timing.

15. A display device comprising:
a display portion to display information;
a storage member configured to house the display portion and comprising an opening through which the display portion passes;
a plurality of cover members configured to cover the opening, each thereof having a surface area smaller than an area of the opening;
a travel control mechanism to open and close each of the plurality of cover members;
the plurality of cover members traveling between an overlapping position in which the plurality of cover members are overlapped with each other, and a covering position in which the opening is closed by the plurality of cover members; and
a drive source configured to drive the travel control mechanism to raise up and store the display portion and also to open and close the plurality of cover members;
wherein the travel control mechanism comprises: a rotary body rotated by drive force of the drive source; a first travel body configured to travel by rotation of the rotary body in a travel direction of the plurality of cover members to move the plurality of cover members; and a second travel body configured to cause the display portion to transfer between a rise-up position and a storage position in accordance with the rotation of the rotary body;
wherein the display device comprises a lever engaged with the rotary body and configured to move the first travel body, and
wherein the rotary body has a partial gear and a guide rib to control the second travel body.

16. A display device according to claim 15, wherein the travel control mechanism is configured to move the plurality of cover members at respective different speeds.

17. A display device according to claim 16, wherein the plurality of cover members includes a first lid comprising first bosses and a second lid comprising second bosses, and the display device comprises: a drive shaft to travel along with the first travel body in a travel direction of the cover members; a first cover travel body disposed at a side of the storage member in parallel and configured to move in the travel direction in accordance with a rotation action of the drive shaft and a travel action of the drive shaft in the travel direction; and a second cover travel body disposed at the side of the storage member in parallel and configured to move in the travel direction in accordance with the travel action of the drive shaft conducted in the travel direction, and wherein the first lid is engaged with the first cover travel body by the first bosses, and the second lid is engaged with the second cover travel body by the second bosses.

18. A display device according to claim 17, wherein a cover guide body is disposed at the side of the storage member and comprises: a first horizontal portion extending in the travel direction; and a vertical portion connected with the first horizontal portion and extending in a first direction intersecting with the travel direction, the first cover travel body comprises first guide holes comprising first inclined portions extending in a second direction intersecting with the travel direction such that the first bosses of the first lid are engaged with the cover guide body and the first guide holes, the second cover travel body comprises second guide holes comprising second inclined portions extending in the second direction intersecting with the travel direction such that the second bosses of the second lid are engaged with the cover guide body and the second guide holes, and wherein the first lid and the second lid are transferred from the covering position to the overlapping position and also are transferred from the overlapping position to the covering position in accordance with traveling of the first cover travel body and the second cover travel body moving in the travel direction.

19. A display device according to claim 18, wherein an angle made between the first direction and the second direction is substantially 45 degrees.

* * * * *